United States Patent
Takeuchi et al.

(10) Patent No.: US 10,911,930 B2
(45) Date of Patent: Feb. 2, 2021

(54) WIRELESS SYSTEM, WIRELESS DEVICE, NON-TRANSITORY COMPUTER-READABLE STORAGE MEDIUM HAVING STORED THEREIN COMMUNICATION PROGRAM, AND COMMUNICATION METHOD

(71) Applicant: NINTENDO CO., LTD., Kyoto (JP)

(72) Inventors: Hiroyuki Takeuchi, Kyoto (JP); Yoshitaka Imura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/377,908

(22) Filed: Apr. 8, 2019

(65) Prior Publication Data

US 2019/0239061 A1    Aug. 1, 2019

Related U.S. Application Data

(63) Continuation of application No. 15/222,989, filed on Jul. 29, 2016.

(30) Foreign Application Priority Data

Jul. 31, 2015 (JP) .................. 2015-152748
Jan. 22, 2016 (JP) .................. 2016-010985

(51) Int. Cl.
*H04W 8/00* (2009.01)
*H04W 4/80* (2018.01)
(Continued)

(52) U.S. Cl.
CPC ............ *H04W 8/005* (2013.01); *H04W 4/80* (2018.02); *H04W 76/15* (2018.02); *H04W 76/40* (2018.02); *H04W 84/20* (2013.01)

(58) Field of Classification Search
CPC .................................................... H04W 8/005
See application file for complete search history.

(56) References Cited

U.S. PATENT DOCUMENTS 8,060,017 B2    11/2011  Schlicht et al.
8,284,671 B2    10/2012  Yamaguchi et al.
(Continued)

FOREIGN PATENT DOCUMENTS

JP    2001-189689 A    7/2001
JP    2003-516033 A    5/2003
(Continued)

OTHER PUBLICATIONS

United States Office Action dated Jan. 12, 2018 received in related U.S. Appl. No. 15/222,989.
(Continued)

*Primary Examiner* — Hsinchun Liao
(74) *Attorney, Agent, or Firm* — Scully, Scott, Murphy & Presser, P.C.

(57) ABSTRACT

A communication system as an example of an exemplary embodiment includes two mobile terminals and two BLE terminals. The mobile terminals establish connections with the BLE terminals. Specifically, one of the mobile terminals and one of the BLE terminals are connected together such that the mobile terminal is a central and the BLE terminal is a peripheral. In the state of being connected to the mobile terminal, the BLE terminal communicates with the other BLE terminal in the state of being connected to the other mobile terminal. The BLE terminals may establish a connection with each other and communicate with each other, or may communicate with each other without establishing a connection with each other.

20 Claims, 19 Drawing Sheets

(51) Int. Cl.
*H04W 76/40* (2018.01)
*H04W 76/15* (2018.01)
*H04W 84/20* (2009.01)

(56) References Cited

U.S. PATENT DOCUMENTS

| | | | |
|---|---|---|---|
| 9,100,332 | B2 | 8/2015 | Tanaka et al. |
| 2001/0019956 | A1 | 9/2001 | Tada |
| 2002/0114303 | A1 | 8/2002 | Crosbie et al. |
| 2009/0170607 | A1 | 7/2009 | Chiao et al. |
| 2010/0097924 | A1 | 4/2010 | Yamaguchi et al. |
| 2010/0100920 | A1 | 4/2010 | Baek et al. |
| 2012/0106428 | A1 | 5/2012 | Schlicht et al. |
| 2012/0328061 | A1* | 12/2012 | Chow ............... H04W 4/80 375/354 |
| 2013/0235166 | A1 | 9/2013 | Jones et al. |
| 2014/0254466 | A1 | 9/2014 | Wurster et al. |
| 2014/0357192 | A1 | 12/2014 | Azogui et al. |
| 2014/0364063 | A1 | 12/2014 | Bell |
| 2015/0081823 | A1 | 3/2015 | Gao et al. |
| 2015/0156602 | A1 | 6/2015 | Nakao et al. |
| 2015/0173110 | A1 | 6/2015 | Takahashi et al. |
| 2015/0195673 | A1 | 7/2015 | Rantapuska et al. |
| 2015/0304941 | A1 | 10/2015 | Syrjarinne et al. |
| 2015/0350820 | A1 | 12/2015 | Son et al. |
| 2016/0029148 | A1 | 1/2016 | Jackson et al. |
| 2016/0165561 | A1* | 6/2016 | Lee ............... H04W 4/08 370/350 |
| 2016/0269979 | A1 | 9/2016 | Ide et al. |
| 2017/0006556 | A1 | 1/2017 | Liu |
| 2017/0359786 | A1 | 12/2017 | Liu |

FOREIGN PATENT DOCUMENTS

| | | |
|---|---|---|
| JP | 2003-516095 A | 5/2003 |
| JP | 2013-165467 A | 8/2013 |
| JP | 2014-017989 A | 1/2014 |
| JP | 2014-204142 A | 10/2014 |
| JP | 2014-530524 A | 11/2014 |
| JP | 2015-119215 A | 6/2015 |
| JP | 2015-130657 A | 7/2015 |
| WO | 01/41348 A2 | 6/2001 |
| WO | 01/41377 A1 | 6/2001 |
| WO | 2013/066499 A2 | 5/2013 |
| WO | 2016/003064 A1 | 1/2016 |
| WO | 2016/017908 A1 | 2/2016 |

OTHER PUBLICATIONS

United States Office Action dated Aug. 8, 2018 received in related U.S. Appl. No. 15/222,989.
United States Office Action dated Jul. 24, 2017 received in related U.S. Appl. No. 15/222,989.
United States Notice of Allowance dated Mar. 28, 2019 received in related U.S. Appl. No. 15/222,989.
Applicant-Initiated Interview Summary dated Feb. 14, 2019 received in related U.S. Appl. No. 15/222,989.
United States Official Action dated Dec. 18, 2018 received in related U.S. Appl. No. 15/222,992.
United States Official Communication dated Aug. 13, 2018 received in related U.S. Appl. No. 15/222,992.
United States Official Action dated Jun. 15, 2018 received in related U.S. Appl. No. 15/222,992.
European Search Report dated Dec. 15, 2016 issued in corresponding EP Application No. 16 18 1843.
Related U.S. Appl. No. 15/222,992, filed Jul. 29, 2016.
Notice of Allowance dated Sep. 18, 2020 received in related U.S. Appl. No. 16/458,904.

\* cited by examiner

FIG. 3

| FREQUENCY | CHANNEL | USE |
|---|---|---|
| 2402MHz | 37 | ADVERTISING CHANNEL |
| 2404MHz | 0 | DATA CHANNEL |
| 2406MHz | 1 | |
| 2408MHz | 2 | |
| 2410MHz | 3 | |
| 2412MHz | 4 | |
| 2414MHz | 5 | |
| 2416MHz | 6 | |
| 2418MHz | 7 | |
| 2420MHz | 8 | |
| 2422MHz | 9 | |
| 2424MHz | 10 | |
| 2426MHz | 38 | ADVERTISING CHANNEL |
| 2428MHz | 11 | DATA CHANNEL |
| 2430MHz | 12 | |
| 2432MHz | 13 | |
| 2434MHz | 14 | |
| 2436MHz | 15 | |
| 2438MHz | 16 | |
| 2440MHz | 17 | |
| 2442MHz | 18 | |
| 2444MHz | 19 | |
| 2446MHz | 20 | |
| 2448MHz | 21 | |
| 2450MHz | 22 | |
| 2452MHz | 23 | |
| 2454MHz | 24 | |
| 2456MHz | 25 | |
| 2458MHz | 26 | |
| 2460MHz | 27 | |
| 2462MHz | 28 | |
| 2464MHz | 29 | |
| 2466MHz | 30 | |
| 2468MHz | 31 | |
| 2470MHz | 32 | |
| 2472MHz | 33 | |
| 2474MHz | 34 | |
| 2476MHz | 35 | |
| 2478MHz | 36 | |
| 2480MHz | 39 | ADVERTISING CHANNEL |

F I G. 1 1
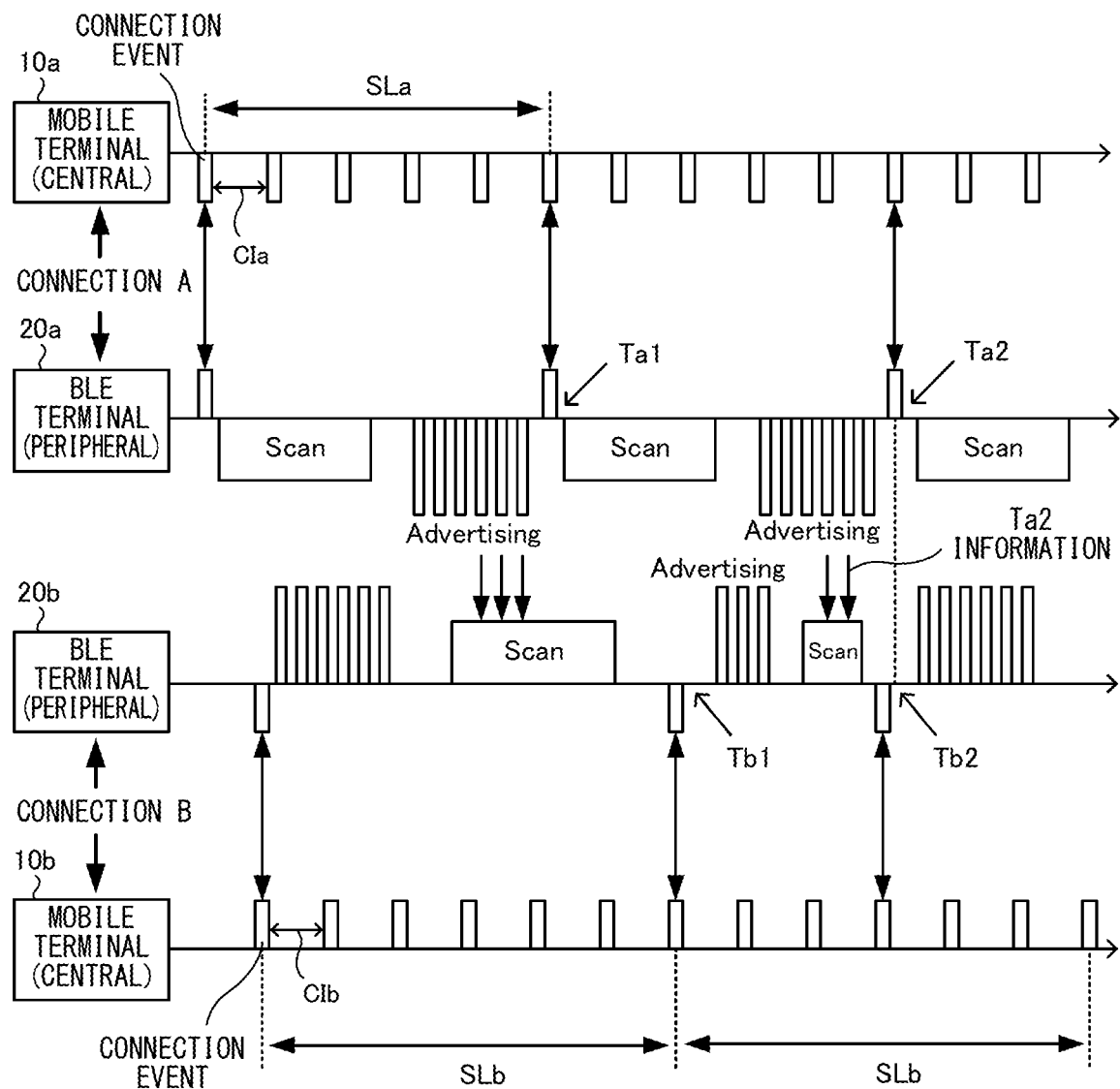

F I G. 1 2
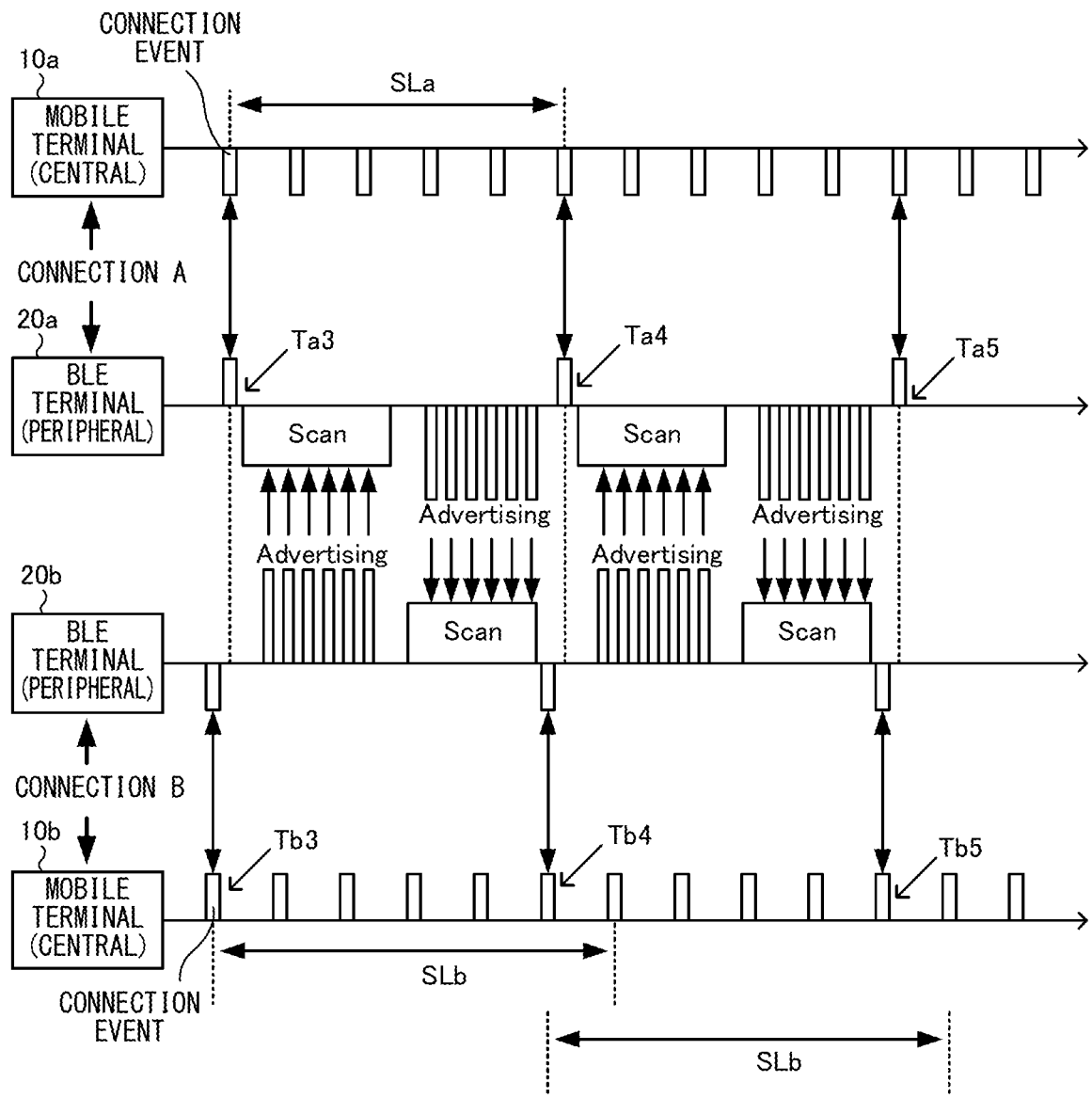

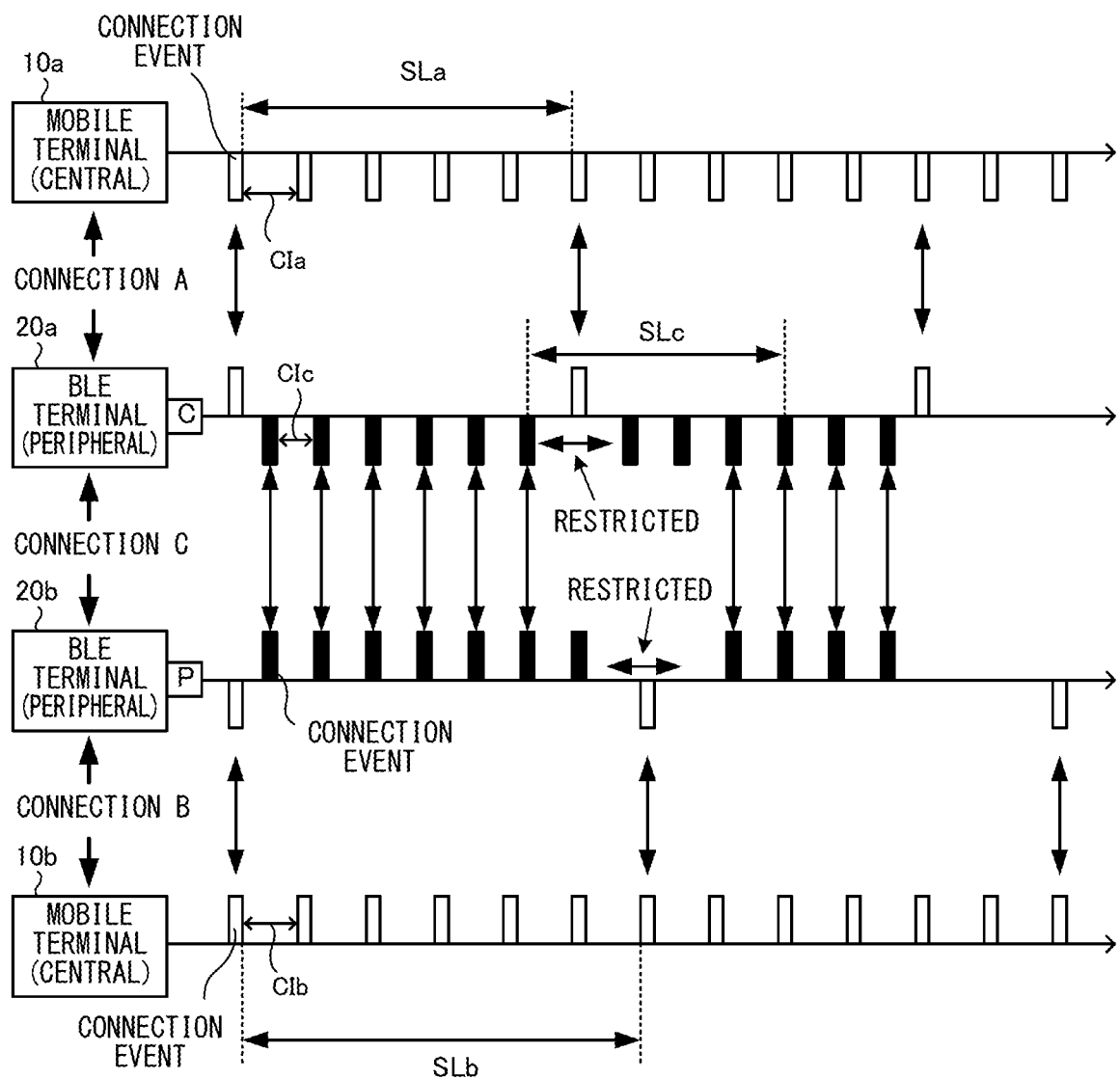
F I G. 1 4

F I G. 1 5
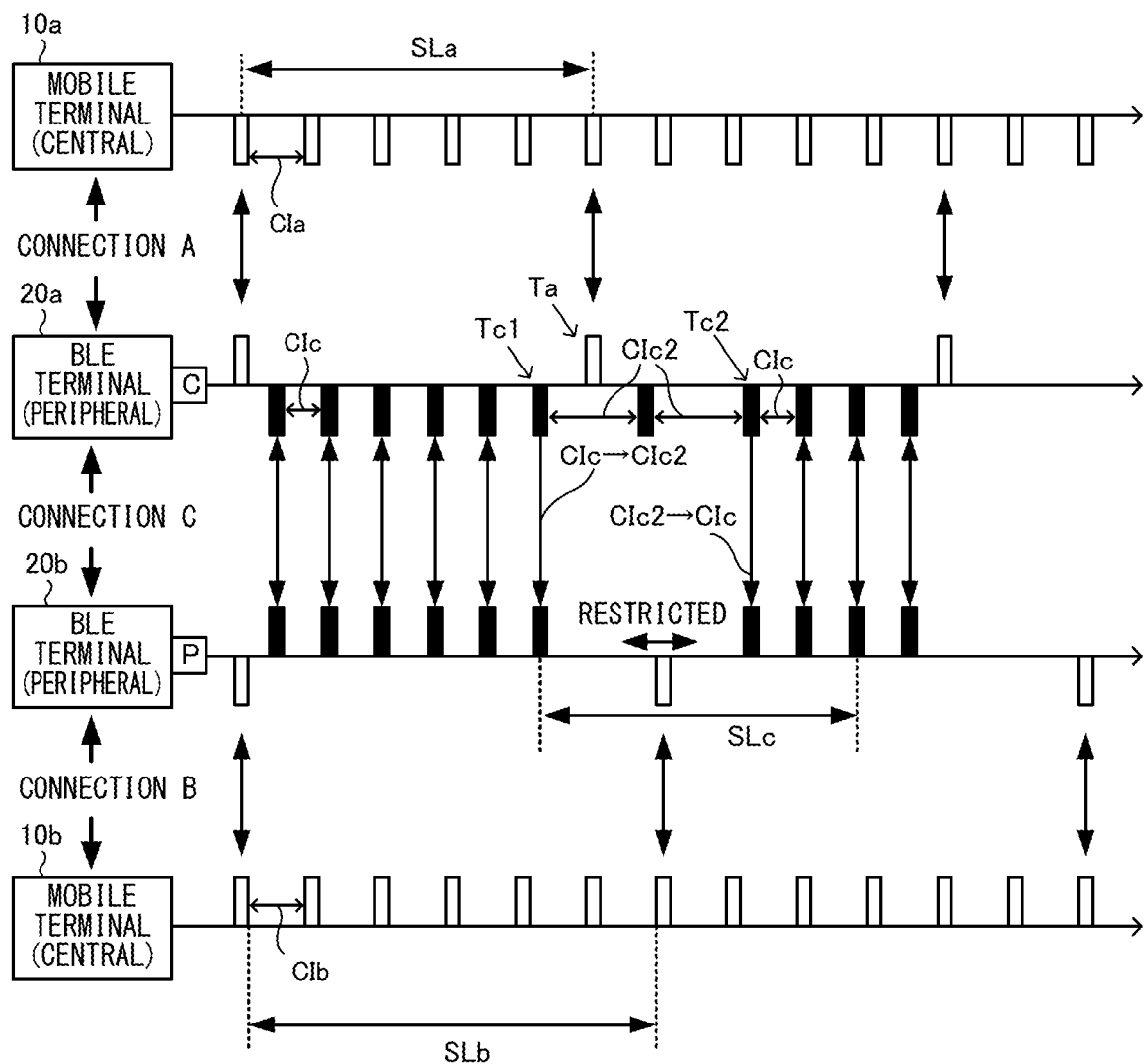

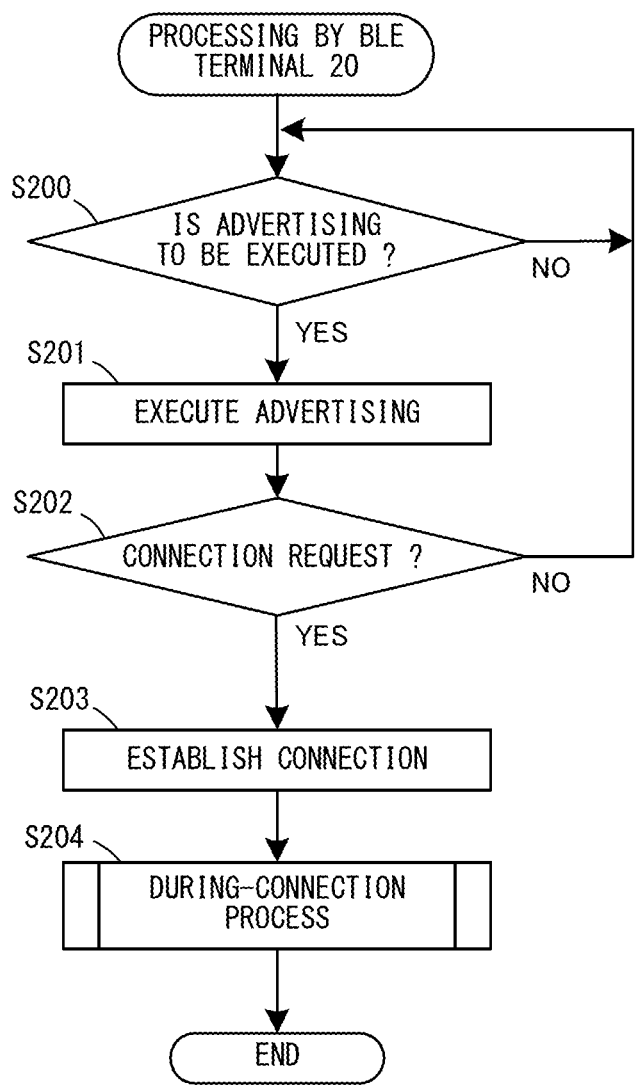
F I G. 19

WIRELESS SYSTEM, WIRELESS DEVICE, NON-TRANSITORY COMPUTER-READABLE STORAGE MEDIUM HAVING STORED THEREIN COMMUNICATION PROGRAM, AND COMMUNICATION METHOD

CROSS REFERENCE TO RELATED APPLICATION

This application is a continuation application of U.S. application Ser. No. 15/222,989 filed on Jul. 29, 2016, which claims benefit of Japanese Patent Application No. 2015-152748, filed on Jul. 31, 2015, and Japanese Patent Application No. 2016-010985, filed on Jan. 22, 2016, the contents of which are incorporated herein by reference.

FIELD

The technology disclosed here relates to a wireless system, a wireless device, a communication program, and a communication method that are capable of communicating with a plurality of devices.

BACKGROUND AND SUMMARY

Conventionally, there is a device for performing wireless communication at a short distance. For example, in communication based on the Bluetooth (registered trademark) standard, a certain device as a master and another device as a slave form a single network and communicate with each other.

In the conventional wireless communication, however, there is room for improvement in the communication of a device in the state of being connected to a certain device, with various devices.

Therefore, it is an object of an exemplary embodiment to provide a technique for communicating with various devices.

To achieve the above object, the exemplary embodiment employs the following configurations.

An example of the exemplary embodiment is a wireless system including a plurality of devices capable of performing wireless communication, the wireless system including a first device, a second device, a third device, and a fourth device. The first device and the second device establish a connection between the first device and the second device such that the first device is a master and the second device is a slave, and performing wireless communication with each other. The fourth device and the third device establish a connection between the fourth device and the third device such that the fourth device is a master and the third device is a slave, and performing wireless communication with each other. The second device in the state of being connected as a slave to the first device performs wireless communication with the third device in the state of being connected as a slave to the fourth device.

Based on the above, a second device operating as a slave of a first device can communicate with a third device operating as a slave of a fourth device.

Here, "establishing a connection" means that after information is exchanged by a device transmitting information necessary for a connection to another device, the devices enter the state of being connected (a connection state). In the state of being connected, the two devices communicate with each other based on information exchanged while the connection is established.

In an exemplary embodiment, the second device may execute a transmission process for wirelessly transmitting data by broadcast or multicast, and may execute a reception process for wirelessly receiving data transmitted by broadcast or multicast. The second device in the state of being connected as a slave to the first device executes the transmission process and the reception process, thereby communicating with the third device in the state of being connected as a slave to the fourth device.

Based on the above, the second device operating as a slave of the first device transmits and receives data by broadcast, and thereby can communicate with the third device operating as a slave of the fourth device.

Here, "broadcast" includes broadcast to unspecified devices (all devices in the range where communication can be performed) and broadcast to limited unspecified devices. A "limited unspecified device" is a device that is not uniquely specified (a unique address assigned to the device is not specified), but has a common attribute or is in a common state.

In an exemplary embodiment, the second device in a state of not being connected to the third device may transmit or receive predetermined data by wireless communication to or from the third device in the state of being connected as a slave to the fourth device.

Based on the above, the second device can communicate with the third device operating as a slave of the fourth device, without connecting to the third device.

In an exemplary embodiment, the second device may transmit or receive, as the predetermined data, data for use in an application.

In an exemplary embodiment, the second device may transmit or receive, as the predetermined data, data for use in a game.

In an exemplary embodiment, the second device may transmit or receive, as the predetermined data, data regarding a content reproduced in an application.

Based on the above, the second device and the third device can exchange data for use in an application (including a game) and data regarding a content to be reproduced in an application (for example, an image, a sound, and the like). That is, the second device connected as a slave to the first device can transmit and/or receive the above data to and/or from the third device connected as a slave to the fourth device.

In an exemplary embodiment, the second device in the state of being connected to the first device may repeatedly execute the transmission process and the reception process, thereby performing wireless communication with the third device in the state of being connected as a slave to the fourth device, without establishing a connection with the third device.

Based on the above, the second device can communicate with the third device without establishing a connection with the third device.

In an exemplary embodiment, the data to be transmitted by broadcast or multicast may be data for establishing a connection with another device.

Based on the above, broadcast or multicast data is transmitted, whereby it is possible to establish a connection with another device.

In an exemplary embodiment, the second device in the state of being connected as a slave to the first device may establish a connection with the third device in the state of being connected as a slave to the fourth device and may perform wireless communication with the third device in a state where the established connection is maintained.

Based on the above, the second device in the state of being connected as a slave to the first device can establish a connection with the third device in the state of being connected as a slave to the fourth device and communicate with the third device.

In an exemplary embodiment, the second device in the state of being connected as a slave to the first device may establish a connection with the third device in the state of being connected as a slave to the fourth device and may perform wireless communication with the third device without terminating the established connection.

Based on the above, the second device in the state of being connected as a slave to the first device can establish a connection with the third device in the state of being connected as a slave to the fourth device and communicate with the third device.

In an exemplary embodiment, the second device in the state of being connected to the first device may repeatedly execute the transmission process and the reception process, thereby performing wireless communication with another device present around the second device.

Based on the above, the second device in the state of being connected to the first device repeatedly performs a transmission process and a reception process by broadcast, and thereby can communicate with another device present around the second device.

In an exemplary embodiment, the second device may repeatedly execute the transmission process and the reception process to search for another device around the second device and may establish a connection with the third device detected by the search and in the state of being connected as a slave to the fourth device.

Based on the above, the second device in the state of being connected to the first device repeatedly performs the transmission process and the reception process by broadcast to search for the third device, and thereby can establish a connection with the third device in the state of being connected as a slave to the fourth device.

In an exemplary embodiment, at least any of an execution period of the transmission process, timing for executing the transmission process, an execution period of the reception process, and timing for executing the reception process may be variable.

In an exemplary embodiment, at least any of the execution period of the transmission process, the timing for executing the transmission process, the execution period of the reception process, and the timing for executing the reception process may be randomly set.

Based on the above, a transmission process and a reception process are repeatedly performed, whereby it is possible to, for example, match transmission timing of one device and reception timing of the other device.

In an exemplary embodiment, the second device may alternately and repeatedly execute the transmission process and the reception process. In the case where "the transmission process and the reception process are alternately and repeatedly executed", the transmission process and the reception process may be alternately performed with a stopping period provided between the transmission process and the reception process.

Based on the above, for example, it is possible to shorten the time from transmission timing of one device to reception timing of the other device.

In an exemplary embodiment, a sleep period in which neither the transmission process nor the reception process is performed may be present at least between the transmission process and the reception process, between the transmission process and the transmission process, or between the reception process and the reception process.

Based on the above, a sleep period is provided in which neither the transmission process nor the reception process is performed. Thus, it is possible to reduce power consumption.

In an exemplary embodiment, the sleep period may be variable.

In an exemplary embodiment, the sleep period may be randomly set.

Based on the above, the transmission process and the reception process are repeatedly performed, whereby it is possible to, for example, match transmission timing of one device and reception timing of the other device.

In an exemplary embodiment, the second device may perform wireless communication with the third device in the state of being connected as a slave to the fourth device, without an instruction from the first device.

Based on the above, the second device can communicate with the third device without an instruction from the first device.

In an exemplary embodiment, in the state where the first device and the second device are connected together, the first device and the second device may repeatedly perform synchronous communication with each other.

Based on the above, the first device and the second device in the state of being connected together communicate with each other in synchronization with each other. That is, the transmitting end and the receiving end match timing and communicate with each other. This makes it possible to efficiently perform communication. Further, a period is provided in which both devices are in a state other than a reception state or a transmission state, whereby it is possible to reduce power consumption.

In an exemplary embodiment, the wireless system may execute an allowance period setting process for setting an allowance period for a connection between the first device and the second device. The second device in the state of being connected to the first device may execute a determination process for determining, based on the allowance period, whether or not to execute the synchronous communication with the first device.

Based on the above, an allowance period is provided in a connection between the first device and the second device. Thus, for example, the second device is able not to perform synchronization communication with the first device. This makes it possible to reduce the power consumption of the second device as compared with the case where it is necessary to perform synchronization communication without exception.

Here, the "allowance period" may mean time or may mean the number of times it is not necessary to communicate with the second device.

In an exemplary embodiment, the first device may execute the allowance period setting process.

Based on the above, the first device can set the allowance period.

In an exemplary embodiment, the second device in the state of being connected to the first device may transmit a change request to change the allowance period.

Based on the above, the second device can request the first device to change the allowance period.

In an exemplary embodiment, The first device in the state of being connected to the second device repeatedly may transmit predetermined data to the second device at a predetermined time interval as the synchronous communication. The second device may return a response to the first device in accordance with the reception of the predetermined data transmitted from the first device at the predetermined time interval. In the allowance period setting process, the number of times of the response may be set as the allowance period, and if the number of times the second device does not return the response to the first device exceeds the number of times set in the allowance period setting process or reaches the number of times set in the allowance period setting process, the second device may return the response to the first device.

Based on the above, the second device is able not to return a response to the first device. This makes it possible to reduce the power consumption and also avoid the risk of terminating the connection with the first device.

In an exemplary embodiment, the second device may perform wireless communication with the third device in the state of being connected as a slave to the fourth device in the allowance period.

Based on the above, the device can communicate with the third device while maintaining the connection with the first device.

In an exemplary embodiment, the second device may execute a transmission process for wirelessly transmitting data by broadcast or multicast, and may execute a reception process for wirelessly receiving data transmitted by broadcast or multicast. The second device may repeatedly execute the transmission process and the reception process in the allowance period, thereby performing wireless communication with the third device in the state of being connected as a slave to the fourth device.

Based on the above, the second device can communicate with the third device in the allowance period and can communicate with the third device while maintaining the connection with the first device.

In an exemplary embodiment, the second device may establish a connection with the third device in the state of being connected as a slave to the fourth device in the allowance period, and in the state of being connected to the third device may perform wireless communication with the third device.

Based on the above, the second device can communicate with the third device in the allowance period and can connect to and communicate with the third device while maintaining the connection with the first device.

In an exemplary embodiment, the second device may perform wireless communication with the third device in the state of being connected as a slave to the fourth device at timing different from timing when the first device and the second device perform synchronous communication with each other.

Based on the above, the second device can communicate with the third device at timing other than timing for performing synchronous communication with the first device. For example, the second device can communicate with the third device while maintaining the connection with the first device.

In an exemplary embodiment, the first device and the second device may repeatedly perform synchronous communication with each other, and the fourth device and the third device may repeatedly perform synchronous communication with each other.

Based on the above, the first device and the second device can perform synchronous communication with each other, and the third device and the fourth device can perform synchronous communication with each other. This makes it possible to, for example, efficiently perform communication between the devices and also reduce power consumption.

In an exemplary embodiment, the wireless communication system may further execute an adjustment process for adjusting at least either one of timing of the synchronous communication between the first device and the second device and timing of the synchronous communication between the fourth device and the third device.

Based on the above, it is possible to adjust the timing of the synchronous communication between the first device and the second device and the timing of the synchronous communication between the fourth device and the third device.

In an exemplary embodiment, the second device may execute the adjustment process.

Based on the above, the second device can adjust the timing of the synchronous communication.

In an exemplary embodiment, in the adjustment process, the timing of the synchronous communication between the first device and the second device and the timing of the synchronous communication between the fourth device and the third device may be adjusted to be close to each other.

Based on the above, it is possible to adjust the timing of the synchronous communication between the first device and the second device and the timing of the synchronous communication between the fourth device and the third device to be close to each other. This makes it possible to efficiently perform communication between the second device and the third device. That is, the timing of the synchronous communication between the first device and the second device and the timing of the synchronous communication between the fourth device and the third device are matched, whereby it is possible to cause the period in which the second device does not perform synchronous communication with the first device to overlap the period in which the third device does not perform synchronous communication with the fourth device. In this overlapping period, the second device and the third device can communicate with each other.

In an exemplary embodiment, the wireless system may execute an allowance period setting process for setting an allowance period for a connection between the first device and the second device. The second device in the state of being connected to the first device may execute a determination process for determining, based on the allowance period, whether or not to execute the synchronous communication with the first device. In the adjustment process, timing of at least either one of the synchronous communication between the first device and the second device and the synchronous communication between the third device and the fourth device may be adjusted so that the first device and the second device perform synchronous communication with each other in the allowance period.

Based on the above, for example, it is possible to adjust the timing of the synchronous communication while avoiding the risk of terminating the connection between the first device and the second device.

In an exemplary embodiment, the second device may execute the adjustment process. The third device may transmit information indicating the timing of the synchronous communication to be performed between the third device and the fourth device. Based on the information transmitted from the third device, the second device may adjust the timing of the synchronous communication to be performed between the second device and the first device.

Based on the above, the second device can receive, from the third device, information about the timing when the third device and the fourth device perform synchronization communication with each other. Thus, it is possible to adjust the timing of synchronous communication based on the information.

In an exemplary embodiment, in the state where the first device and the second device are connected together, the first device and the second device may repeatedly perform synchronous communication with each other. At timing when the first device and the second device perform synchronous communication with each other, the second device may perform wireless communication with the first device in priority to wireless communication between the second device and the third device.

Based on the above, the second device can preferentially perform communication with the first device. For example, the second device can communicate with the third device while communicating with the first device so that a connection with the first device is not terminated.

In an exemplary embodiment, the wireless system may execute an allowance period setting process for setting an allowance period for a connection between the first device and the second device. The second device in the state of being connected to the first device may execute a determination process for determining, based on the allowance period, whether or not to execute the synchronous communication with the first device, and may execute a communication control process for controlling at least either one of the communication with the third device and the communication with the first device so that the first device and the second device perform synchronous communication with each other in the allowance period.

Based on the above, the second device can communicate with the third device while avoiding the risk of terminating the connection with the first device.

In an exemplary embodiment, the second device may execute a transmission process for wirelessly transmitting data by broadcast or multicast, and may execute a reception process for wirelessly receiving data transmitted by broadcast or multicast. Further, the second device in the state of being connected as a slave to the first device may repeatedly execute the transmission process and the reception process, thereby performing wireless communication with the third device in the state of being connected as a slave to the fourth device, without establishing a connection with the third device. Further, if timing of synchronous communication with the first device and timing of wireless communication with the third device overlap each other, the second device may preferentially perform the synchronous communication with the first device.

Based on the above, the second device transmits and receives data by broadcast, and thereby can communicate with the third device. At the timing for performing synchronous communication with the first device, the second device can preferentially perform communication with the first device. This enables the second device to, for example, communicate with the third device while communicating with the first device so that the connection with the first device is not terminated.

In an exemplary embodiment, the second device may establish a connection with the third device in the state of being connected as a slave to the fourth device, and in the state of being connected to the third device may perform wireless communication with the third device. If timing for performing synchronous communication with the first device and timing of wireless communication in the connection between the second device and the third device overlap each other, the second device may preferentially perform the communication with the first device.

Based on the above, the second device can establish a connection with and communicate with the third device. At the timing for performing synchronous communication with the first device, the second device can perform the communication with the first device in priority to the communication with the third device. This enables the second device to, for example, communicate with the third device while communicating the first device so that the connection with the first device is not terminated.

In an exemplary embodiment, the wireless system may execute a second allowance period setting process for setting a second allowance period for a connection between the second device and the third device. The second device and the third device in the state of being connected to each other may execute synchronous communication with each other. The third device in the state of being connected to the second device may execute a determination process for determining, based on the second allowance period, whether or not to execute synchronous communication with the second device. The second device may execute a communication control process for controlling at least either one of the communication with the third device and the communication with the first device so that the second device and the third device perform synchronous communication with each other in the second allowance period.

Based on the above, for example, the second device can control communication with the third device and communication with the first device so that the connection with the third device is not terminated.

In an exemplary embodiment, the second device may set a time interval of synchronous communication in the connection between the second device and the third device and may perform synchronous communication with the third device at the set time interval, and the second device may adjust the time interval of the synchronous communication with the third device, thereby preferentially performing communication with the first device.

Based on the above, for example, the second device lengthens the time intervals in synchronous communication with the third device, and thereby can communicate with the first device in the period in which the second device does not perform synchronous communication with the third device. Thus, the second device can preferentially perform the communication with the first device.

In an exemplary embodiment, the wireless system may execute a second allowance period setting process for setting a second allowance period for a connection between the second device and the third device, and may execute a third allowance period setting process for setting a third allowance period for a connection between the fourth device and the third device. The third device in the state of being connected to the second device may execute a determination process for determining, based on the second allowance period, whether or not to execute synchronous communication with the second device. The fourth device in the state of being connected to the third device may execute synchronous communication with the third device. The third device in the state of being connected to the fourth device may determine, based on the third allowance period, whether or not to execute synchronous communication with the fourth device. The third device may execute the synchronous communication with the fourth device in priority to the synchronous communication with the second device.

Based on the above, the second device and the third device are connected together, and a second allowance period is set for this connection. The third device and the fourth device are connected together, and a third allowance period is set for this connection. In the third allowance period, the third device executes synchronous communication with the fourth device and executes the synchronous communication with the fourth device in priority to the synchronous communication with the second device. This enables the third device to avoid the risk of terminating the connection with the fourth device.

In an exemplary embodiment, in accordance with a state of communication with the second device, the third device may transmit to the fourth device a change request to change the third allowance period.

Based on the above, the third device can cause the fourth device to change the third allowance period.

In an exemplary embodiment, the second device may execute an interval setting process for setting an interval of wireless communication. The second device establishes a connection with the third device in the state of being connected as a slave to the fourth device and then performs wireless communication between the second device and the third device at the interval set in the interval setting process.

Based on the above, the second device can communicate with the third device at a set interval.

In an exemplary embodiment, the wireless system may execute an allowance period setting process for setting an allowance period for a connection between the first device and the second device. The second device in the state of being connected to the first device may execute a determination process for determining, based on the allowance period, whether or not to execute synchronous communication with the first device. In the interval setting process, based on the allowance period for the connection between the first device and the second device, the interval of wireless communication between the second device and the third device may be set.

Based on the above, the second device can set the interval of communication with the third device based on an allowance period in a connection with the first device.

In an exemplary embodiment, in the interval setting process by the second device, in accordance with a state of communication between the first device and the second device, a time interval of communication with the third device may be set.

Based on the above, the second device can communicate with the third device at a time interval corresponding to the state of communication between the first device and the second device.

In an exemplary embodiment, the wireless system may execute a second allowance period setting process for setting a second allowance period for a connection between the second device and the third device. The third device in the state of being connected to the second device may execute a determination process for determining, based on the second allowance period, whether or not to execute synchronous communication with the second device. In the second allowance period setting process, in accordance with a state of communication between the first device and the second device, the second allowance period may be set.

Based on the above, it is possible to set a second allowance period in accordance with the state of communication between the first device and the second device. For example, it is possible to lengthen or shorten an allowance period in a connection between the second device and the third device in accordance with the state of communication between the first device and the second device.

In an exemplary embodiment, the first device and the second device may perform synchronous communication with each other at a first time interval, and while being connected to the first device, the second device may establish a connection with the third device in the state of being connected as a slave to the fourth device and may perform synchronous communication with the third device at a second time interval different from the first time interval.

Based on the above, it is possible to differentiate the time interval of synchronous communication between the first device and the second device and the time interval of synchronous communication between the second device and the third device.

In an exemplary embodiment, the second device may set the second time interval to be shorter than the first time interval.

Based on the above, a second time interval is shorter than a first time interval. Thus, the second device can communicate with the third device more frequently than with the first device. Thus, the second device and the third device can exchange a large amount of data in a relatively short time.

In an exemplary embodiment, the wireless system may execute a first allowance period setting process for setting a first allowance period for a connection between the first device and the second device, and may execute a second allowance period setting process for setting a second allowance period for a connection between the second device and the third device. The second device in the state of being connected to the first device may execute a determination process for determining, based on the first allowance period, whether or not to execute synchronous communication with the first device. The third device in the state of being connected to the second device may execute a determination process for determining, based on the second allowance period, whether or not to execute synchronous communication with the second device. In the second allowance period setting process, in accordance with at least either one of a state of the communication between the first device and the second device and the state of the communication between the second device and the third device, the second allowance period may be set to be shorter than the first allowance period.

Based on the above, it is possible to make a second allowance period in a connection between the second device and the third device shorter than a first allowance period in a connection between the first device and the second device. This enables the second device to reduce the risk of terminating the connection with the first device. For example, this configuration may be employed in a case where the second device exchanges data with the first device at a low frequency in a relatively long period while exchanging data with the third device at a high frequency in a relatively short period.

In an exemplary embodiment, the second device may set the second time interval to be longer than the first time interval.

Based on the above, a first time interval is shorter than a second time interval. Thus, the second device can communicate with the third device more frequently than with the first device. Thus, the first device and the second device can exchange relatively a large amount of data in a short time.

In an exemplary embodiment, the wireless system may execute a first allowance period setting process for setting a first allowance period for a connection between the first device and the second device, and may execute a second allowance period setting process for setting a second allowance period for a connection between the second device and the third device. The second device in the state of being connected to the first device may execute a determination process for determining, based on the first allowance period, whether or not to execute synchronous communication with the first device. The third device in the state of being connected to the second device may execute a determination process for determining, based on the second allowance period, whether or not to execute synchronous communication with the second device. In the second allowance period setting process, the second allowance period may be set to be longer than the first allowance period.

Based on the above, it is possible to make a second allowance period in a connection between the second device and the third device longer than a first allowance period in a connection between the first device and the second device. This enables the second device to reduce the risk of terminating the connection with the third device. For example, this configuration may be employed in a case where the second device exchanges data with the third device at a low frequency in a relatively long period while exchanging data with the first device at a relatively high frequency.

In an exemplary embodiment, the second device, while being connected to the first device, may establish a connection with the third device in the state of being connected as a slave to the fourth device, and may give priority to the connection between the first device and the second device between over the connection between the second device and the third device.

Based on the above, the second device can connect to and communicate with the third device while giving priority to a connection with the first device.

In an exemplary embodiment, in accordance with a connection state between the first device and the second device, the second device may restrict communication between the second device and the third device.

Based on the above, in accordance with a connection state with the first device, the second device can restrict communication with the third device. For example, if there is a risk of terminating the connection with the first device, the second device can restrict communication with the third device.

In an exemplary embodiment, in a case where the connection between the first device and the second device is to be terminated if the connection between the second device and the third device is maintained, the second device may terminate the connection between the second device and the third device.

Based on the above, if there is a risk of terminating the connection with the first device, the second device can terminate a connection with the third device.

In an exemplary embodiment, the second device may execute a transmission process for wirelessly transmitting data, and may execute a reception process for wirelessly receiving data at timing different from the transmission of the data in the transmission process. The second device may repeatedly execute the transmission process and the reception process, and in the transmission process, data including timing information indicating timing of the transmission process and/or the reception process to be executed by the second device next time or later may be transmitted.

Based on the above, the second device can notify another device of the timing when the second device performs a transmission process and/or a reception process next time or later.

In an exemplary embodiment, in the transmission process by the second device, the data including the timing information may be transmitted by broadcast or multicast.

Based on the above, the second device can transmit the timing information to an unspecified device.

In an exemplary embodiment, in the transmission process by the second device, in accordance with reception of data transmitted from another device by broadcast or multicast, the data including the timing information may be transmitted.

Based on the above, in accordance with broadcast data from another device, the second device can transmit data including timing information.

In an exemplary embodiment, the third device may repeatedly execute a transmission process for wirelessly transmitting data and a reception process for wirelessly receiving data, and based on the timing information from the second device, may adjust timing for executing the transmission process and/or the reception process.

Based on the above, based on the timing information from the second device, the third device can adjust the timing for performing a transmission process and/or a reception process. This enables the second device and the third device to match the timing of the transmission process and the timing of the reception process.

In an exemplary embodiment, the wireless communication between the first device and the second device, the wireless communication between the fourth device and the third device, and the wireless communication between the second device and the third device may be all performed based on the same communication standard.

In an exemplary embodiment, each device may perform the wireless communication while switching a frequency of a radio wave.

In an exemplary embodiment, each device may perform the wireless communication while switching a plurality of predetermined different frequencies.

In an exemplary embodiment, the communication standard may be Bluetooth Low Energy.

In an exemplary embodiment, the wireless communication between the first device and the second device, the wireless communication between the fourth device and the third device, and the wireless communication between the second device and the third device may be all performed in the same predetermined frequency band.

In an exemplary embodiment, the frequency band may be the 2.4 GHz band.

In an exemplary embodiment, the search may be performed by switching between three channels.

In an exemplary embodiment, the second device in the state of being connected as a slave to the first device may execute a first process for wirelessly transmitting data by broadcast or multicast. The third device in the state of being connected as a slave to the fourth device may execute a second process for wirelessly receiving the data transmitted by broadcast or multicast in the first process executed by the second device.

Based on the above, the second device can transmit data by broadcast or multicast, and the third device can receive this data.

In an exemplary embodiment, the third device in the state of being connected as a slave to the fourth device may execute a third process for wirelessly transmitting data by broadcast or multicast. The second device in the state of being connected as a slave to the first device may execute a fourth process for wirelessly receiving the data transmitted by broadcast or multicast in the third process executed by the third device. The second device may alternately and repeatedly execute the first process and the fourth process. The third device may alternately and repeatedly execute the second process and the third process.

Based on the above, the third device in the state of being connected to the fourth device transmits and receives data by broadcast or multicast, and the second device in the state of being connected to the first device transmits and receives data by broadcast or multicast. This enables the third device and the second device connected as slaves to other devices to transmit and receive data to and from each other.

A sleep period in which neither the first process nor the fourth process is performed may be present between the first process and the fourth process, and a sleep period in which neither the second process nor the third process is performed may be present between the second process and the third process.

In an exemplary embodiment, the second device may execute a process of connecting to the third device having received the data transmitted in the first process, or a process of connecting to the third device having transmitted the data received in the fourth process. The third device may execute a process of connecting to the second device having transmitted the data received in the second process, or a process of connecting the second device having received the data transmitted in the third process.

Based on the above, the second device and the third device can connect to each other.

In an exemplary embodiment, the first device and the second device in the state of being connected to each other may repeatedly perform synchronous communication with each other. The second device may execute a communication control process for communicating wirelessly with the third device by avoiding timing when synchronous communication with the first device is executed.

Based on the above, the second device can repeatedly perform synchronization communication with the first device while communicating with the third device.

In an exemplary embodiment, the wireless system may execute an allowance period setting process for setting an allowance period regarding predetermined communication performed between the first device and the second device. The second device in the state of being connected to the first device may execute a determination process for determining, based on the allowance period, whether or not to execute predetermined communication with the first device, and may execute a communication control process for communicating wirelessly with the third device by avoiding timing when the predetermined communication to be executed according to the determination in the determination process is performed, so that the first device and the second device execute the predetermined communication to be executed according to the determination with each other.

Based on the above, the second device can communicate with the third device while avoiding the risk of terminating the connection with the first device.

Another configuration is a wireless system including a plurality of devices capable of performing wireless communication based on the Bluetooth Low Energy (BLE) standard, the wireless system including a first device, a second device, a fourth device, and a third device. The first device and the second device establish a connection between the first device and the second device such that the first device is a central and the second device is a peripheral, and perform wireless communication with each other based on the BLE standard. The fourth device and the third device establish a connection between the fourth device and the third device such that the fourth device is a central and the third device is a peripheral, and perform wireless communication with each other based on the BLE standard. The second device in a state where the connection between the first device and the second device is maintained, performs wireless communication based on the BLE standard with the third device in the state of being connected as a peripheral to the fourth device.

Another configuration may be a wireless device capable of performing wireless communication with a plurality of devices. The wireless device may execute: a connection establishment process for establishing a connection with a first device among the plurality of devices such that the first device is a master and the wireless device is a slave; and a communication process for, in the state of being connected as a slave to the first device, performing wireless communication with a third device in a state of being connected as a slave to a second device different from the first device. Further, another configuration may be a program to be executed by a processor of the wireless device.

Another configuration may be a program to be executed by a processor of the wireless device. Further, another configuration may be a communication method to be executed by the wireless system.

Another configuration may be a wireless system including a plurality of devices capable of performing wireless communication. The wireless system may include a first device and a second device. The first device and the second device establish a connection between the first device and the second device such that the first device is a master and the second device is a slave, and perform wireless communication with each other. The second device may execute: a transmission process for wirelessly transmitting data by broadcast or multicast; a reception process for receiving data wirelessly transmitted by broadcast or multicast; and an other device communication process for, in the state of being connected as a slave to the first device, repeatedly executing the transmission process and the reception process, thereby performing wireless communication with a third device different from the first device.

Another configuration may be a wireless device capable of performing wireless communication with a plurality of devices. The wireless device may execute: a connection establishment process for establishing a connection with a first device among the plurality of devices such that the first device is a master and the wireless device is a slave; a transmission process for wirelessly transmitting data by broadcast or multicast; a reception process for receiving data wirelessly transmitted by broadcast or multicast; and an other device communication process for, in the state of being connected as a slave to the first device, repeatedly executing the transmission process and the reception process, thereby performing wireless communication with a third device different from the first device.

Another configuration may be a wireless communications device comprising:
  a wireless radio transceiver, and
  a processor operatively coupled to the wireless radio transceiver, the processor configured to control the wireless communications device to:
    establish a connection as a slave to a master device, and
    in the state of being connected as a slave to the master device, wirelessly communicating with a further device connected as a slave to a further master device.

Another configuration may be a wireless communications device comprising:
  a wireless radio transceiver, and
  a processor operatively coupled to the wireless radio transceiver, the processor configured to control the wireless communications device to:
    establish a connection as a child to a parent device, and
    in the state of being connected as a child to the master device, wirelessly communicating with a further device connected as a child to a further parent device.

Another configuration may be a program to be executed by a processor of the wireless device. Further, another configuration may be a communication method to be executed by the wireless system.

According to the exemplary embodiment, a device connected as a slave can communicate with another device.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 3 is a diagram showing a list of channels used in the BLE standard;

FIG. 11 is a diagram showing the state where the connections between mobile terminals 10 (centrals) and the BLE terminals 20 (peripherals) are adjusted;

FIG. 12 is a diagram showing a state after FIG. 11, and is a diagram showing an example of the communication between the devices after the connections between the mobile terminals 10 (centrals) and the BLE terminals 20 (peripherals) are adjusted;

FIG. 14 is a diagram showing a state after FIG. 13, and is a diagram showing an example of communication in the state where the BLE terminal 20a and the BLE terminal 20b are connected together;

FIG. 15 is a diagram showing a specific example of the method for restricting communication between the BLE terminal 20a and the BLE terminal 20b;

FIG. 19 is a flow chart showing an example of the processing performed by the BLE terminal 20a;

DETAILED DESCRIPTION OF NON-LIMITING EXAMPLE EMBODIMENTS

With reference to the drawings, a wireless communication system according to an exemplary embodiment is described below. The wireless communication system according to the exemplary embodiment is a system including a plurality of devices capable of performing wireless communication, and each device performs communication based on, for example, the Bluetooth Low Energy (Bluetooth 4.x, hereinafter abbreviated as "BLE") standard. First, an overview of the BLE standard is described.

(Overview of BLE)

The BLE standard is a communication standard designed so that power consumption is lower than that in classic Bluetooth (registered trademark) (Ver.1.x-3.x). In BLE, the maximum transmission power is made smaller than that in classic Bluetooth, and the operating time of wireless communication and the number of operations are made smaller than those in classic Bluetooth, thereby reducing power consumption. In BLE, the time interval of communication is longer than that in classic Bluetooth, and this time interval can be changed. Further, similarly to classic Bluetooth, BLE employs a star network topology in which a plurality of slaves can connect to a single master.

Figure 1:
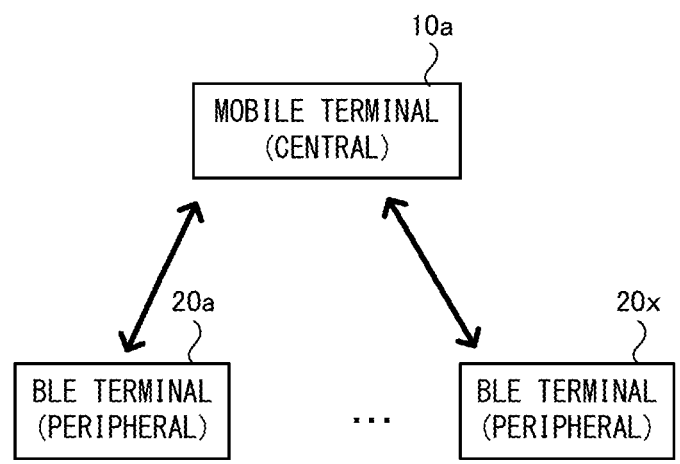
FIG. 1 is a diagram showing an example of a general BLE network.

FIG. 1 is a diagram showing an example of a general BLE network. As shown in FIG. 1, in the range where communication can be performed, a mobile terminal 10a and a BLE terminal 20 are present and form a network. In BLE, the range where communication can be performed is, for example, several to several tens of meters.

The mobile terminal 10a is, for example, a mobile information processing apparatus capable of executing a predetermined application, such as a mobile phone, a smartphone, or a tablet terminal. The mobile terminal 10a includes, for example, a CPU (or/and another processor), a RAM, a storage device (a non-volatile memory, a hard disk, or the like), a display device (a liquid crystal display device, an organic EL display device, or the like), an input section (a button, a touch panel, or the like), a BLE communication module for performing communication based on the BLE standard, and a battery. The CPU of the mobile terminal 10a can execute various application programs stored in the storage device (or acquired via the network). For example, the mobile terminal 10a can execute, as a predetermined application, various application programs such as an application capable of reproducing a moving image and a still image, a message application, a browser application, a game application, and an application for processing data acquired from the BLE terminal 20. The mobile terminal 10a can perform information processing more advanced than that of the BLE terminal 20, and therefore has power consumption higher than that of the BLE terminal 20.

The BLE terminal 20 is, for example, a mobile device and is typically a device smaller than the mobile terminal 10a. Typically, the BLE terminal 20 may only have a function more limited than that of the mobile terminal 10, and may be a device for performing relatively simple processing. It should be noted that the BLE terminal 20 may be a device for performing advanced information processing similar to that of the mobile terminal 10a.

Figure 2:
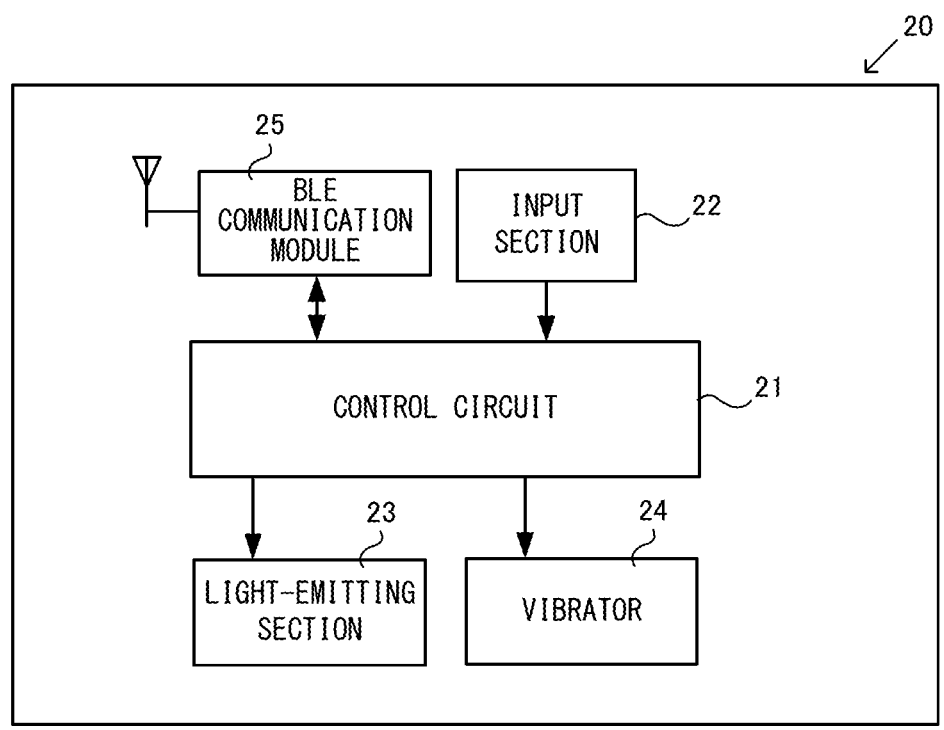
FIG. 2 is a block diagram showing an example of the internal configuration of a BLE terminal 20.

FIG. 2 is a block diagram showing an example of the internal configuration of the BLE terminal 20. As shown in FIG. 2, the BLE terminal 20 includes, for example, a control circuit 21, an input section 22, a light-emitting section 23, a vibrator 24, and a BLE communication module 25. The BLE terminal 20 is a relatively small mobile device and is a device having low power consumption. For example, the BLE terminal 20 can operate for a relatively long period (several months to several years) by a button cell. The components of the BLE terminal 20 may be implemented on the control circuit 21. For example, the BLE terminal 20 can transmit data corresponding to an input provided to the input section 22 to the mobile terminal 10a, using the BLE communication module 25, can receive data transmitted from the mobile terminal 10a, using the BLE communication module 25, to cause the light-emitting section 23 to emit light, and can vibrate the vibrator 24. It should be noted that the BLE terminal 20 may include a CPU or/and another processor for executing any application program. Further, the BLE terminal 20 may include a display, a touch panel, a loudspeaker, a microphone, a camera, and the like. For example, the BLE terminal 20 may exchange data according to an image and a sound with the mobile terminal 10a via the BLE communication module 25.

As shown in FIG. 1, the mobile terminal 10a functions as a central (referred to also as a "master") in the BLE network, and the BLE terminal 20 functions as a peripheral (referred to also as a "slave"). The mobile terminal 10a can establish connections with a plurality of BLE terminals 20 (20a, . . . , 20x) and serves as a central in each connection. A central manages the participation of a peripheral in the network and sets various parameters in the connection with a peripheral.

Here, in the BLE standard, radio waves in the 2.4 GHz band are used. Specifically, communication is performed using 40 channels. FIG. 3 is a diagram showing a list of channels used in the BLE standard. As shown in FIG. 3, among the 40 channels, three channels 37 to 39 are advertising channels, and the other channels 0 to 36 are data channels. An advertising channel is a channel used to find or connect a device, or used to notify another device of the presence of the device itself, or used to exchange data without establishing a connection with another device as described later. A data channel is a channel used in a connection state (the state of being connected) and is used by two devices in a connection state to transmit and receive data to and from each other. It should be noted that in classic Bluetooth, 79 channels are included, and 32 channels among the 79 channels are channels for finding.

Figure 4:
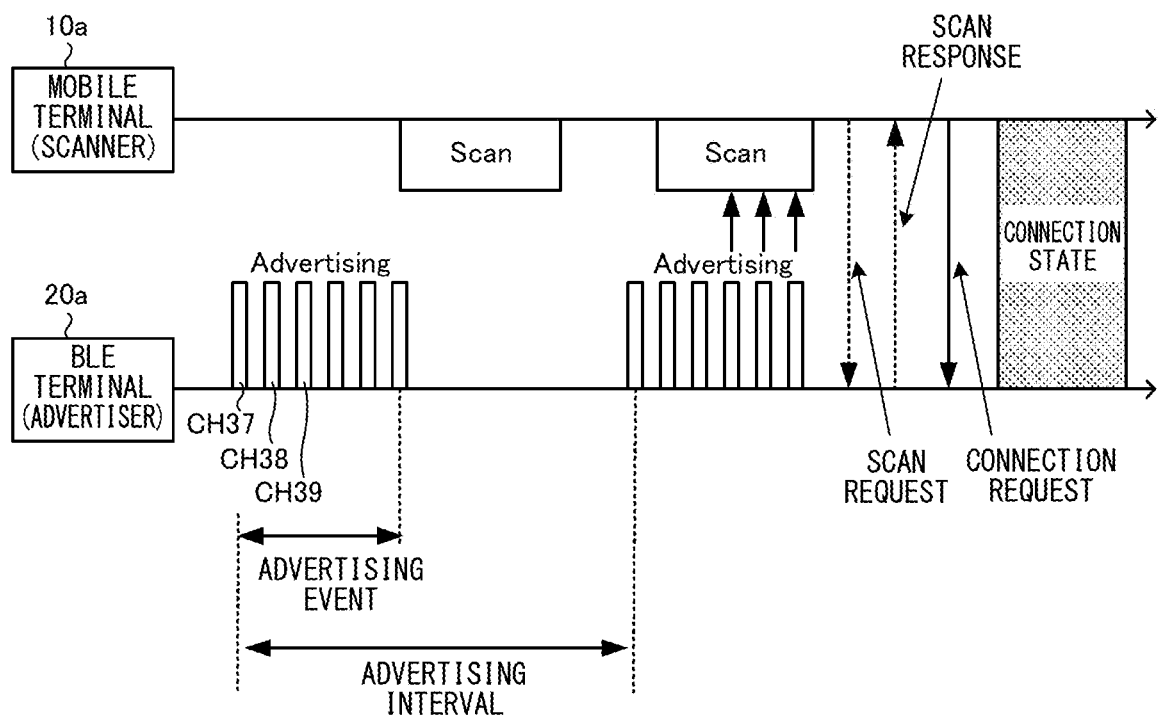
FIG. 4 is a diagram showing an example of the flow of communication in the period from the state where a mobile terminal 10a and a BLE terminal 20a are not connected together to the state where the mobile terminal 10a and the BLE terminal 20a are connected together.

FIG. 4 is a diagram showing an example of the flow of communication in the period from the state where the mobile terminal 10a and a BLE terminal 20a are not connected together to the state where the mobile terminal 10a and the BLE terminal 20a are connected together.

Each device changes its state in the period from the state of not being connected (a non-connection state) to a connection state. Specifically, as shown in FIG. 4, the mobile terminal 10a repeats a scan at a predetermined time interval. The state of performing a scan is referred to as a "scanning state", and the device in this state is referred to as a "scanner". Specifically, the mobile terminal 10a repeats a scan and a stopping state, and during the execution of a scan, causes a reception circuit to operate, thereby attempting to receive an advertising packet (an advertising PDU (protocol data unit)) from another device.

Meanwhile, the BLE terminal 20a repeats advertising at a predetermined time interval (an advertising interval). The state of performing advertising is referred to as an "advertising state", and the device in this state is referred to as an "advertiser". Specifically, in a single round of advertising (a single advertising event), the BLE terminal 20a transmits an advertising packet while switching between the three channels 37 to 39. As described above, an advertising packet is transmitted by switching the frequencies of radio waves. The switching of the frequencies of radio waves is referred to as "hopping".

As shown in FIG. 4, if the timing of a scan of the mobile terminal 10a and the timing of advertising of the BLE terminal 20a coincide with each other, the mobile terminal 10a receives an advertising packet from the BLE terminal 20a. If receiving the advertising packet from the BLE terminal 20a, the mobile terminal 10a transmits a scan request to the BLE terminal 20a. In response to the scan request, the BLE terminal 20a returns a scan response. The scan request and the scan response are also transmitted using the advertising channels. The method of a scan includes an "active scan" and a "passive scan", and FIG. 4 shows an example of the "active scan". In the "passive scan", a "scan request" and a "scan response" that are shown in FIG. 4 are not made. That is, in the passive scan, if receiving the advertising packet from the BLE terminal 20a, the mobile terminal 10a transmits a connection request to the BLE terminal 20a without transmitting a scan request.

To connect to a device having transmitted an advertising packet, the mobile terminal 10a enters an initiating state (an initiator). The mobile terminal 10a (the initiator) transmits a connection request to the BLE terminal 20a having transmitted the advertising packet. If the initiator transmits the connection request, a connection is established, and the two devices enter a connection state. Specifically, the two devices including the mobile terminal 10a as a master (a central) and the BLE terminal 20a as a slave (a peripheral) enter a connection state.

It should be noted that the connection request from the initiator includes a plurality of parameters for a connection. Specifically, the connection request includes the address of the initiator, the address of the advertiser, an access address, a connection interval, slave latency, information about hopping after that (the number of hops and information about the channels to be used), a connection supervision timeout, and the like. The access address is randomly determined to identify the connection. To transmit a packet to a connection partner, each device transmits the packet including this access address. Based on the access address, each device can determine whether or not the packet is from a connection partner. Further, the connection interval, the slave latency, and the connection supervision timeout will be described later. Further, after the connection request is made, pairing and bonding for exchanging cryptographic keys in the connection may be performed. In the pairing, a temporary cryptographic key for use in this connection is generated and exchanged. In the bonding, a permanent cryptographic key is generated and exchanged after the pairing. The permanent cryptographic key is stored in a non-volatile memory or the like in each device.

Normally, an advertising packet is transmitted by broadcast. That is, an unspecified device can receive the advertising packet. It should be noted that "broadcast" also includes data transmission that can be processed by limited unspecified devices. Here, the "limited unspecified devices" refers to a device that is not uniquely specified (a unique address assigned to the device is not specified), but has a common attribute or is in a common state. The "device having a common attribute" refers to, for example, a group of devices having a predetermined attribute such as the same model or the same vendor. To transmit an advertising packet to a device having such a predetermined attribute, for example, a device at the transmitting end transmits the advertising packet by including (or adding) information indicating a vendor or the model of a terminal (a vendor ID, a model number, or the like; hereinafter referred to as "attribute information") in (to) the advertising packet. If attribute information of a device at the receiving end matches the transmitted attribute information, the device at the receiving end processes the advertising packet. As described above, at the transmitting end, it is possible to transmit data to a limited unspecified device. On the other hand, the "device in a common state" refers to a group of devices in a predetermined state at a certain time, such as having the same current setting. For example, in an advertising packet to be transmitted, a flag indicating that the advertising packet can be processed only by a limited unspecified device is set to on. At the receiving end, the setting of whether or not to process this advertising packet for a limited unspecified device is made. A device that is set to process the advertising packet for an unspecified device receives the advertising packet and determines whether or not the above flag is set to on. If the flag is set to on, the device processes the advertising packet. On the other hand, a device that is not set to process the advertising packet for an unspecified device receives the advertising packet and determines whether or not the above flag is set to on. If the flag is set to on, the device discards the packet or does not process the packet. As described above, at the transmitting end, it is possible to transmit data to a limited unspecified device. Such transmission to "limited unspecified devices" and transmission to unlimited unspecified devices are both referred to as "broadcast" here. It should be noted that an advertising packet may be transmitted by so-called "multicast".

In addition, an advertising packet has a plurality of types. Specifically, the types of advertising packets include "ADV_IND", "ADV_DIRECT_IND", "ADV_NONCONN_IND", and "ADV_SCAN_IND". "ADV_IND" and "ADV_DIRECT_IND" are advertising packets indicating that a connection is possible. "ADV_IND" is used for normal advertising and is an advertising packet indicating that an unspecified device can be connected. Further, "ADV_ DIRECT_IND" is an advertising packet indicating that a particular device can be connected, and is used to connect at high speed to a device that has previously been connected. If receiving an advertising packet "ADV_IND" or "ADV_DIRECT_IND", the mobile terminal 10a transmits the above connection request to the BLE terminal 20a having transmitted the packet.

In addition, "ADV_NONCONN_IND" and "ADV_SCAN_IND" are advertising packets indicating that a connection is not possible. "ADV_NONCONN_IND" and "ADV_SCAN_IND" are used to transmit information (for example, data for use in an application or data such as position information) to an unspecified device.

It should be noted that generally, power consumption is higher in a scan than in advertising. This is because it is necessary to maintain the state where an advertising packet can be received at any timing (the reception circuit is caused to operate) during the execution of a scan. In contrast, in advertising, a plurality of advertising packets are transmitted in a single advertising event. However, a single advertising packet is transmitted in an extremely short time. Thus, even during the single advertising event, there is time when an advertising packet is not transmitted. When transmitting an advertising packet, the advertiser needs to cause a transmission circuit to operate, and also needs to output radio waves. Thus, power consumption becomes momentarily high. However, except when transmitting an advertising packet, the advertiser does not need to cause the transmission circuit to operate, or does not output radio waves. This reduces power consumption. Thus, power consumption in a certain period is higher in a scan than in advertising.

Figure 5:
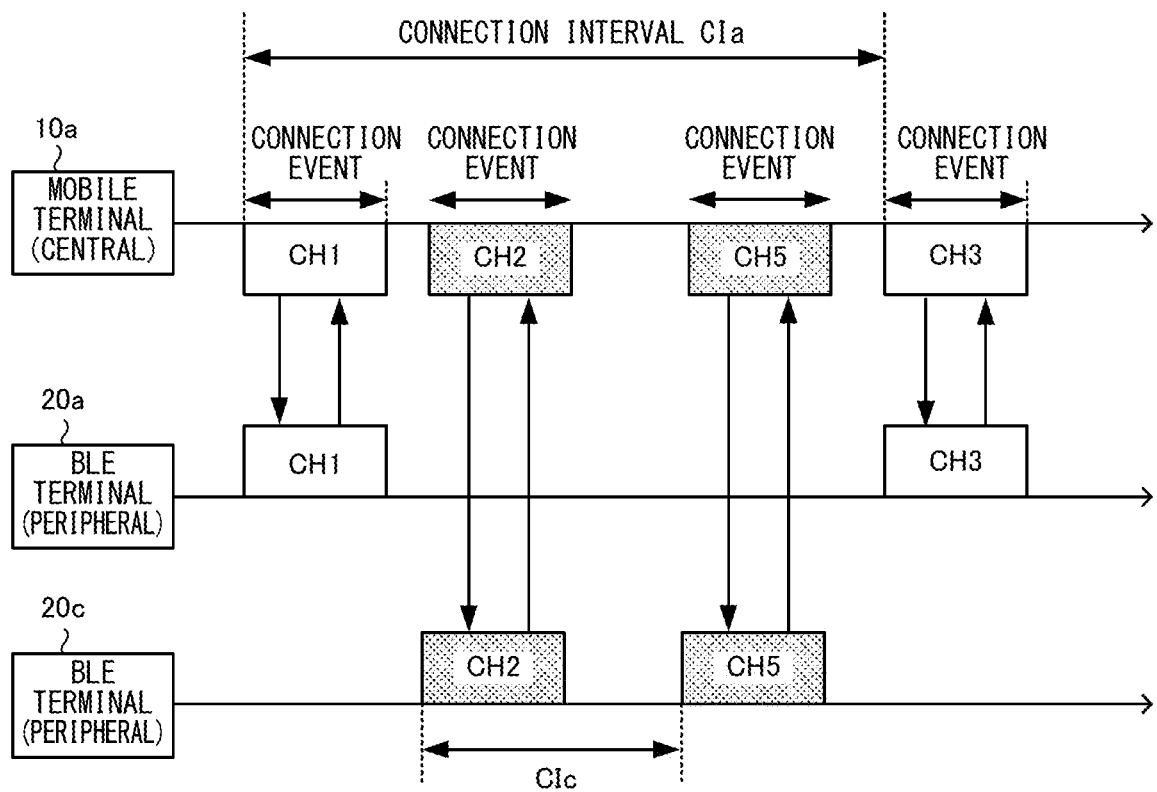
FIG. 5 is a diagram showing an example of communication between the mobile terminal 10a and the BLE terminal 20a in a connection state.

FIG. 5 is a diagram showing an example of communication between the mobile terminal 10a and the BLE terminal 20a in a connection state. As shown in FIG. 5, if two devices are in a connection state, synchronized communication (synchronous communication) termed a connection event is performed between the two devices at a predetermined time interval. The interval of the connection event is referred to as a "connection interval". The connection interval is set by a master when the connection is established. The connection interval in the connection between the mobile terminal 10a and the BLE terminal 20a is CIa (for example, 500 milliseconds). The connection interval may be set in the range of 7.5 milliseconds to 4 seconds.

In a single connection event, the mobile terminal 10a and the BLE terminal 20a transmit and receive data to and from each other using a single data channel (for example, a channel 1). If CIa elapses since the occurrence of a first connection event, the channel is switched, and a next connection event is performed. In the example shown in FIG. 5, the channel 1 is used in a first connection event, and a channel 3 is used in a second connection event. The number of channels to be hopped is referred to as "the number of hops". In the example shown in FIG. 5, the number of hops is "2". The number of hops is set when the connection between the mobile terminal 10a and the BLE terminal 20a is established.

A connection event is performed for each terminal having established a connection. For example, if the mobile terminal 10a is in the state of being connected also to a BLE terminal 20c, a connection event occurs at a predetermined time interval also between the mobile terminal 10a and the BLE terminal 20c. In the example shown in FIG. 5, the connection interval in the connection between the mobile terminal 10a and the BLE terminal 20c is CIc. If the mobile terminal 10a is connected to a plurality of BLE terminals 20, the mobile terminal 10a determines the timing of a first connection event so that connection events in all the connections do not temporally overlap each other.

Figure 6:
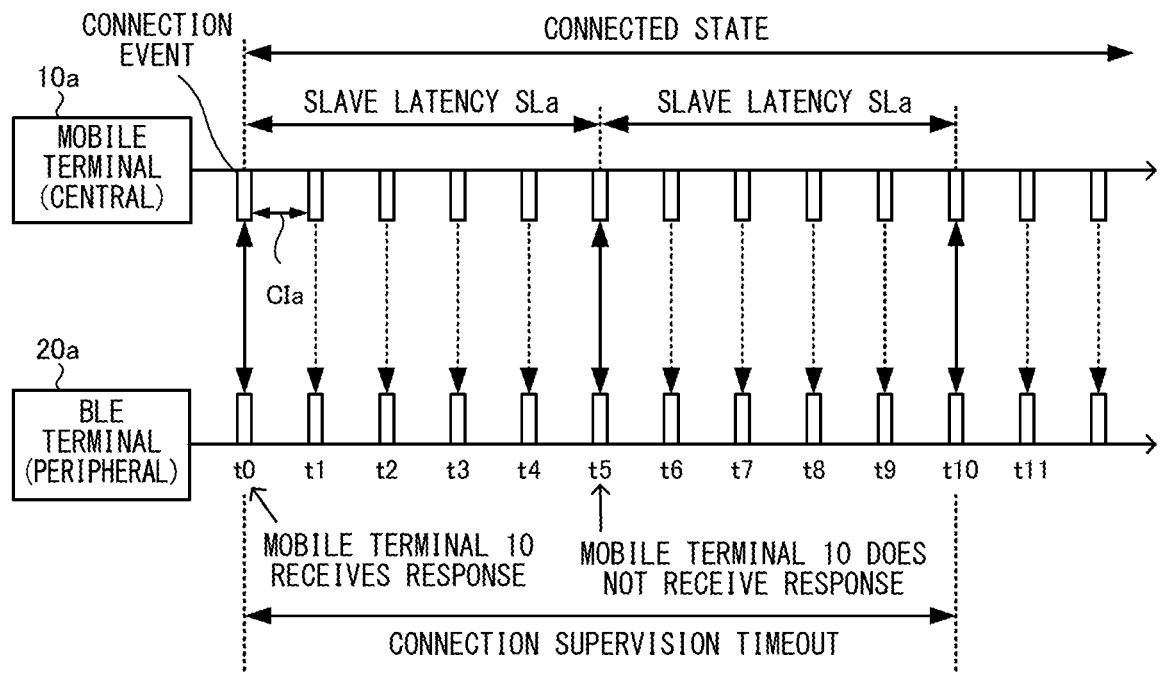
FIG. 6 is a diagram showing examples of communication in a connection state after a connection between the mobile terminal 10a and the BLE terminal 20a is established.

FIG. 6 is a diagram showing examples of communication in a connection state after a connection between the mobile terminal 10a and the BLE terminal 20a is established.

As shown in FIG. 6, in the state where the mobile terminal 10a and the BLE terminal 20a are connected together, the two devices perform communication in each connection event, and do not perform communication during a period other than a connection event. For example, each device does not cause the reception circuit and the transmission circuit to operate (if not communicating with the other device) in a period other than a connection event, and causes the reception circuit and the transmission circuit to operate at the timing of a connection event, thereby performing communication.

Specifically, if the connection interval (CIa) elapses since the timing of the previous connection event, the mobile terminal 10a transmits a packet to the BLE terminal 20a, and the BLE terminal 20a transmits a response to the packet to the mobile terminal 10a. Here, in each device, an error in measurement of time occurs, and therefore, the BLE terminal 20a, taking this error into account, attempts to receive a packet from the mobile terminal 10a for a predetermined period including the timing of a connection event. Specifically, the BLE terminal 20a causes the reception circuit to operate at timing before CIa elapses since the timing of the previous connection event (the timing when a packet has actually been received), thereby becoming able to receive a packet from the mobile terminal 10a. Further, the BLE terminal 20a is in the state of being able to receive a packet from the mobile terminal 10a also at timing after CIa elapses since the timing of the previous connection event. That is, taking the above error into account, the BLE terminal 20a enters the state of being able to receive a packet during periods before and after the time when a theoretical connection interval CIa elapses since the timing of the previous connection event. When a connection is established, time accuracy information of the mobile terminal 10a (a master) is transmitted from the mobile terminal 10a to the BLE terminal 20a. Based on the received accuracy information of the mobile terminal 10a and time accuracy information of the BLE terminal 20a itself, the BLE terminal 20a calculates the timing for causing the reception circuit to operate.

In a connection event, data (application data) for use in an application is transmitted and received. For example, the application data may be data of a game character and an item, the IDs of the game character and the item, text, a sign, data representing a content to be reproduced in the application (a moving image, a still image, or a sound) (the content per se and the ID of the content), data from various sensors, or the like. The application data may be transmitted in a single packet, or may be transmitted by dividing the application data into a plurality of packets. For example, in a device (the mobile terminal 10a or the BLE terminal 20a) having received the ID of a content, an application interprets the received ID and reproduces a content (a moving image, a still image, a sound, or the like) corresponding to the received ID. Data of the content corresponding to the ID may be stored in a storage device included in the device having received the ID, or may be stored outside the device. For example, the device having received the ID (the mobile terminal 10a or the BLE terminal 20a) transmits the ID to a server device different from the mobile terminal 10a and the BLE terminal 20a and downloads data of the content corresponding to the ID from the server device. Then, based on the downloaded data of the content, the content may be reproduced.

For example, to acquire application data from the BLE terminal 20a, in a connection event, the mobile terminal 10a transmits a data acquisition request to the BLE terminal 20a by including the data acquisition request in a data packet (a data PDU). The BLE terminal 20a transmits data corresponding to the acquisition request by including the data in a response packet. If the application data does not fit in a single packet, the BLE terminal 20a divides the application data and transmits the pieces of divided application data by including the pieces of divided application data in a plurality of response packets. Each response packet includes a piece of divided application data and a sequence number. The mobile terminal 10a arranges the pieces of divided application data in the order of sequence number, thereby reconstructing the application data. A connection event is thus performed multiple times, thereby transmitting application data of a size that does not fit in a single packet from the BLE terminal 20a to the mobile terminal 10a (or from the mobile terminal 10a to the BLE terminal 20a).

Here, slave latency is set for the connection between the mobile terminal 10a and the BLE terminal 20a. The slave latency is the number of connection events that the BLE terminal 20a (a peripheral) can ignore (skip). Normally, in each connection event, the mobile terminal 10a (a central) transmits a packet to the BLE terminal 20a, and in accordance with the reception of the packet, the BLE terminal 20a returns a response packet. Consequently, application data is exchanged. If, however, there is no data to be transmitted, the BLE terminal 20a may not need to return a response.

In the example shown in FIG. 6, slave latency SLa is set to "4". As shown in FIG. 6, in a connection event at a time t0, the mobile terminal 10a transmits a packet to the BLE terminal 20a, and in accordance with the packet, the BLE terminal 20a transmits a response packet to the mobile terminal 10a. In a connection event at a time t1 after CIa elapses, the mobile terminal 10a transmits a packet to the BLE terminal 20a, but the BLE terminal 20a may not need to transmit a response packet to the mobile terminal 10a. Further, also at next times t2, t3, and t4, the BLE terminal 20a may not need to transmit a response packet to the mobile terminal 10a. On the other hand, in a connection event at a time t5 after CIa elapses since the time t4, the BLE terminal 20a transmits a response packet to the mobile terminal 10a. Further, in connection events at subsequent times t6 to t9, the BLE terminal 20a may not need to transmit a response packet to the mobile terminal 10a, but in a connection event at a time t10, the BLE terminal 20a transmits a response packet to the mobile terminal 10a. It should be noted that in the connection events at the times t1 to t4 and t6 to t9, the BLE terminal 20a may transmit a response packet to the mobile terminal 10a. That is, the slave latency is the maximum number of times the BLE terminal 20a as a slave can successively ignore a connection event. As described above, there is a case where the mobile terminal 10a does not receive a packet from the BLE terminal 20a for a predetermined allowance period (the number of connection events indicated by the slave latency). It should be noted that this allowance period may be represented by the number of connection events as described above, or may be represented by time.

The slave latency can be considered as a right to ignore a response to the mobile terminal 10a (a central), the right given to the BLE terminal 20a (a peripheral). The BLE terminal 20a can determine, at its own discretion, whether or not to transmit a response to the mobile terminal 10a in each connection event. For example, if it is necessary to perform another type of processing or communicate with another device, the BLE terminal 20a can omit a response to the mobile terminal 10a. The BLE terminal 20a returns a response to the mobile terminal 10a in the range of the slave latency.

If between the mobile terminal 10a and the BLE terminal 20a do not communicate with each other for a predetermined period, the connection between the two devices is terminated (disconnected) (the two devices transition from the connection state to a non-connection state). The determination of whether or not to terminate the connection between the two devices is made based on the connection supervision timeout. Specifically, if the time elapsed since the previous communication has exceeded (or reached) the connection supervision timeout, the connection between the mobile terminal 10a and the BLE terminal 20a is terminated. Here, the connection supervision timeout is set to a value greater than slave latency SL. Thus, for example, in FIG. 6, even if the mobile terminal 10a does not receive a response packet from the BLE terminal 20a in the fifth connection event (t5), the mobile terminal 10a and the BLE terminal 20a do not immediately transition to a non-connection state. This is because it is also assumed that if the slave latency is set to "4", for example, and even if the BLE terminal 20a ignores four connection events (the connection events at t1 to t4) and transmits a response packet to the mobile terminal 10a in the fifth connection event (t5), the mobile terminal 10a cannot receive the response packet depending on the state of communication. If the mobile terminal 10a cannot receive the response packet transmitted from the BLE terminal 20a in the fifth connection event, and the connection between the mobile terminal 10a and the BLE terminal 20a is terminated, connections are frequently terminated. To prevent such a situation, the connection supervision timeout is set to a value greater than the slave latency SL, and if the period in which communication is not performed exceeds the connection supervision timeout, the two devices transition from the connection state to a non-connection state (the connection between the two devices is terminated).

Specifically, the mobile terminal 10a measures the time elapsed since the mobile terminal 10a has received a response packet, and if the period in which the mobile terminal 10a does not receive a response packet from the BLE terminal 20a exceeds the connection supervision timeout (or reaches the connection supervision timeout), the mobile terminal 10a transitions from the connection state to a non-connection state. Further, if the period in which the BLE terminal 20a does not receive a data packet from the mobile terminal 10a exceeds the connection supervision timeout (or reaches the connection supervision timeout), the BLE terminal 20a transitions from the connection state to a non-connection state (or the BLE terminal 20a measures the time elapsed since the BLE terminal 20a has transmitted a response packet to the mobile terminal 10, and if the period in which the BLE terminal 20a does not transmit a response packet to the mobile terminal 10a exceeds (or reaches) the connection supervision timeout, the BLE terminal 20a may transition from the connection state to a non-connection state). That is, if the period in which each of the mobile terminal 10a and the BLE terminal 20a does not receive a packet from the connection destination exceeds (or reaches) the connection supervision timeout, the mobile terminal 10a or the BLE terminal 20a transitions from the connection state to a non-connection state.

It should be noted that if the time elapsed since the previous communication has been measured, and if the period in which communication from the connection destination in a connection event cannot be confirmed exceeds (or reaches) the connection supervision timeout, the mobile terminal 10a or the BLE terminal 20a may not transition from the connection state to a non-connection state, and may determine that the connection is interrupted. For example, if it is determined that the connection is interrupted, the mobile terminal 10a and/or the BLE terminal 20a may transition to a connection interruption state. For example, if it is determined that the connection is interrupted, the BLE terminal 20a may transition to a state where the BLE terminal 20a attempts to receive a packet from the mobile terminal 10a but does not transmit a packet to the mobile terminal 10a. In this case, the timing of attempting to receive a packet may be, for example, an interval longer or shorter than the connection interval in the connection state, or may be random. Alternatively, if it is determined that the connection is interrupted, the BLE terminal 20a may transition to a state where the BLE terminal 20a does not attempt to receive a packet from the mobile terminal 10a but periodically or randomly transmits a packet to the mobile terminal 10a. Further, if it is determined that the connection is interrupted, for example, the mobile terminal 10a may transmit a packet to the BLE terminal 20a at an interval different from the connection interval set in the connection state (for example, an interval longer than the connection interval), or may transmit a packet to the BLE terminal 20a at randomly determined timing. Alternatively, if it is determined that the connection is interrupted, the mobile terminal 10a may not transmit a packet to the BLE terminal 20a but may attempt to receive a packet from the BLE terminal 20a. Then, the two devices having transitioned to an interruption state may return to the connection state again based on the fact that each device receives a packet from the other (even if the connection supervision timeout is exceeded or reached).

The connection supervision timeout is set to be twice "(SL+1)× connection interval" or more. For example, if the connection interval is set to 500 milliseconds, and the slave latency is set to 4, the connection supervision timeout may be set to 500 milliseconds×(4+1)×2=5 seconds. It should be noted that the connection supervision timeout may be determined by time, or may be determined by the number of connection events. For example, the connection interval is set to 500 milliseconds, and the slave latency is set to 4, the connection supervision timeout may be set to "(4+1)×2=10". In this case, the connection supervision timeout is "5 seconds" in terms of time. In this case, for example, in FIG. 6, even if the mobile terminal 10a does not receive a response packet from the BLE terminal 20a in the fifth connection event (t5), the connection events at t6 to t10 are executed (the connection between the two devices is maintained during this period). If the mobile terminal 10a receives a response packet from the BLE terminal 20a in the connection event at the time t10, the connection between the two devices is maintained. If, on the other hand, the mobile terminal 10a does not receive a response packet from the BLE terminal 20a in the fifth connection event (t5), and if the mobile terminal 10a does not receive a response packet from the BLE terminal 20a in the connection event at the time t10, either (that is, the mobile terminal 10a does not receive a response packet in all the connection events after t1), the connection between the two devices is terminated. It should be noted that the connection supervision timeout may be determined in the range of 100 milliseconds to 32 seconds, for example.

It should be noted that the defined range of the slave latency SL is 0 to 499, for example. The BLE standard, however, is time synchronization communication, and therefore, it is necessary to synchronize the two devices before the accumulated error of clocks of the two devices exceeds a certain value. A necessary communication interval taking into account the accumulated error of the clocks is termed an effective connection interval. The effective connection interval is represented by "(SL+1)× connection interval" and needs to be set to be half the connection supervision timeout or less. Thus, the maximum value of the slave latency is limited by the connection supervision timeout.

It should be noted that based on the slave latency, it may be determined whether or not to terminate the connection between the mobile terminal 10a and the BLE terminal 20a. For example, if the period in which the mobile terminal 10a does not receive a response packet from the BLE terminal 20a exceeds the slave latency (or the period reaches the slave latency), the mobile terminal 10a may terminate the connection with the BLE terminal 20a.

As described above, if there is no data to be transmitted to the mobile terminal 10, the BLE terminal 20 may not need to transmit a response packet to the mobile terminal 10 in the range of the slave latency. Further, even if the period in which the mobile terminal 10 does not receive a response packet from the BLE terminal 20 exceeds the slave latency, but if the period in which the mobile terminal 10 does not receive the response packet does not exceed the connection supervision timeout, the mobile terminal 10 does not terminate the connection with the BLE terminal 20. However, even if the period in which the mobile terminal 10 does not receive a response packet from the BLE terminal 20 does not exceed the connection supervision timeout, but if the period exceeds the slave latency, the clock error between the two devices may be accumulated, and the two devices may not be able to be synchronized. If the two devices cannot be synchronized, the mobile terminal 10 and the BLE terminal 20 cannot communicate with each other, and the connection is terminated. Thus, the BLE terminal 20 (a slave) transmits a response packet to the mobile terminal 10 so that the number of times the BLE terminal 20 successively ignores a connection event (the number of times the slave does not return a response packet to the master) does not exceed the slave latency SL. This makes it possible to synchronize the mobile terminal 10 and the BLE terminal 20 in an SL+1-th connection event from the previous communication at the latest. Thus, it is possible to avoid the risk of terminating the connection between the mobile terminal 10 and the BLE terminal 20.

It should be noted that in a connection event, the connection interval is changed, or the slave latency is changed, or the connection supervision timeout is changed. The connection interval is changed by the mobile terminal 10a (a central). The slave latency is changed based on a request from the BLE terminal 20a (a peripheral) (the request is included in a response packet). The BLE terminal 20a may transmit to the mobile terminal 10a a request to change the connection interval, and the mobile terminal 10a may change the slave latency. Further, both the mobile terminal 10a and the BLE terminal 20a may be able to make requests to change the connection interval, the slave latency, and the connection supervision timeout. In this case, to change the connection interval, priority may be given to the request from the mobile terminal 10a (a central). To change the slave latency, priority may be given to the request from the BLE terminal 20a (a peripheral). Meanwhile, also regarding a change in any of the connection interval, the slave latency, and the connection supervision timeout, priority may be given to the request from the device as a master (the mobile terminal 10a) over the device as a slave (the BLE terminal 20a).

As described with reference to FIGS. 4 to 6, the BLE terminal 20 performs advertising for repeatedly broadcasting an advertising packet for a connection. As an example, the BLE terminal 20 remains in a reception state for a while immediately after performing advertising (to receive a connection request or the like from the mobile terminal 10). If receiving the advertising packet, the mobile terminal 10 transmits a connection request to the BLE terminal 20. The connection request includes various parameters for a connection (the connection interval, the slave latency, and the like). If the mobile terminal 10 transmits the connection request, a connection between the mobile terminal 10 and the BLE terminal 20 is established, and the two devices enter a connection state.

In the connection state, at the timing of a connection event, the mobile terminal 10 causes the transmission circuit to operate and transmits a data packet to the BLE terminal 20. That is, if the timing of a connection event arrives, the mobile terminal 10a transmits a data packet to the BLE terminal 20a. Specifically, the mobile terminal 10a transmits a data packet including an access address determined when the connection is established. In synchronization with the mobile terminal 10, the BLE terminal 20 causes the reception circuit to operate to receive a packet from the mobile terminal 10. In accordance with the reception of a packet from the mobile terminal 10, the BLE terminal 20 transmits to the mobile terminal 10 a response to the packet. This response packet also includes the access address. Here, the BLE terminal 20 can ignore a packet from the mobile terminal 10 the number of times determined based on the slave latency. To ignore a packet from the mobile terminal 10 in a certain connection event, the BLE terminal 20 may not cause the reception circuit to operate at the timing of the connection event. If the period in which a response is not received from the BLE terminal 20 does not exceed the connection supervision timeout, the mobile terminal 10 maintains the connection with the BLE terminal 20. If, on the other hand, the period in which a response is not received from the BLE terminal 20 exceeds (or reaches) the connection supervision timeout, the mobile terminal 10 terminates the connection with the BLE terminal 20 and enters a non-connection state. In the non-connection state, a connection event does not occur between the two devices. If the BLE terminal 20 performs advertising again, and the mobile terminal 10 transmits a connection request, the non-connection state transitions to a connection state again.

As described above, when a connection is established between two devices, a connection request is made (parameters for a connection are exchanged), and the two devices enter a connection state. If the two devices are in the connection state, the two devices communicate with each other at a predetermined time interval. If the two devices are in a connection state, the two devices communicate with each other based on information exchanged when the connection is established. The connection state is maintained until the connection is terminated (for example, the period in which a response is not received from the BLE terminal 20 exceeds the connection supervision timeout). If a user or an application gives an instruction to terminate the connection in the mobile terminal 10, the connection between the two devices may be terminated. On the other hand, in a "non-connection state", the above connection event does not occur. It should be noted that even in a non-connection state, two devices may communicate with each other by performing broadcast using an advertising packet.

(BLE Network According to Exemplary Embodiment)

Figure 7:
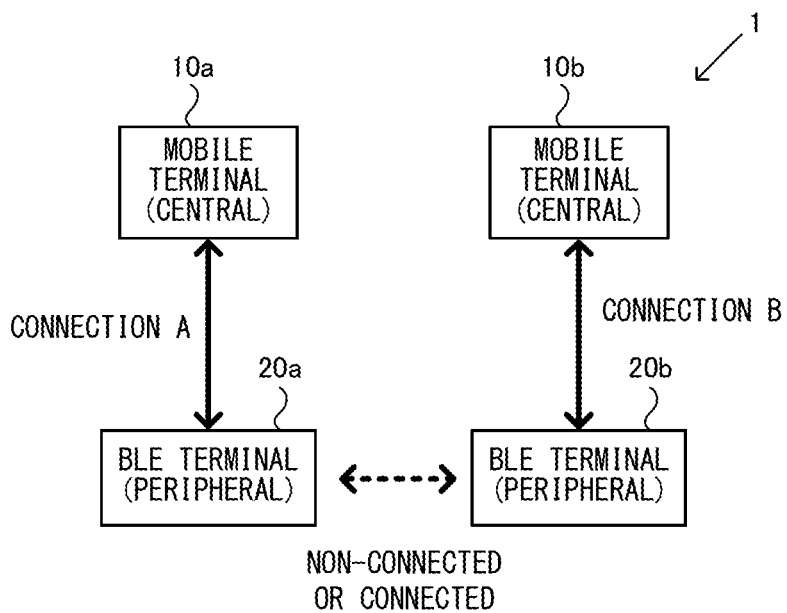
FIG. 7 is a diagram showing an example of the connection form of the BLE network according to an exemplary embodiment.

Next, the connection form of the BLE network according to the exemplary embodiment is described. FIG. 7 is a diagram showing an example of the connection form of the BLE network according to the exemplary embodiment.

As shown in FIG. 7, a wireless device system 1 according to the exemplary embodiment includes a plurality of devices capable of performing wireless communication based on the BLE standard and includes a mobile terminal 10a, a mobile terminal 10b, a BLE terminal 20a, and a BLE terminal 20b. In FIG. 7, the mobile terminal 10a and the BLE terminal 20a are in the state of being connected together such that the mobile terminal 10a serves as a central, and the BLE terminal 20a serves as a peripheral (a connection A). Further, the mobile terminal 10b and the BLE terminal 20b are in the state of being connected together such that the mobile terminal 10b serves as a central, and the BLE terminal 20b serves as a peripheral (a connection B).

In the exemplary embodiment, in the state as shown in FIG. 7, if the BLE terminal 20a and the BLE terminal 20b are present in the range where communication can be performed, the BLE terminal 20a and the BLE terminal 20b can communicate with each other. Specifically, the BLE terminal 20a and the BLE terminal 20b can establish a connection between these two devices and communicate with each other in a connection state. Further, the BLE terminal 20a and the BLE terminal 20b can also communicate with each other in a non-connection state. For example, the BLE terminal 20a can communicate with the BLE terminal 20b without an instruction from the mobile terminal 10a as a master. Further, based on a request from an application layer of the mobile terminal 10a or a user operation on the mobile terminal 10a, the mobile terminal 10a may give an instruction to the BLE terminal 20a, and in accordance with the instruction, the BLE terminal 20a and the BLE terminal 20b may communicate with each other.

First, a description is given of the case where the BLE terminal 20a and the BLE terminal 20b communicate with each other in the state of not being connected together.

Figure 8:
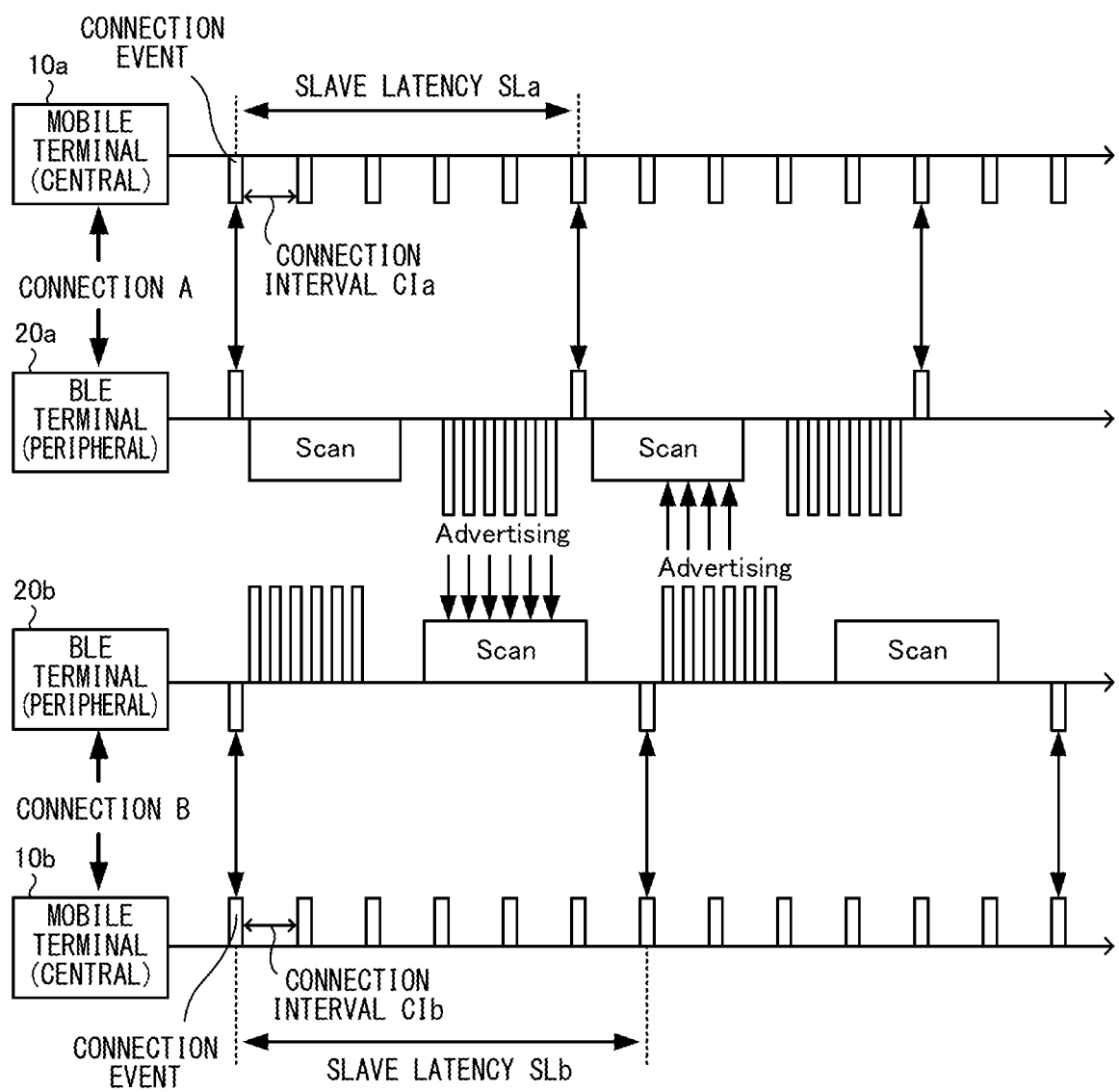
FIG. 8 is a diagram showing an example of the case where the BLE terminal 20a and a BLE terminal 20b communicate with each other in the state of not being connected together.

FIG. 8 is a diagram showing an example of the case where the BLE terminal 20a and the BLE terminal 20b communicate with each other in the state of not being connected together.

As shown in FIG. 8, the mobile terminal 10a and the BLE terminal 20a are in the state of being connected together, and a connection event occurs at each connection interval CIa. The connection interval CIa in the connection A between the mobile terminal 10a and the BLE terminal 20a may be, for example, 500 milliseconds. Further, slave latency SLa is set for the connection A between the mobile terminal 10a and the BLE terminal 20a, and for example, SLa="4".

In addition, the mobile terminal 10b and the BLE terminal 20b are in the state of being connected together, and a connection event occurs at each connection interval CIb. The connection interval CIb in the connection B between the mobile terminal 10b and the BLE terminal 20b may be, for example, 500 milliseconds. Further, slave latency SLb is set for the connection B between the mobile terminal 10b and the BLE terminal 20b, and for example, SLb="5".

In such a state, the BLE terminal 20a and the BLE terminal 20b repeatedly execute advertising and a scan. Here, as an example, the type of advertising is the above "ADV_NONCONN_IND". That is, an advertising packet indicating that a connection is not possible is transmitted between the BLE terminal 20a and the BLE terminal 20b. Consequently, the BLE terminal 20a transmits data to the BLE terminal 20b, and the BLE terminal 20b transmits data to the BLE terminal 20a.

Specifically, to avoid the risk of terminating the connection A with the mobile terminal 10a, the BLE terminal 20a communicates with the mobile terminal 10a in the slave latency SLa, and on the other hand, repeatedly executes a scan and advertising while not communicating with the mobile terminal 10a, thereby attempting to communicate with the BLE terminal 20b. For example, the BLE terminal 20a returns a response to the mobile terminal 10a in a connection event in the connection A with the mobile terminal 10a and then does not return a response to the mobile terminal 10a in the next four connection events. In the period when the four connection events are performed, the BLE terminal 20a repeatedly executes a scan and advertising, thereby attempting to communicate with the BLE terminal 20b. That is, the BLE terminal 20a ignores a plurality of connection events such that the slave latency SLa is the upper limit. Then, during the ignored connection events, the BLE terminal 20a repeatedly executes a scan and advertising to communicate with the BLE terminal 20b. As shown in FIG. 8, a stopping period is provided between a scan and advertising. It should be noted that a scan and advertising may be alternately performed with a stopping period therebetween (FIG. 8), or a scan and advertising may be alternately performed without a stopping period therebetween (not shown). Further, a scan and advertising may not necessarily need to be alternately performed.

Similarly, to avoid the risk of terminating the communication B with the mobile terminal 10b, the BLE terminal 20b communicates with the mobile terminal 10b, and on the other hand, repeatedly executes a scan and advertising while not communicating with the mobile terminal 10b. For example, the BLE terminal 20b returns a response to the mobile terminal 10b in a connection event in the connection B with the mobile terminal 10b and then repeatedly executes a scan and advertising without returning a response to the mobile terminal 10b in the next five connection events.

If the timing of a scan and the timing of advertising of the BLE terminals 20a and 20b coincide with each other, the BLE terminals communicate with each other. For example, if the BLE terminal 20b executes advertising while the BLE terminal 20a executes a scan, the BLE terminal 20b transmits data to the BLE terminal 20a. Conversely, if the BLE terminal 20a executes advertising while the BLE terminal 20b executes a scan, the BLE terminal 20a transmits data to the BLE terminal 20b. As described above, the BLE terminals 20 can communicate with each other even in the states of being connected as slaves to other devices (the mobile terminals 10).

It should be noted that hereinafter, each mobile terminal 10 will occasionally be referred to as a "parent", and each BLE terminal 20 will occasionally be referred to as a "child". The "parent" means the same as a central (a master), and the "child" means the same as a peripheral (a slave). Further, the connection between each mobile terminal 10 and each BLE terminal 20 will occasionally be referred to as a "parent-to-child connection", and the communication between the BLE terminal 20a and the BLE terminal 20b will occasionally be referred to as "child-to-child communication".

Here, if the timing of a scan and the timing of advertising of the BLE terminals 20 do not coincide with each other, the BLE terminals 20 cannot communicate with each other. For example, if the BLE terminal 20b does not perform advertising while the BLE terminal 20a executes a scan, the BLE terminal 20a cannot receive data from the BLE terminal 20b.

The BLE terminal 20a and the BLE terminal 20b repeatedly execute a scan and advertising at regular time intervals, and the lengths of a scan and advertising are fixed, the timing of a scan (or advertising) of the BLE terminal 20a and the timing of advertising (or a scan) of the BLE terminal 20b do not coincide with each other, and the two devices may remain incapable of communicating with each other. In response, in the exemplary embodiment, to match the timing of a scan (or advertising) of the BLE terminal 20a and the timing of advertising (or a scan) of the BLE terminal 20b, the execution periods (the lengths of the execution period) of a scan and advertising to be executed by each BLE terminal 20 are randomly changed.

Figure 9:
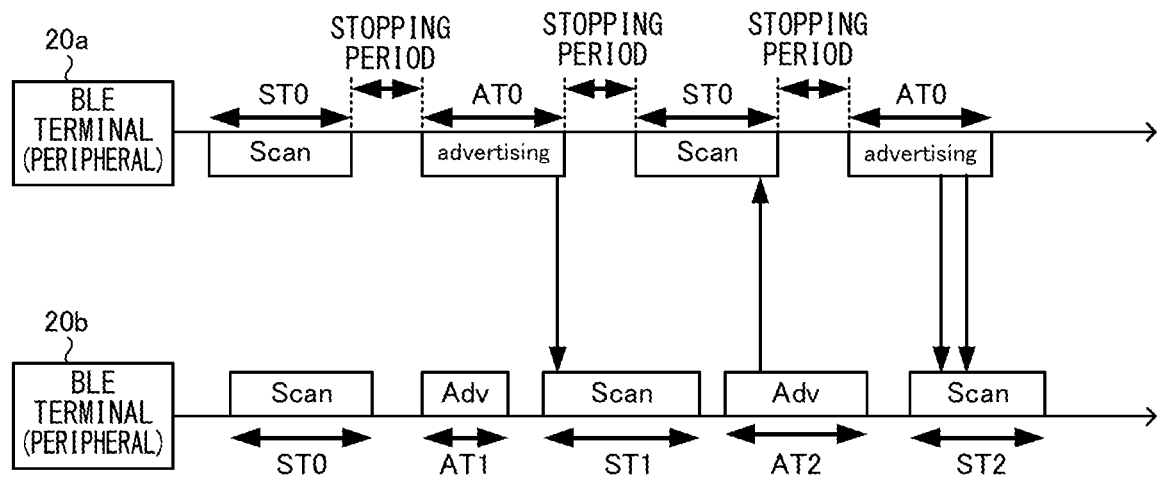
FIG. 9 is a diagram showing the state where the execution periods of a scan and advertising to be executed by the BLE terminal 20 change.

FIG. 9 is a diagram showing the state where the execution periods of a scan and advertising to be executed by the BLE terminals 20 change.

For illustrative purposes, FIG. 9 shows an example of the case where the execution periods of a scan and advertising to be executed by the BLE terminal 20a are fixed, and the execution periods of a scan and advertising to be executed by the BLE terminal 20b are variable.

As shown in FIG. 9, the BLE terminal 20a repeatedly executes a scan and advertising, and an execution period ST0 of a scan and an execution period AT0 of advertising are fixed. Further, a stopping period in which neither a scan nor advertising is performed is also fixed. In contrast, in the BLE terminal 20b, the execution period of a scan and the execution period of advertising are random. For example, the execution period of a first scan is ST0, the execution period of a second scan is ST1 (> ST0), and the execution period of a third scan is ST2. Further, the execution period of first advertising is AT1, and the execution period of second advertising is AT2 (> AT1). Further, in the example shown in FIG. 9, the stopping period is also random in the BLE terminal 20b. As described above, the execution period of a scan, the execution period of advertising, and the stopping period change, whereby the execution period of a scan (or advertising) of the BLE terminal 20a overlaps the execution period of advertising (or a scan) of the BLE terminal 20b. Consequently, the BLE terminal 20a and the BLE terminal 20b communicate with each other.

It should be noted that in FIG. 9, an example has been described where the execution period of a scan, the execution period of advertising, and the stopping period are randomly changed. Alternatively, at least any one of the execution period of a scan, the execution period of advertising, and the stopping period may randomly change. It should be noted that these periods may be determined based on a random number that is completely random, or may be determined based on a so-called pseudorandom number (a random number from which some regularity cannot be removed). These random numbers may be generated by hardware or software. Further, the execution period of a scan and the execution period of advertising may be fixed, and the execution timing of a scan and/or the execution timing of advertising may be variable. That is, at least any of the execution period (the length of the execution period) of a scan, the execution period of advertising, the stopping period, the execution timing of a scan, and the execution timing of advertising may be variable. Further, the execution period of a scan, the execution period of advertising, and the stopping period may be changed in a certain pattern. Further, the stopping period may be provided as part of a reception process or a transmission process.

Figure 10:
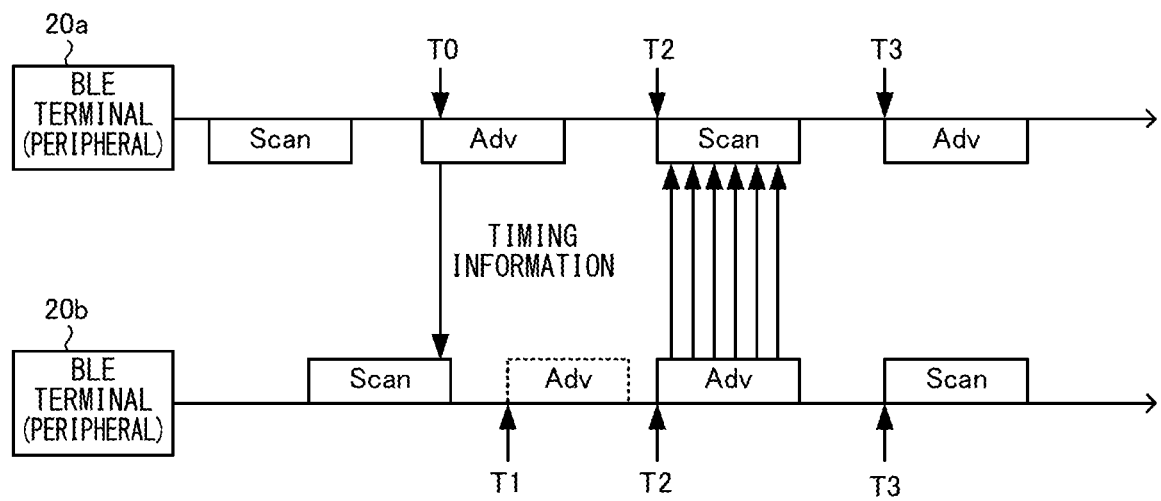
FIG. 10 is a diagram illustrating a method in which one of the BLE terminals 20 transmits information indicating the execution timing of a scan and/or advertising, thereby adjusting the execution timing of a scan and/or advertising.

In addition, the BLE terminals may exchange information regarding a scan and/or advertising, thereby adjusting the execution period and the execution timing of a scan and/or advertising. FIG. 10 is a diagram illustrating a method in which one of the BLE terminals 20 transmits information indicating the execution timing of a scan and/or advertising, thereby adjusting the execution timing of a scan and/or advertising.

As shown in FIG. 10, for example, an advertising packet from the BLE terminal 20a includes timing information indicating the timing when the BLE terminal 20a executes advertising and/or a scan next. Receiving the advertising packet from the BLE terminal 20a, then based on the timing information included in the advertising packet, the BLE terminal 20b adjusts the execution timing of advertising and/or a scan to be executed next. In the example shown in FIG. 10, it is assumed that if the BLE terminal 20b does not receive the advertising packet from the BLE terminal 20a, the BLE terminal 20b performs advertising at timing T1 after a first scan. In this case, in accordance with the reception of the advertising packet from the BLE terminal 20a, the BLE terminal 20b performs next advertising at timing T2. Specifically, the advertising packet from the BLE terminal 20a at timing T0 includes "T2" as information indicating the timing when the BLE terminal 20a executes a scan next. Further, the BLE terminal 20a may transmit "T3" by including, in the advertising packet at the timing T0, "T3" as information indicating the timing when the BLE terminal 20a itself executes advertising next. The BLE terminal 20b performs advertising in time with the timing T2 of a scan to be executed next by the BLE terminal 20a. Further, in accordance with the information from the BLE terminal 20a, the BLE terminal 20b may perform a scan in time with the timing T3. This makes it possible to match the execution timing of a scan of the BLE terminal 20a and the execution timing of advertising of the BLE terminal 20b. This enables the BLE terminal 20b to transmit data to the BLE terminal 20a. An advertising packet to be transmitted from the BLE terminal 20b also includes timing information indicating the execution timing of next advertising and/or a next scan. It should be noted that in accordance with the reception of an advertising packet from the BLE terminal 20a, the BLE terminal 20b transmits a scan request to the BLE terminal 20b, and in accordance with the scan request, the BLE terminal 20b transmits a scan response. This scan response may include the above timing information.

As described above, each BLE terminal 20 transmits information indicating the timing for executing advertising and/or a scan next time or later, by including the information in an advertising packet. This enables the BLE terminals 20 to adjust the execution timing of advertising and/or a scan so that while one device executes advertising, the other device executes a scan. It should be noted that the BLE terminal 20 may transmit information indicating the execution period (the length of the execution period) of advertising and/or a scan, by including the information in an advertising packet. Based on an advertising packet received from another device, the BLE terminal 20 can adjust the timing for executing advertising and/or a scan next time or later and the execution period (the length of the execution period) of advertising and/or a scan next time or later.

As described above, the BLE terminals 20 adjust the execution timing of advertising and/or a scan, whereby it is possible to efficiently perform communication between the BLE terminals. If each BLE terminal 20 randomly determines the execution timing and the execution period of advertising and a scan, the two devices cannot communicate with each other unless the execution period of advertising of one device accidentally overlaps the execution period of a scan of the other device. In the example shown in FIG. 10, however, each BLE terminal 20 adjusts the timing of advertising and a scan so that the execution period of advertising of one device overlaps the execution period of a scan of the other device. This enables the two devices to efficiently communicate with each other.

Next, a description is given of the adjustment of the connections (parent-to-child connections) between the mobile terminals 10 and the BLE terminals 20 for performing communication between the BLE terminals 20.

FIG. 11 is a diagram showing the state where the connections between the mobile terminals 10 (centrals) and the BLE terminals 20 (peripherals) are adjusted.

The mobile terminal 10a and the BLE terminal 20a are in the state of being connected together, and the mobile terminal 10b and the BLE terminal 20b are in the state of being connected together. The connection interval CIa in the connection A between the mobile terminal 10a and the BLE terminal 20a is, for example, 500 milliseconds, and the slave latency SLa is, for example, "4". The connection interval CIb in the connection B between the mobile terminal 10b and the BLE terminal 20b is, for example, 500 milliseconds, and the slave latency SLb is, for example, "5".

As shown in FIG. 11, the BLE terminal 20a and the BLE terminal 20b repeatedly execute advertising and a scan, thereby communicating with each other. Here, if the BLE terminal 20a does not return a response to the mobile terminal 10a in a connection event in the connection A at timing Ta1, the number of times the BLE terminal 20a ignores a connection event exceeds the slave latency SLa in the connection A with the mobile terminal 10a. Thus, the BLE terminal 20a communicates with the mobile terminal 10a at the timing Ta1. While communicating with the mobile terminal 10a, the BLE terminal 20a performs neither advertising nor a scan. Further, the BLE terminal 20b also communicates with the mobile terminal 10b at timing Tb1, and on the other hand, performs neither advertising nor a scan so that the number of times the BLE terminal 20b ignores a connection event does not exceed the slave latency SLb in the connection B with the mobile terminal 10b.

As described above, the BLE terminals 20 (peripherals) preferentially perform communication with the mobile terminals 10 (centrals). This enables the BLE terminals 20 to communicate with the mobile terminal 10 at least in the range of the slave latency. However, this reduces the efficiency of the communication between the BLE terminals 20. In response, in the exemplary embodiment, to increase the efficiency of the communication between the BLE terminals 20 while performing communication between the mobile terminals 10 and the BLE terminals 20 in the range of the slave latency, the timing of the communication between the mobile terminals 10 and the BLE terminals 20 is adjusted. Specifically, timing Ta of communication between the mobile terminal 10a and the BLE terminal 20a (the timing when the BLE terminal 20a returns a response packet to the mobile terminal 10a) and timing Tb of communication between the mobile terminal 10b and the BLE terminal 20b (the timing when the BLE terminal 20b returns a response packet to the mobile terminal 10b) are adjusted to be close to each other.

For example, based on the connection interval CIa, the number of times the BLE terminal 20a ignores a connection event, and the slave latency SLa, the BLE terminal 20a can calculate timing Ta2 when the BLE terminal 20a transmits a response packet to the mobile terminal 10a next. Next, the BLE terminal 20a transmits information indicating timing Ta2 for performing communication the mobile terminal 10a, by including the information in an advertising packet. If the BLE terminal 20b receives the advertising packet, the BLE terminal 20b performs communication with the mobile terminal 10b (transmits a response packet to the mobile terminal 10b) at timing Tb2, which is close to the timing Ta2. Here, even if the BLE terminal 20b does not communicate with the mobile terminal 10b at the timing Tb2, the number of times the BLE terminal 20b ignores a connection event is in the range of the slave latency SLb. Thus, the BLE terminal 20b does not need to communicate with the mobile terminal 10b at the timing Tb2. However, based on the information indicating the timing Ta2 received from the BLE terminal 20a, the BLE terminal 20b communicates with the mobile terminal 10b without performing a scan and advertising for communication with the BLE terminal 20a at the timing Tb2.

As described above, the timing of communication between the mobile terminals 10 and the BLE terminals 20 is adjusted.

FIG. 12 is a diagram showing a state after FIG. 11, and is a diagram showing an example of the communication between the devices after the connections between the mobile terminals 10 (centrals) and the BLE terminals 20 (peripherals) are adjusted. After the adjustment as shown in FIG. 11 is made, then as shown in FIG. 12, the timing (Ta3 to Ta5) of communication between the mobile terminal 10a and the BLE terminal 20a comes close to the timing (Tb3 to Tb5) of communication between the mobile terminal 10b and the BLE terminal 20b. In the example shown in FIG. 12, before the slave latency SLb arrives, the BLE terminal 20b performs communication with the mobile terminal 10b. This enables the BLE terminals 20 to efficiently communicate with each other while returning a response packet to the mobile terminal 10 in the range of the slave latency, thereby avoiding the risk of terminating the connection with the mobile terminal 10.

Figure 13:
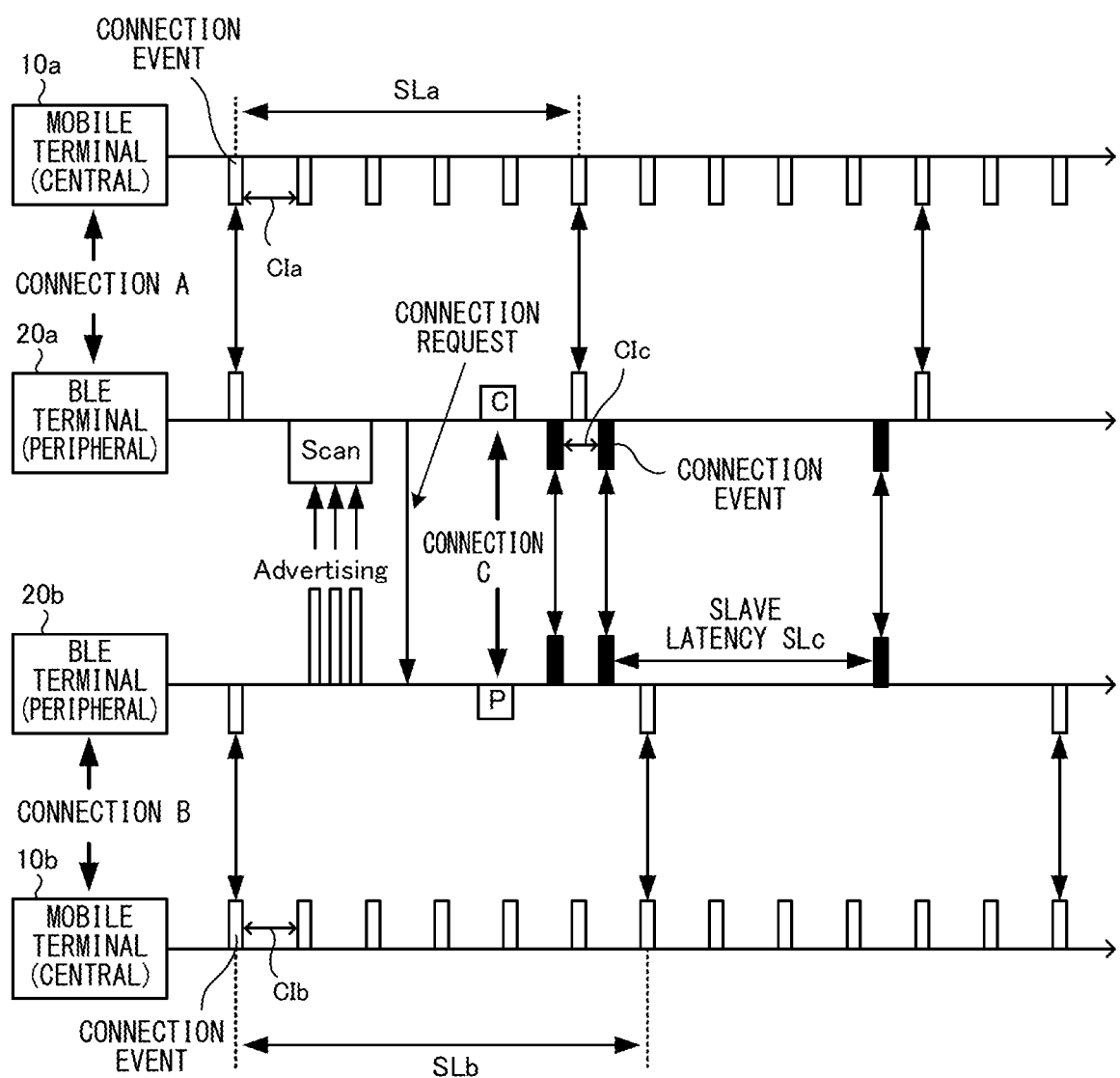
FIG. 13 is a diagram showing an example of the state where, when the mobile terminals 10 and the BLE terminals 20 are connected together, the BLE terminals 20 establish a connection with each other.

Next, a description is given of the case where the BLE terminals 20 establish a connection with each other and communicate with each other in a connection state. FIG. 13 is a diagram showing an example of the state where, when the mobile terminals 10 and the BLE terminals 20 are in the state of being connected together, the BLE terminals 20 establish a connection with each other.

As shown in FIG. 13, similarly to FIG. 11, the mobile terminal 10a and the BLE terminal 20a are in the state of being connected together, and the mobile terminal 10b and the BLE terminal 20b are in the state of being connected together. In this state, the BLE terminal 20a and the BLE terminal 20b repeatedly execute a scan and advertising as shown in FIG. 8. As described above, the execution periods of a scan and advertising to be repeatedly performed randomly change (see FIG. 9). As shown in FIG. 13, for example, while the BLE terminal 20a executes a scan, the BLE terminal 20b broadcasts to an unspecified device an advertising packet indicating that a connection is possible ("ADV_IND"). The BLE terminal 20a receives the advertising packet. In response to this, the BLE terminal 20a transmits a connection request to the BLE terminal 20b. Then, a connection C (a child-to-child connection) between the BLE terminal 20a and the BLE terminal 20b is established such that the BLE terminal 20a serves as a central (a master), and the BLE terminal 20b serves as a peripheral (a slave). In a child-to-child connection, both the BLE terminal 20a and the BLE terminal 20b can be centrals, but the scanner (the initiator) becomes a central. Thus, in the example of FIG. 13, the BLE terminal 20a becomes a central in the connection C with the BLE terminal 20b.

When the connection C between the BLE terminal 20a and the BLE terminal 20b is established, then similarly to the above, a connection interval CIc and slave latency SLc are determined. For example, as a slave latency SLc, "4" is determined. The connection interval CIc in the connection C between the BLE terminal 20a and the BLE terminal 20b may be determined in accordance with the connection interval CIa (or CIb) in the parent-to-child connection.

For example, the BLE terminal 20a may set as CIc a value (for example, 250 milliseconds) smaller than the connection interval CIa in the connection A between the mobile terminal 10a and the BLE terminal 20a. CIc is set to be shorter than CIa, whereby it is possible to frequently perform communication between the BLE terminal 20a and the BLE terminal 20b. Thus, the BLE terminal 20a and the BLE terminal 20b can exchange more information. Conversely, the BLE terminal 20a may set as CIc a value (for example, 1 second) greater than CIa. In this case, it is possible to perform communication between the mobile terminal 10a and the BLE terminal 20a more preferentially.

In addition, the slave latency SLc in the connection C between the BLE terminal 20a and the BLE terminal 20b may be determined in accordance with SLa (or SLb) in the parent-to-child connection. For example, the BLE terminal 20a may determine as SLc a value greater than SLa. Conversely, the BLE terminal 20a may determine as SLc a value smaller than SLa. Further, the BLE terminal 20a may set CIc and/or SLc based on CIa and SLa in the connection A. Further, the BLE terminal 20a may determine CIc and/or SLc in accordance with the state of communication in the connection with the mobile terminal 10a (the above CIa, SLa, the amount of communication in the connection A with the mobile terminal 10a, the state of radio waves in the connection A with the mobile terminal 10a, and the like).

FIG. 14 is a diagram showing a state after FIG. 13, and is a diagram showing an example of communication in the state where the BLE terminal 20a and the BLE terminal 20b are connected together.

As shown in FIG. 14, in the state where the BLE terminal 20a and the BLE terminal 20b are connected together, a connection event in the connection C between the BLE terminal 20a and the BLE terminal 20b repeatedly occurs, and the two devices transmit and receive data to and from each other. Here, while the mobile terminal 10a and the BLE terminal 20a communicate with each other, the BLE terminal 20a restricts communication with the BLE terminal 20b. That is, at the timing when a connection event occurs in the connection A with the mobile terminal 10a, the BLE terminal 20a preferentially communicates with the mobile terminal 10a, and does not communicate with the BLE terminal 20b. Similarly, while the mobile terminal 10b and the BLE terminal 20b communicate with each other, the BLE terminal 20b restricts communication with the BLE terminal 20a. That is, the BLE terminal 20 gives priority to the parent-to-child communication over the child-to-child communication. The period in which communication between the BLE terminal 20a and the BLE terminal 20b is restricted is a period in the range of the slave latency SLc. As described above, communication between the BLE terminal 20a and the BLE terminal 20b is restricted in the range of the slave latency SLc, whereby it is possible to avoid the risk of terminating the connection C between the BLE terminal 20a and the BLE terminal 20b, while avoiding the risk of terminating the connection A between the mobile terminal 10a and the BLE terminal 20a and the connection B between the mobile terminal 10b and the BLE terminal 20b.

FIG. 15 is a diagram showing a specific example of the method for restricting communication between the BLE terminal 20a and the BLE terminal 20b.

As shown in FIG. 15, in a connection event at timing Tc1 before the timing Ta when the BLE terminal 20a communicates with the mobile terminal 10a, the BLE terminal 20a changes the connection interval to CIc2, which is longer than currently set CIc. In the connection C between the BLE terminal 20a and the BLE terminal 20b, the BLE terminal 20a is a central, and therefore, the BLE terminal 20a can freely change the connection interval CIc. If the connection interval is changed from CIc to CIc2, the next connection event in the connection C between the BLE terminal 20a and the BLE terminal 20b occurs after communication with the mobile terminal 10a (communication at the timing Ta) is performed. Thus, while the mobile terminal 10a and the BLE terminal 20a communicate with each other, it is possible to prevent the BLE terminal 20a from communicating with the BLE terminal 20b. As described above, the BLE terminal 20a can optionally change the current connection interval so that the timing of a connection event in the connection A with the mobile terminal 10a as a parent does not overlap the timing of a connection event in the connection C with the BLE terminal 20b (for example, to give priority to a connection event in the connection A with the mobile terminal 10a).

In addition, if the mobile terminal 10b and the BLE terminal 20b perform communication with each other, the BLE terminal 20b does not communicate with the BLE terminal 20a, and preferentially communicates with the mobile terminal 10b. In the example shown in FIG. 15, to communicate with the mobile terminal 10b, the BLE terminal 20b skips a connection event in the connection C between the BLE terminal 20a and the BLE terminal 20b only once. Since the slave latency SLc in the connection C between the BLE terminal 20a and the BLE terminal 20b is "4", the BLE terminal 20b can skip a single connection event. In the next connection event (timing Tc2) in the connection C between the BLE terminal 20a and the BLE terminal 20b, the BLE terminal 20a notifies the BLE terminal 20b that the connection interval is to be changed back from CIc2 to CIc.

It should be noted that the BLE terminal 20b can change the slave latency SLc in the connection C. For example, if it is determined that it is necessary to avoid communicating with the BLE terminal 20a for a period longer than the current slave latency SLc, the BLE terminal 20b transmits to the BLE terminal 20a a request to change the slave latency SLc in a connection event in the connection C. For example, if the BLE terminal 20b needs to transmit a large amount of data to the mobile terminal 10b, the BLE terminal 20b transmits to the BLE terminal 20a a request to change the slave latency so that SLc is longer than the current slave latency SLc. Further, the BLE terminal 20b may transmit to the BLE terminal 20a a request to change the connection interval so that CIc is longer than the current slave latency CIc.

As described above, the connection interval CIc and the slave latency SLc in the connection C between the BLE terminal 20a and the BLE terminal 20b are changed, whereby it is possible to restrict communication between the BLE terminal 20a and the BLE terminal 20b. This makes it possible to give priority to the communication between the mobile terminals 10 and the BLE terminals 20 over the communication between the BLE terminals 20, and perform parent-to-child communication in the range of the slave latency. For example, if it is difficult to maintain the connection with the mobile terminal 10a, the BLE terminal 20a may terminate the connection state with the BLE terminal 20b. That is, if it is difficult to maintain the parent-to-child connection, the child-to-child connection may be terminated. The determination of whether or not it is difficult to maintain the parent-to-child connection may be made based on, for example, the slave latency in the parent-to-child connection, the intensity of radio waves in the parent-to-child connection, an error rate, and the like. For example, if the number of times the BLE terminal 20 ignores a connection event in the connection with the mobile terminal 10 exceeds the slave latency SL, the BLE terminal 20 may determine that it is difficult to maintain the parent-to-child connection (the risk of terminating the parent-to-child connection is high). Alternatively, if the number of times the BLE terminal 20 ignores a connection event exceeds "SL+ predetermined number", the BLE terminal 20 may determine that it is difficult to maintain the parent-to-child connection. Further, if it is necessary to exchange a large amount of data between a parent and a child in a short time, the BLE terminal 20 may change CIc and SLc, thereby avoiding performing child-to-child communication. For example, if the mobile terminal 10a executes a predetermined application (for example, a game application), and the mobile terminal 10a and the BLE terminal 20b need to frequently communicate with each other, the BLE terminal 20a may preferentially communicate with the mobile terminal 10a (may avoid communicating with the BLE terminal 20b).

Figure 16:
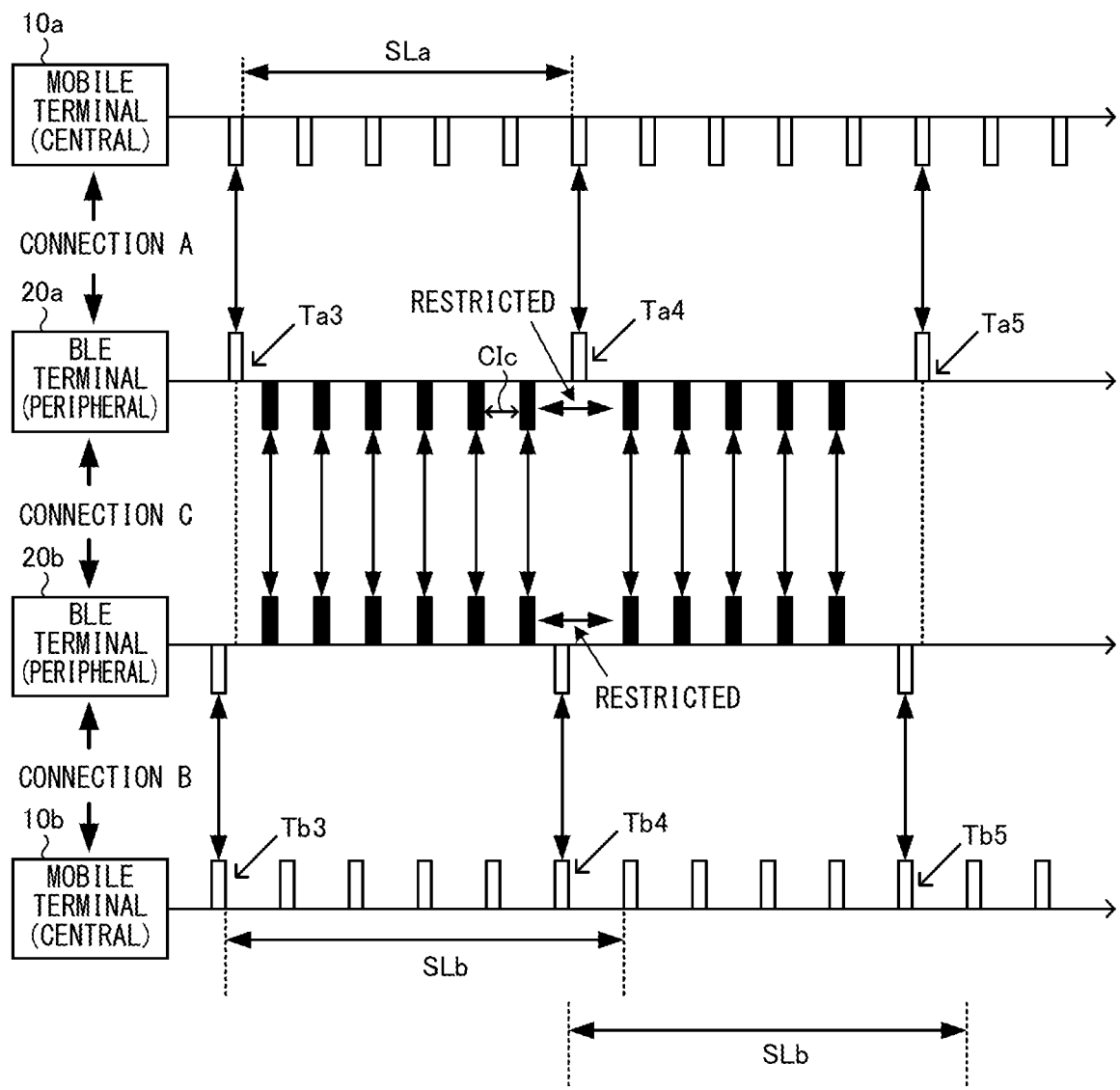
FIG. 16 is a diagram showing an example of communication in the case where, when the BLE terminal 20a and the BLE terminal 20b are connected together, the connections between the mobile terminals 10 and the BLE terminals 20 are adjusted.

FIG. 16 is a diagram showing an example of communication in the case where, when the BLE terminal 20a and the BLE terminal 20b are connected together, the connections between the mobile terminals 10 and the BLE terminals 20 are adjusted.

As shown in FIG. 16, the BLE terminal 20a and the BLE terminal 20b are in the state of being connected together, and a connection event in the child-to-child connection C occurs at each connection interval CIc. Further, as described with reference to FIG. 12, the timing (Ta3 to Ta5) of communication between the mobile terminal 10a and the BLE terminal 20a and the timing (Tb3 to Tb5) of communication between the mobile terminal 10b and the BLE terminal 20b are adjusted and almost coincide with each other. In this case, the BLE terminal 20a (20b) restricts child-to-child communication for a predetermined period including the timing for performing communication with the mobile terminal 10a (10b). The timing (Ta3 to Ta5) when the BLE terminal 20a communicates with the mobile terminal 10a and the timing (Tb3 to Tb5) when the BLE terminal 20b communicates with the mobile terminal 10b almost coincide with each other. Thus, both the children restrict child-to-child communication almost at the same timing. Such adjustment is made, thereby enabling the BLE terminals 20 to avoid the risk of terminating the connections with the mobile terminals 10, while efficiently communicating with each other.

[Details of Processing by Each Device]

(Processing by Mobile Terminal 10)

Figure 17:
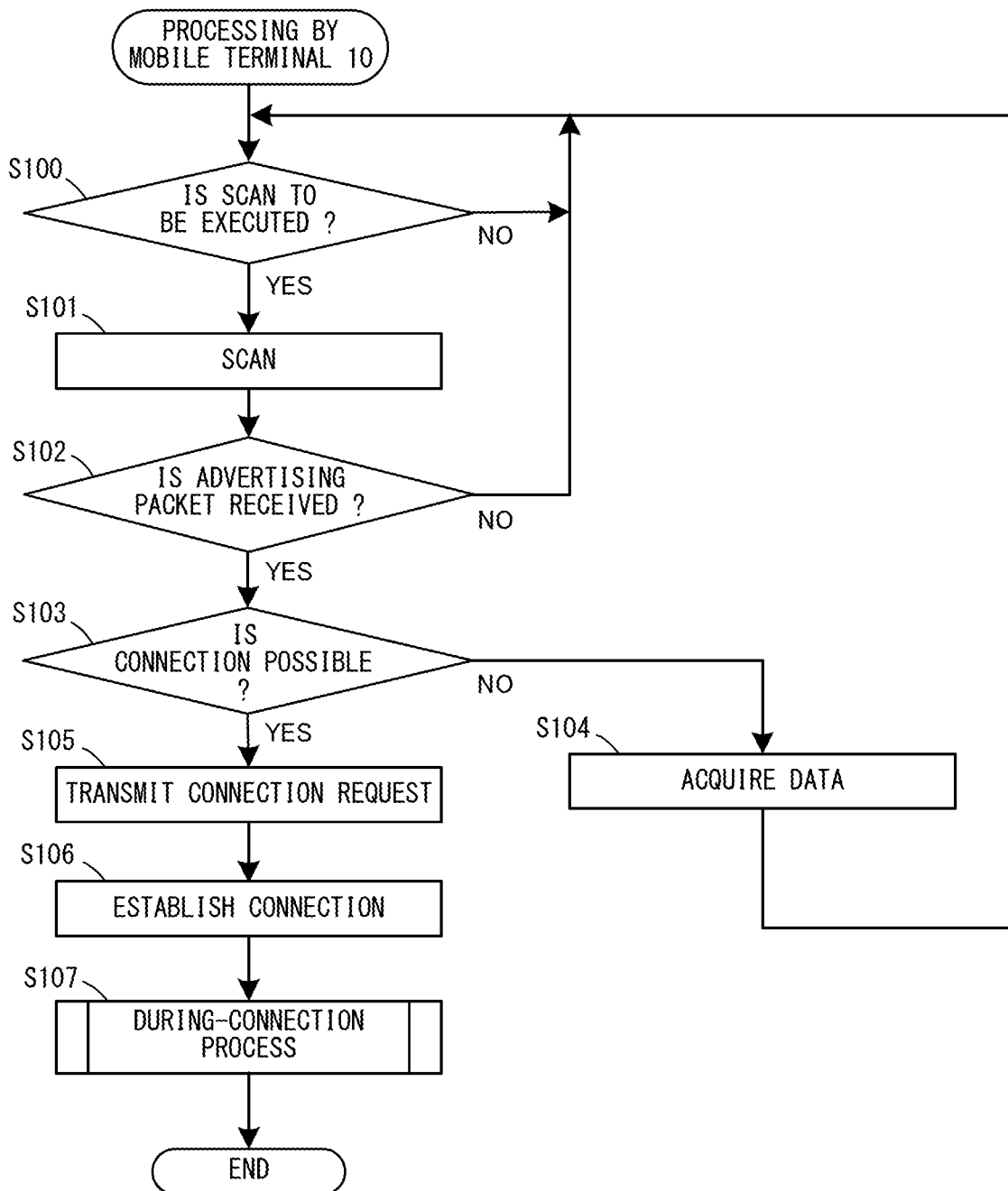
FIG. 17 is a flow chart showing an example of the processing performed by the mobile terminal 10.
Figure 18:
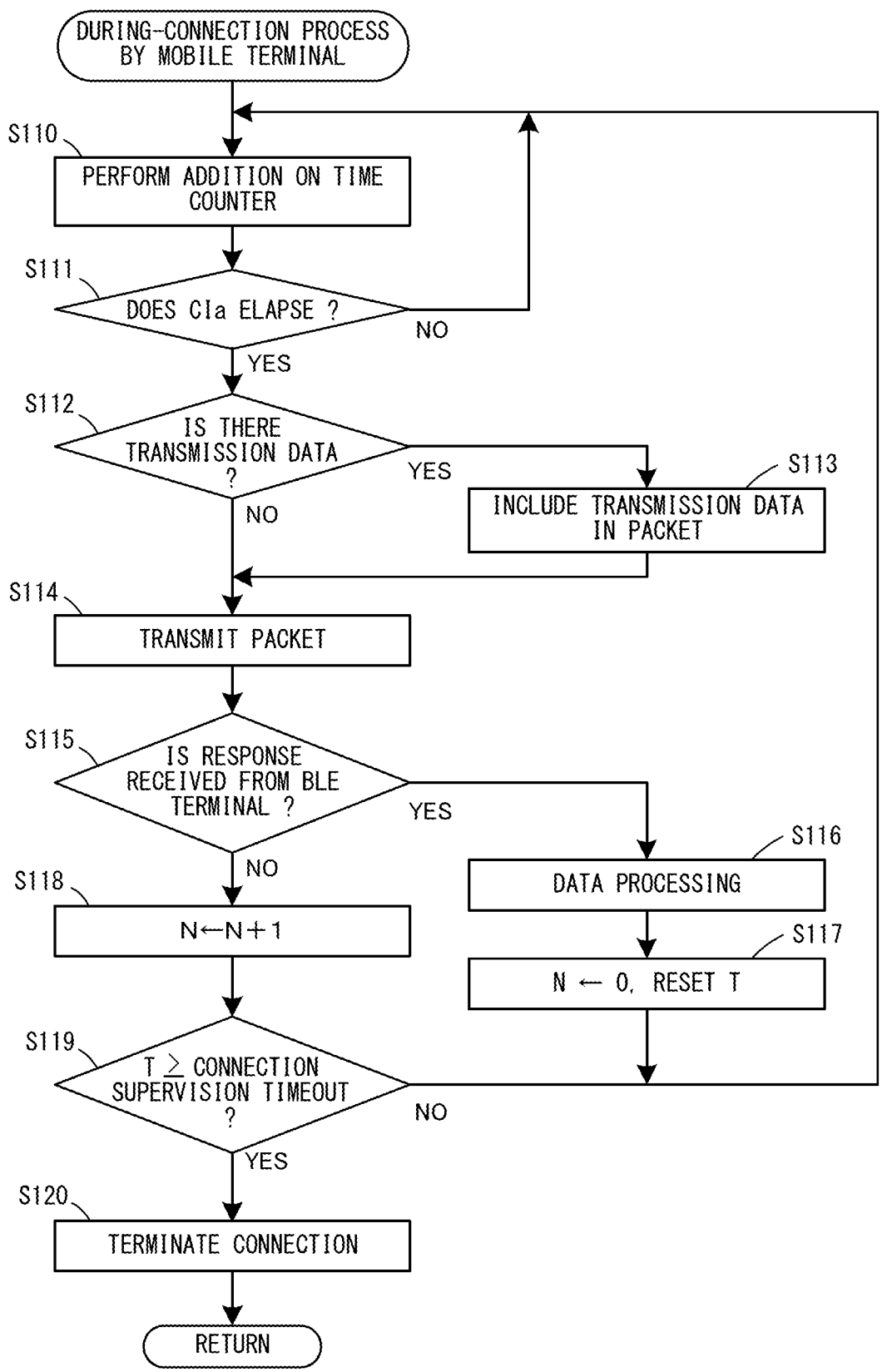
FIG. 18 is a detailed flow chart of step S108 in FIG. 17.

Next, a description is given of the details of the processing performed by the mobile terminal 10 and the BLE terminal 20. FIG. 17 is a flow chart showing an example of the processing performed by the mobile terminal 10. FIG. 18 is a detailed flow chart of step S108 in FIG. 17. The mobile terminal 10 includes a processor for performing the processing shown in FIGS. 17 and 18, and the processor is implemented as a BLE communication module. It should be noted that a description is given below on the assumption that the BLE communication module (the processor) of the mobile terminal 10 performs the processing shown in FIGS. 17 and 18. Alternatively, part or all of the processing shown in FIGS. 17 and 18 may be performed by the CPU of the mobile terminal 10 or another processor executing a communication program.

A description is given below of the case where a connection is established between the mobile terminal 10a and the BLE terminal 20a. A similar flow also holds true for a connection between the mobile terminal 10b and the BLE terminal 20b.

As shown in FIG. 17, first, (the BLE communication module of) the mobile terminal 10a determines whether or not the timing for executing a scan arrives (step S100). If it is determined that the timing for executing a scan arrives (step S100: YES), the mobile terminal 10a executes a scan (step S101). Specifically, the mobile terminal 10a executes a scan while switching between the three channels 37 to 39. The mobile terminal 10a may execute a scan at regular time intervals, or may randomly determine the timing for executing a scan and the length of time of the execution of a scan. If it is determined that the timing for executing a scan does not arrive (step S100: NO), the mobile terminal 10a performs the process of step S100 again.

After step S101, the mobile terminal 10a determines whether or not an advertising packet is received from an advertiser (the BLE terminal 20a) (step S102). If an advertising packet is not received (step S102: NO), the mobile terminal 10a executes the process of step S100 again.

If it is determined in step S102 that an advertising packet is received from an advertiser, then based on the received advertising packet, the mobile terminal 10a determines whether or not the advertising packet indicates that a connection is possible (step S103). Specifically, in step S103, the mobile terminal 10a determines whether or not the received advertising packet is "ADV_IND" or "ADV_DIRECT_IND".

If it is not determined that the advertising packet indicates that a connection is possible (step S103: NO), the mobile terminal 10a acquires data included in the advertising packet (step S104). Specifically, if the type of the advertising packet is "ADV_NONCONN_IND", the mobile terminal 10a acquires data included in the advertising packet.

If it is determined that the advertising packet indicates that a connection is possible (step S103: YES), the mobile terminal 10a transmits a connection request to the BLE terminal 20a having transmitted the advertising packet (step S105). This connection request includes information such as the address of the mobile terminal 10a, the address of the BLE terminal 20a, an access address, the connection interval CIa, the slave latency SLa, the number of hops, and the connection supervision timeout. As described above, the access address is used to identify a connection and is randomly determined for each connection by the mobile terminal 10a. It should be noted that if the type of the received advertising packet is "ADV_SCAN_IND", the mobile terminal 10a transmits a scan request to the advertiser having transmitted the advertising packet. If receiving a scan response to the scan request, then in step S105, the mobile terminal 10a transmits a connection request.

After transmitting the connection request, the mobile terminal 10a establishes a connection A with the BLE terminal 20a (step S106).

After step S106, the mobile terminal 10a performs a during-connection process (step S107). The process of step S107 is a process for performing communication in the connection A between the mobile terminal 10a and the BLE terminal 20a and is repeatedly executed while the mobile terminal 10a and the BLE terminal 20a maintain a connection state. With reference to FIG. 18, a description is given below of the details of the during-connection process performed by the mobile terminal 10a.

As shown in FIG. 18, the mobile terminal 10a performs addition on a time counter (step S110). Specifically, the mobile terminal 10a performs the process of step S110 at regular time intervals and increases the time counter by 1 every time the mobile terminal 10a performs the process of step S110. Based on the value of the time counter, the mobile terminal 10a determines whether or not the connection interval CIa elapses since the previous connection event has been executed (step S111).

If it is determined that the connection interval CIa elapses since the previous connection event (step S111: YES), the mobile terminal 10a executes processing (steps S112 to 120) related to a connection event in the connection A with the BLE terminal 20a. Specifically, the mobile terminal 10a determines whether or not there is transmission data to be transmitted to the BLE terminal 20a (step S112). For example, if the mobile terminal 10a needs to acquire application data from the BLE terminal 20a in accordance with a request from an application, the determination is YES in step S112. Further, if the mobile terminal 10a needs to transmit application data to the BLE terminal 20a, the determination is YES in step S112.

If the determination is YES in step S112, the mobile terminal 10a includes the transmission data in a packet (step S113). For example, to acquire application data from the BLE terminal 20a, the mobile terminal 10a includes, as the transmission data in a packet, an acquisition request for acquiring data from the BLE terminal 20a.

If the process of step S113 is executed, or if the determination is NO in step S112, the mobile terminal 10a transmits a packet to the BLE terminal 20a (step S114). Specifically, the mobile terminal 10a transmits a data packet to the BLE terminal 20a using any of the data channels 0 to 36. If the process of step S113 is executed, the payload of the packet includes application data. If the process of step S113 is not executed, the payload does not include data. It should be noted that this data packet includes the access address randomly determined when the connection is established. Based on the access address, the BLE terminal 20a can receive a data packet from the mobile terminal 10a. Further, if the mobile terminal 10a changes the connection interval CIa, information about new CIa is included in a packet and transmitted to the BLE terminal 20a.

After step S114, the mobile terminal 10a determines whether or not a response packet is received from the BLE terminal 20a in the connection state (step S115). If a response packet is received from the BLE terminal 20a (step S115: YES), the mobile terminal 10a processes received data (step S116). Here, if receiving data corresponding to the acquisition request from the BLE terminal 20a, (the BLE communication module of) the mobile terminal 10a transfers the data to the application.

After the process of step S116, the mobile terminal 10a sets a variable N to "0" and also resets a variable T (step S117), and then returns to step S110 again. Here, "N" indicates the number of connection events in which a response packet is not received from the BLE terminal 20a in the connection A between the mobile terminal 10a and the BLE terminal 20a. That is, "N" indicates the number of times the BLE terminal 20a ignores (skips) a connection event. Further, the variable "T" is a variable indicating the time elapsed since the mobile terminal 10a has received a response packet from the BLE terminal 20a. Using the variable "T", the mobile terminal 10a determines whether or not to terminate the connection with the BLE terminal 20a. For example, a number may be added to "T" in accordance with the lapse of time, or 1 may be added to "T" every time the process of step S110 is performed.

If, on the other hand, a response packet is not received from the BLE terminal 20a (step S115: NO), the mobile terminal 10a adds 1 to "N" (step S118). Then, the mobile terminal 10a determines whether or not "T" is equal to or greater than the connection supervision timeout in the connection A (step S119). If it is determined that T is equal to or greater than the connection supervision timeout, the mobile terminal 10a terminates the connection A with the BLE terminal 20a (step S120). If, on the other hand, it is not determined that T is equal to or greater than the connection supervision timeout, the processing returns to step S110.

(Processing by BLE Terminal 20a)

Next, with reference to FIGS. 19 to 23, a description is given of the details of the processing performed by the BLE terminal 20. FIG. 19 is a flow chart showing an example of the processing performed by the BLE terminal 20a. Here, a case is assumed where the BLE terminal 20a performs the processing in FIGS. 19 to 22, and the BLE terminal 20b performs the processing in FIG. 23. The BLE terminal 20 includes a processor for performing the processing shown in FIGS. 19 to 23, and the processor is implemented as the BLE communication module 25. A description is given below on the assumption that the BLE communication module 25 (the processor) of the BLE terminal 20 performs the processing shown in FIGS. 19 to 23. It should be noted that the BLE terminal 20 may include a CPU and/or another processor capable of executing an application (regardless of whether or not the CPU and/or the other processor is implemented as the BLE communication module 25), and part or all of the processing shown in FIGS. 19 to 23 may be performed by the CPU and/or the other processor executing a communication program.

As shown in FIG. 19, the BLE terminal 20a determines whether or not the timing for executing advertising arrives (step S200). If it is determined that the timing for executing advertising does not arrive (step S200: NO), the BLE terminal 20a performs the process of step S200 again.

If it is determined that the timing for executing advertising arrives (step S200: YES), the BLE terminal 20a performs advertising (step S201). Specifically, in step S201, the BLE terminal 20a transmits an advertising packet while switching between the three channels 37 to 39. Here, it is assumed that the BLE terminal 20a transmits an advertising packet (the above "ADV_IND") for connecting to an unspecified device present around the BLE terminal 20a itself.

Next, the BLE terminal 20a determines whether or not a connection request transmitted from the mobile terminal 10a (an initiator) in the above step S105 is received (step S202). If a connection request is not received from another device (step S202: NO), the BLE terminal 20a performs the process of step S200 again.

If a connection request is received (step S202: YES), the BLE terminal 20a sets CI, SL, the connection supervision timeout, the number of hops, the access address, and the like included in the connection request and transitions to a connection state, and a connection A between the BLE terminal 20a and the mobile terminal 10a is established (step S203). After the connection A is established, the BLE terminal 20a performs a during-connection process (step S204). The during-connection process is repeatedly executed while the connection A between the mobile terminal 10a and the BLE terminal 20a is maintained. A description is given below of the details of the during-connection process performed by the BLE terminal 20a.

(During-Connection Process by BLE Terminal 20)

Figure 20:
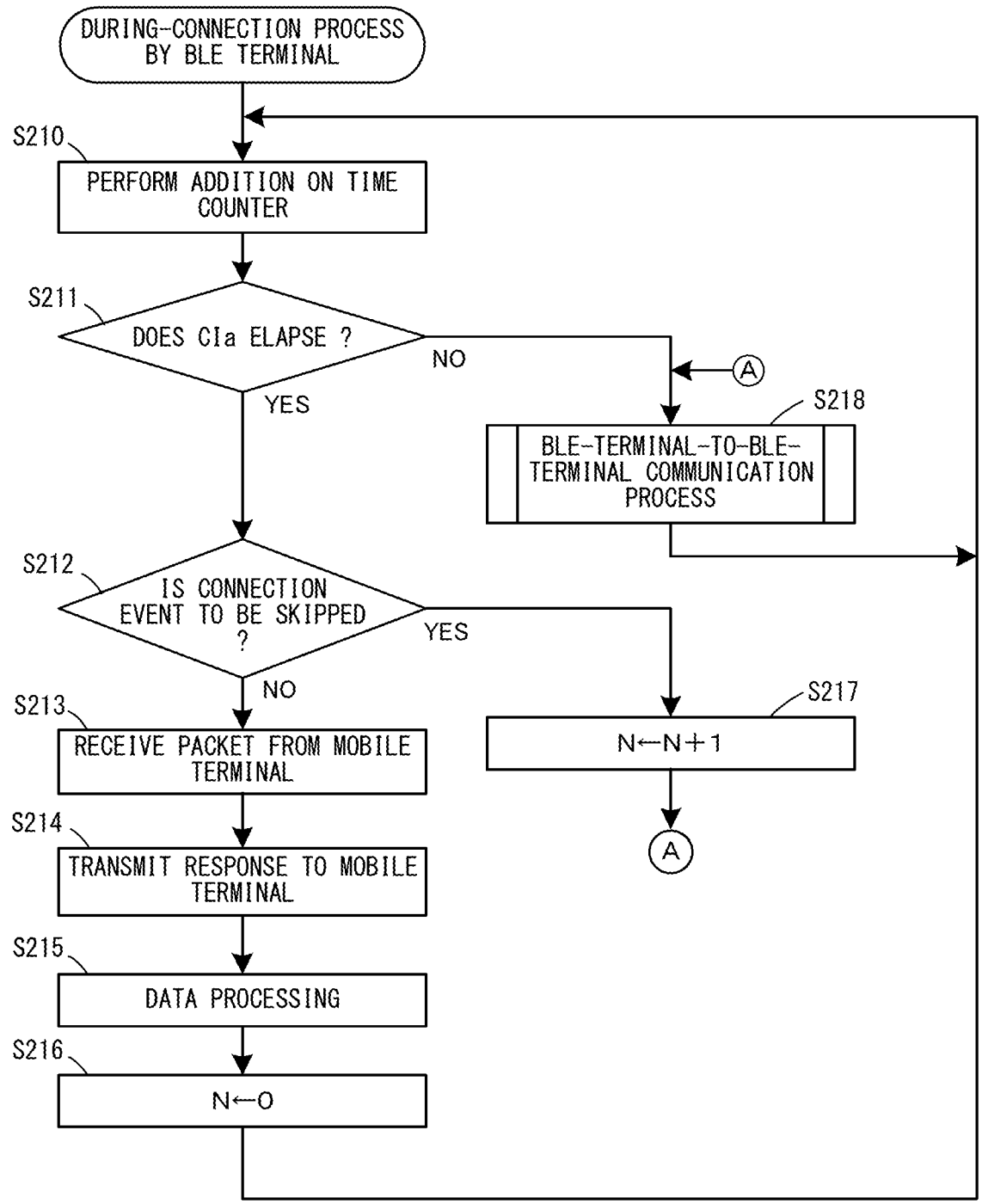
FIG. 20 is a detailed flow chart of a during-connection process in step S205.

FIG. 20 is a detailed flow chart of the during-connection process in step S205.

As shown in FIG. 20, the BLE terminal 20a performs addition on a time counter (step S210). Specifically, the BLE terminal 20a performs the process of step S210 at regular time intervals and increases the time counter by 1 every time the BLE terminal 20a performs the process of step S210. Based on the value of the time counter, the BLE terminal 20a determines whether or not the connection interval CIa elapses since the previous connection event in the connection A (since the mobile terminal 10a has received a packet) (step S211). It should be noted that actually, in step S211, the BLE terminal 20a determines whether or not a time a predetermined time (calculated taking into account the above measurement error of time) shorter than CIa elapses since the previous connection event.

If it is determined that the connection interval CIa elapses since the previous connection event (step S211: YES), the BLE terminal 20a determines whether or not to skip a connection event in the connection A (step S212). Specifically, if "N" is equal to or greater than the slave latency SLa, the determination of the BLE terminal 20a is NO in step S212. Here, "N" indicates the number of times the BLE terminal 20a skips a connection event (the number of connection events in which the BLE terminal 20a does not successively transmit a response packet to the mobile terminal 10a). That is, if the number of times N the BLE terminal 20a does not successively return a response packet to the mobile terminal 10a reaches the slave latency SLa, the BLE terminal 20a determines that the BLE terminal 20a is to return a response packet to the mobile terminal 10a in the current connection event.

In addition, even if "N" is less than the slave latency SLa, the determination of the BLE terminal 20a may be NO in step S212. For example, if a response is to be transmitted to the mobile terminal 10a to adjust the parent-to-child connection shown in FIGS. 11 and 16 before the slave latency SLa is reached, the determination of the BLE terminal 20a is NO in step S212. Also if there is data to be transmitted to the mobile terminal 10a, the determination of the BLE terminal 20a is NO in step S212. It should be noted that in the process of step S212, first, the BLE terminal 20a determines whether or not there is data to be transmitted (application data or data for adjusting a parent-to-child connection shown in FIG. 11 or the like). If the result of the determination is NO, the BLE terminal 20a may determine whether or not N is equal to or greater than SLa. That is, if there is data to be transmitted to the mobile terminal 10a, then to transmit a response packet including the data to be transmitted to the mobile terminal 10a in the current connection event, the determination of the BLE terminal 20a may be NO in step S212. Even if there is no data to be transmitted to the mobile terminal 10a, but if N is equal to or greater than SLa, then to transmit an empty response packet, the determination may be NO in step S212.

If the determination is NO in step S212, the BLE terminal 20a receives a packet from the mobile terminal 10a using any of the data channels 0 to 36 (step S213). Subsequently, the BLE terminal 20a transmits a response packet to the mobile terminal 10a using any of the data channels 0 to 36 (step S214). In step S214, if there is application data to be transmitted to the mobile terminal 10a, the BLE terminal 20a transmits a packet including this data.

Next, the BLE terminal 20a processes received data (step S215). In the process of step S215, if predetermined data is received from the mobile terminal 10a, the BLE communication module of the BLE terminal 20a transfers the received data to the application. Then, the BLE terminal 20a sets the variable N to "0" (step S216) and returns to step S210 again.

It should be noted that the process of the above step S213 may be performed before the process of step S212. That is, if the timing of a connection event arrives, the BLE terminal 20a may receive a data packet from the mobile terminal 10a (step S213) and next in step S212, may determine whether or not to skip the current connection event. For example, in step S213, the BLE terminal 20a receives a data packet from the mobile terminal 10a, and next, performs the process of step S212. In the process of step S212, as described above, the BLE terminal 20a determines whether or not there is data (application data or the like) to be transmitted to the mobile terminal 10a, and determines whether or not N is equal to or greater than SL. Then, based on the results of the determinations, the BLE terminal 20a determines whether or not to skip the current connection event.

If, on the other hand, the determination is YES in step S212, that is, if it is determined that the current connection event is to be skipped, the BLE terminal 20a adds 1 to "N" (step S217) and performs the process of step S218 next.

If the determination is NO in step S211, or if step S217 is executed, the BLE terminal 20a performs a BLE-terminal-to-BLE-terminal communication process (step S218). The BLE-terminal-to-BLE-terminal communication process in step S218 is executed during a connection interval in the connection A with the mobile terminal 10a (NO in S211), or executed if it is determined that a connection event in the connection A is to be skipped (YES in S212). The BLE-terminal-to-BLE-terminal communication process is a process for, in the state where the BLE terminal 20a is connected to the mobile terminal 10a, performing communication (child-to-child communication) with the BLE terminal 20b. The BLE-terminal-to-BLE-terminal communication process is executed without even an instruction from the mobile terminal 10a. It should be noted that the setting of whether or not to perform the BLE-terminal-to-BLE-terminal communication process may be made based on a command from the mobile terminal 10a. A description is given below of the details of the BLE-terminal-to-BLE-terminal communication process in step S218.

It should be noted that during the execution of the processing in FIG. 20, the BLE terminal 20a determines whether or not the time elapsed since the BLE terminal 20a has previously communicated with the mobile terminal 10a is equal to or greater than the connection supervision timeout. For example, the BLE terminal 20a determines whether or not the time elapsed since the BLE terminal 20a has previously received a packet from the mobile terminal 10a is equal to or greater than the connection supervision timeout. Alternatively, the BLE terminal 20a may determine whether or not the time elapsed since the BLE terminal 20a has previously transmitted a response packet to the mobile terminal 10a is equal to or greater than the connection supervision timeout. Then, if the time elapsed since the previous communication with the mobile terminal 10a is equal to or greater than the connection supervision timeout, the BLE terminal 20a terminates the connection with the mobile terminal 10a and transitions from the connection state to a non-connection state, and the processing in FIG. 20 ends. The connection supervision timeout is determined by the mobile terminal 10a when the connection is established, and the mobile terminal 10a notifies the BLE terminal 20a of the determined connection supervision timeout.

A description is given below of the details of the BLE-terminal-to-BLE-terminal communication process in step S218.

(BLE-Terminal-to-BLE-Terminal Communication Process)

Figure 21:
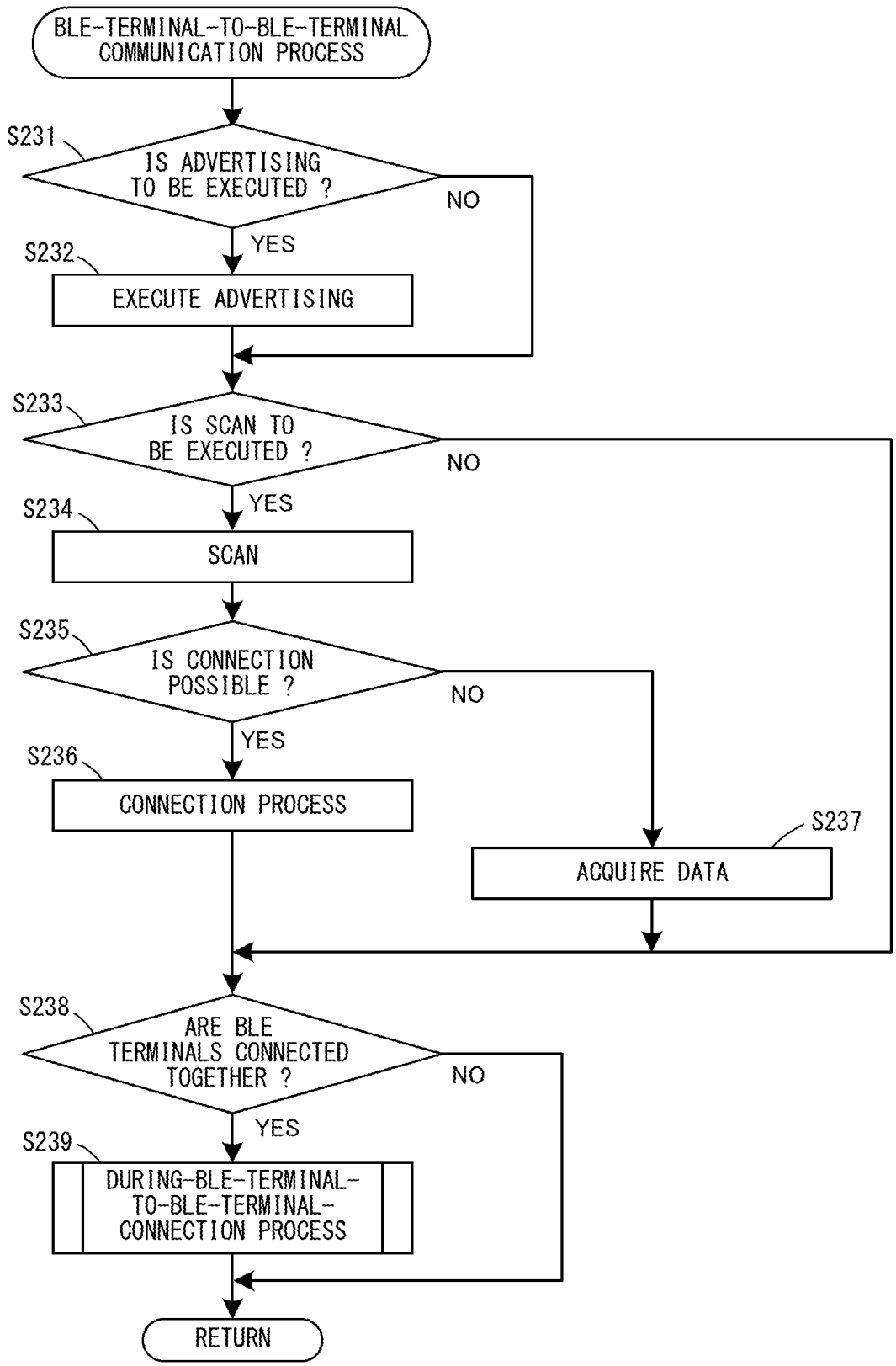
FIG. 21 is a detailed flow chart of a BLE-terminal-to-BLE-terminal communication process in step S218.

FIG. 21 is a detailed flow chart of the BLE-terminal-to-BLE-terminal communication process in step S218. In FIG. 21, an example is described where the BLE terminal 20a in the state of being connected to the mobile terminal 10a communicates with the BLE terminal 20b.

As shown in FIG. 21, the BLE terminal 20a determines whether or not the timing for executing advertising arrives (step S231). For example, certain timing may be set as the timing for executing advertising, or as shown in FIG. 9, the timing for executing advertising may be randomly determined. Alternatively, as described with reference to FIG. 10, based on an advertising packet received from another device, the timing for executing advertising may be determined.

If it is determined that the timing for executing advertising arrives (step S231: YES), the BLE terminal 20a performs advertising (step S232). Specifically, in step S232, the BLE terminal 20a transmits a plurality of advertising packets while switching between the three advertising channels 37 to 39.

For example, to communicate with the BLE terminal 20b without establishing a connection with the BLE terminal 20b, the BLE terminal 20a sets "ADV_NONCONN_IND" as the type of an advertising packet and transmits the packet including application data by broadcast. If the size of application data exceeds the size of data that can be transmitted by a single advertising packet, the BLE terminal 20a divides the application data and separately transmits the pieces of divided application data in a plurality of advertising packets. In this case, the BLE terminal 20a transmits information indicating at which position (place in order) in the application data each piece of divided data is located, by including the information in each advertising packet. For example, if the application data is 75 octet, the BLE terminal 20a divides the application data into three parts, each of which has 25 octet of divided data. These three pieces of divided data are defined as no. 1, no. 2, and no. 3 in order starting from the beginning piece of data, and transmitted in this order. It should be noted that in view of the possibility that data cannot be received at the receiving end, the three pieces of divided data may be transmitted repeatedly (multiple times). Specifically, the BLE terminal 20a transmits a single advertising packet including the first piece of divided data (the first one-third part of the application data) and the sequence number (no. 1). Next, the BLE terminal 20 transmits a single advertising packet including the second piece of divided data (the middle one-third part of the application data) and the sequence number (no. 2). Then, the BLE terminal 20a transmits a single advertising packet including the third piece of divided data (the last one-third part of the application data) and the sequence number (no. 3). The BLE terminal 20b receives these three advertising packets and arranges the pieces of divided data in accordance with the sequence numbers, and thereby can reconstruct the application data transmitted from the BLE terminal 20a. It should be noted that the BLE terminal 20a may transmit an advertising packet indicating that a scan request is possible ("ADV_SCAN_IND"). In this case, the BLE terminal 20b having received the advertising packet transmits a scan request, and in accordance with the scan request, the BLE terminal 20a transmits a scan response. The BLE terminal 20a can further include data in this scan response. Consequently, the BLE terminal 20a transmits a single advertising packet, and thereby can further transmit a scan response. Thus, it is possible to transmit more data to the BLE terminal 20b.

In addition, to communicate with the BLE terminal 20b by establishing a connection with the BLE terminal 20b, then in step S232, the BLE terminal 20a sets "ADV_IND" as the type of an advertising packet and transmits the advertising packet by broadcast. In this case, if the BLE terminal 20b that is executing a scan receives the advertising packet from the BLE terminal 20a, the BLE terminal 20b transmits a connection request to the BLE terminal 20a. Consequently, a connection is established between the BLE terminal 20a and the BLE terminal 20b.

It should be noted that the advertising packet transmitted in step S232 may include timing information (information indicating the timing of advertising and/or a scan to be executed next time or later) described with reference to FIG. 10. Further, the advertising packet may include information of the timing Ta2 described with reference to FIG. 11. As described above, based on the reception of the above pieces of information, the BLE terminal 20b adjusts the timing of advertising to be executed next time or later or the timing of a scan to be executed next time or later. This makes it possible to acquire a target advertising packet (for example, an advertising packet according to a sequence number that has not yet been acquired) in a shorter time.

If the determination is NO in step S231, or if the process of step S232 is performed, the BLE terminal 20a determines whether or not the timing for executing a scan arrives (step S233). For example, certain timing may be set as the timing for executing a scan, or as shown in FIG. 9, the timing for executing a scan may be randomly determined. Further, as described with reference to FIG. 10, based on timing information included in an advertising packet received from another device, the timing for executing a scan may be determined.

If it is determined that the timing for executing a scan arrives (step S233: YES), the BLE terminal 20a performs a scan (step S234). For example, in step S234, the BLE terminal 20a receives an advertising packet from the BLE terminal 20b. The subsequent operation of the BLE terminal 20a varies depending on the type of the advertising packet from the BLE terminal 20b.

For example, if the type of the advertising packet received from the BLE terminal 20b is "ADV_IND", that is, if it is possible to connect to the BLE terminal 20b (step S235: YES), the BLE terminal 20a performs a connection process (step S236). The connection process in step S236 is similar to the processes of steps S105 and S106 in FIG. 17. That is, the BLE terminal 20a transmits a connection request to the BLE terminal 20b and receives from the BLE terminal 20b a response to the connection request, thereby establishing a connection C with the BLE terminal 20b. At this time, the BLE terminal 20a becomes a central (a master), and the BLE terminal 20b becomes a peripheral (a slave). Further, in step S236, the BLE terminal 20a determines parameters (an access address, the connection interval CIc, the slave latency SLc, the number of hops, the connection supervision timeout, and the like) regarding the connection C between the BLE terminal 20a and the BLE terminal 20b and notifies the BLE terminal 20b of the parameters.

If, on the other hand, for example, the type of the advertising packet received from the BLE terminal 20b is "ADV_NONCONN_IND", the determination of the BLE terminal 20a is NO in step S235. That is, "ADV_NONCONN_IND" indicates non-connection advertising, and therefore, the BLE terminal 20a acquires data included in the advertising packet (step S237). This advertising packet may include data (for example, application data) transmitted from the BLE terminal 20b to an unspecified device, and the BLE terminal 20a acquires the data included in the advertising packet. If this data is pieces of divided application data, then as described above, the BLE terminal 20a reconstructs application data based on sequence numbers included in the advertising packet.

It should be noted that the advertising packet received in step S234 may include timing information (information indicating the timing of advertising and/or a scan to be executed next time or later) described with reference to FIG. 10. Further, the advertising packet may also include information of the timing Tb shown in FIG. 11 (the timing when the BLE terminal 20b transmits a response packet to the mobile terminal 10b). As described above, based on the reception of the above pieces of information, the BLE terminal 20a adjusts the timing of advertising to be executed next time or later or the timing of a scan to be executed next time or later.

The advertising in the above step S232 and the scan in the above step S234 are repeatedly performed, whereby even in the state where the BLE terminal 20a and the BLE terminal 20b are not connected together, the two devices can transmit and receive data to and from each other. Further, the advertising in step S232 and the scan in step S234 are repeatedly performed, whereby it is possible to establish a connection between the BLE terminal 20a and the BLE terminal 20b.

Whether the BLE terminal 20a and the BLE terminal 20b establish a connection with each other and communicate with each other, or communicate with each other without establishing a connection with each other is determined based on, for example, a request from an application. For example, if it is necessary to certainly transmit and receive data, the BLE terminal 20a sets "ADV_IND" as the type of an advertising packet. Further, if it is necessary to simultaneously transmit data to a plurality of devices, the BLE terminal 20a sets "ADV_NONCONN_IND" as the type of an advertising packet and transmits the advertising packet.

If the process of step S236 is executed, or if the process of step S237 is executed, or if the determination is NO in step S233, the BLE terminal 20a executes the process of step S238.

In step S238, the BLE terminal 20a determines whether or not the BLE terminal 20a is in the state of being connected to the BLE terminal 20b. If, as a result of repeatedly performing the advertising in the above step S232 and the scan in the above step S234, the BLE terminal 20a and the BLE terminal 20b are in the state of being connected together, the BLE terminal 20a performs a during-BLE-terminal-to-BLE-terminal-connection process (step S239).

The during-BLE-terminal-to-BLE-terminal-connection process in step S239 is a process performed when the BLE terminal 20a is in the state of being connected to the mobile terminal 10a (the connection A in FIG. 15) and also in the state of being connected to the BLE terminal 20b (the connection C in FIG. 15). A description is given below of the details of the during-BLE-terminal-to-BLE-terminal-connection process in step S239.

(During-BLE-terminal-to-BLE-terminal-connection process By BLE Terminal 20a)

Figure 22:
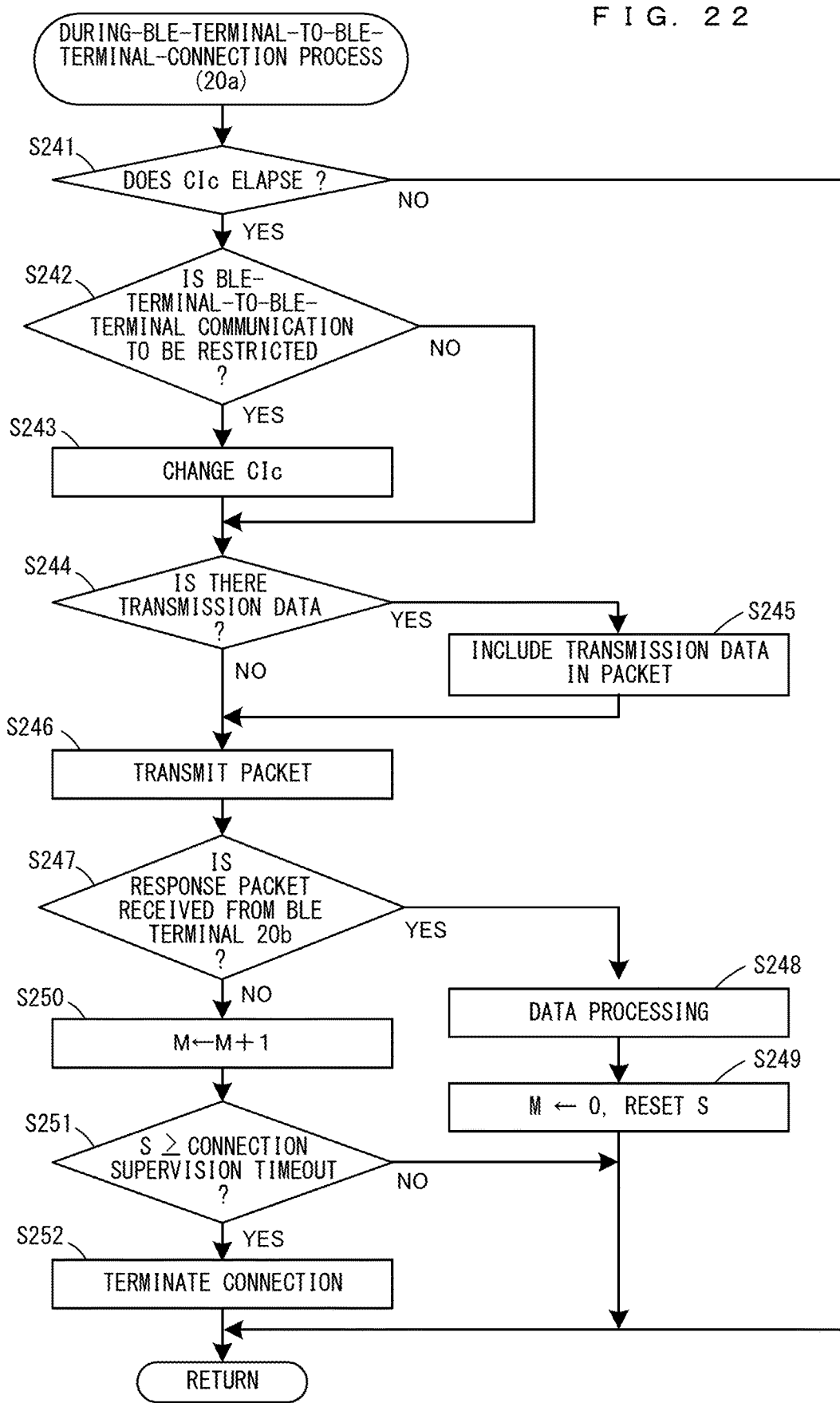
FIG. 22 is a detailed flow chart of a during-BLE-terminal-to-BLE-terminal-connection process in step S239, and is a diagram showing the processing performed by the BLE terminal 20a, which operates as a central (a master)

FIG. 22 is a detailed flow chart of the during-BLE-terminal-to-BLE-terminal-connection process in step S239, and is a diagram showing the processing performed by the BLE terminal 20a, which operates as a central (a master).

FIG. 22 is based on the premise that the mobile terminal 10a and the BLE terminal 20a are in the state of being connected together, and as parameters for the connection A, the connection interval CIa and the slave latency SLa are set. Further, it is assumed that the BLE terminal 20a and the BLE terminal 20b are in the state of being connected together, and as parameters for the connection C, the connection interval CIc and the slave latency SLc are set.

As shown in FIG. 22, based on a time counter, the BLE terminal 20a determines whether or not the connection interval CIc elapses (step S241). Specifically, the BLE terminal 20a determines whether or not CIc elapses since the timing of the previous connection event in the connection C between the BLE terminal 20a and the BLE terminal 20b. It should be noted that the BLE terminal 20a may set a time counter for each connection, or may determine the timing for executing a connection event in each connection, using a common time counter. That is, the time counter for the connection A between the mobile terminal 10a and the BLE terminal 20a (the time counter for use in the determination in step S211 in FIG. 20) and the time counter for the connection C between the BLE terminal 20a and the BLE terminal 20b (the time counter for use in the determination in step S241) may be different from each other, or may be the same as each other.

If it is determined that the connection interval CIc does not elapse (step S241: NO), the BLE terminal 20a ends the processing shown in FIG. 22.

If it is determined that the connection interval CIc elapses (step S241: YES), the BLE terminal 20a determines whether or not communication between the BLE terminal 20a and the BLE terminal 20b is to be restricted (step S242). Specifically, if it is necessary to communicate with the mobile terminal 10a in a predetermined time from the current moment, the BLE terminal 20a determines that communication between the BLE terminal 20a and the BLE terminal 20b is to be restricted. That is, if the slave latency SLa in the connection A between the mobile terminal 10a and the BLE terminal 20a is to be exceeded unless the BLE terminal 20a transmits a response to the mobile terminal 10a in a predetermined time from the current moment, the BLE terminal 20a restricts communication with the BLE terminal 20b. Specifically, if the value of "N" is equal to or greater than the slave latency SLa, the BLE terminal 20a determines that communication between the BLE terminal 20a and the BLE terminal 20b is to be restricted.

If it is determined that communication between the BLE terminal 20a and the BLE terminal 20b is to be restricted (step S242: YES), the BLE terminal 20a changes the connection interval CIc (step S243). Specifically, the BLE terminal 20a changes CIc to a value (CIc2) greater than the currently set value so that a connection event to occur next in the connection C between the BLE terminal 20a and the BLE terminal 20b does not temporally overlap a connection event in the connection A between the mobile terminal 10a and the BLE terminal 20a (see FIG. 15).

If the process of step S243 is executed, or if the determination is NO in step S242, the BLE terminal 20a determines whether or not there is transmission data (for example, application data) to be transmitted to the BLE terminal 20b (step S244). If there is transmission data (step S244: YES), the BLE terminal 20a includes the transmission data in a packet (step S245).

If the process of step S245 is executed, or if the determination is NO in step S244, the BLE terminal 20a transmits a packet to the BLE terminal 20b, using a data channel (step S246). If the process of step S245 is performed, the payload of the packet includes transmission data. If the process of step S245 is not performed, the payload of the packet does not include transmission data. It should be noted that if CIc is changed to CIc2 in step S243, information about CIc2 after the change is included in the packet. Consequently, the next connection event in the connection C between the BLE terminal 20a and the BLE terminal 20b occurs after the lapse of CIc2.

It should be noted that CIc2 after the change is changed back to CIc after a connection event between the mobile terminal 10a and the BLE terminal 20a ends. In a connection event to occur in the connection C between the BLE terminal 20a and the BLE terminal 20b after the connection event between the mobile terminal 10a and the BLE terminal 20a ends, the BLE terminal 20a transmits information about CIc to the BLE terminal 20b (see FIG. 15).

The processes of steps S242 to S246 are performed, whereby as shown in FIG. 15, it is possible to restrict communication between the BLE terminal 20a and the BLE terminal 20b while the communication between the mobile terminal 10a and the BLE terminal 20a is performed.

After step S246, the BLE terminal 20a determines whether or not a response packet is received from the BLE terminal 20b (step S247). If a response packet is received from the BLE terminal 20b (step S247: YES), the BLE terminal 20a processes received data (step S248). In step S248, for example, (the BLE communication module of) the BLE terminal 20b transfers the received data to an application layer. Then, the BLE terminal 20a sets a variable M to "0" and also resets a variable "S" (step S249), and then ends the processing shown in FIG. 22. "M" indicates the number of connection events in which a response packet is not received from the BLE terminal 20b in the connection C between the BLE terminal 20a and the BLE terminal 20b. Further, "S" is a variable indicating the time elapsed since the BLE terminal 20a has received a response packet from the BLE terminal 20b. Using the variable "S", the BLE terminal 20a determines whether or not to terminate the connection with the BLE terminal 20b. For example, a number may be added to "S" in accordance with the lapse of time, or 1 may be added to "S" every time the process of step S241 is performed.

If, on the other hand, a response packet is not received from the BLE terminal 20b (step S247: NO), the BLE terminal 20a adds 1 to "M" (step S250). Next, the BLE terminal 20a determines whether or not "S" is equal to or greater than the connection supervision timeout in the connection C (step S251). If it is determined that "S" is equal to or greater than the connection supervision timeout (step S251: YES), the BLE terminal 20a terminates the connection C with the BLE terminal 20b (step S252) and ends the processing shown in FIG. 22. If it is not determined that "S" is equal to or greater than the connection supervision timeout (step S251: NO), the BLE terminal 20a ends the processing shown in FIG. 22 without performing the process of step S252 (without terminating the connection C).

(During-BLE-Terminal-to-BLE-Terminal-Connection Process by BLE Terminal 20b)

Figure 23:
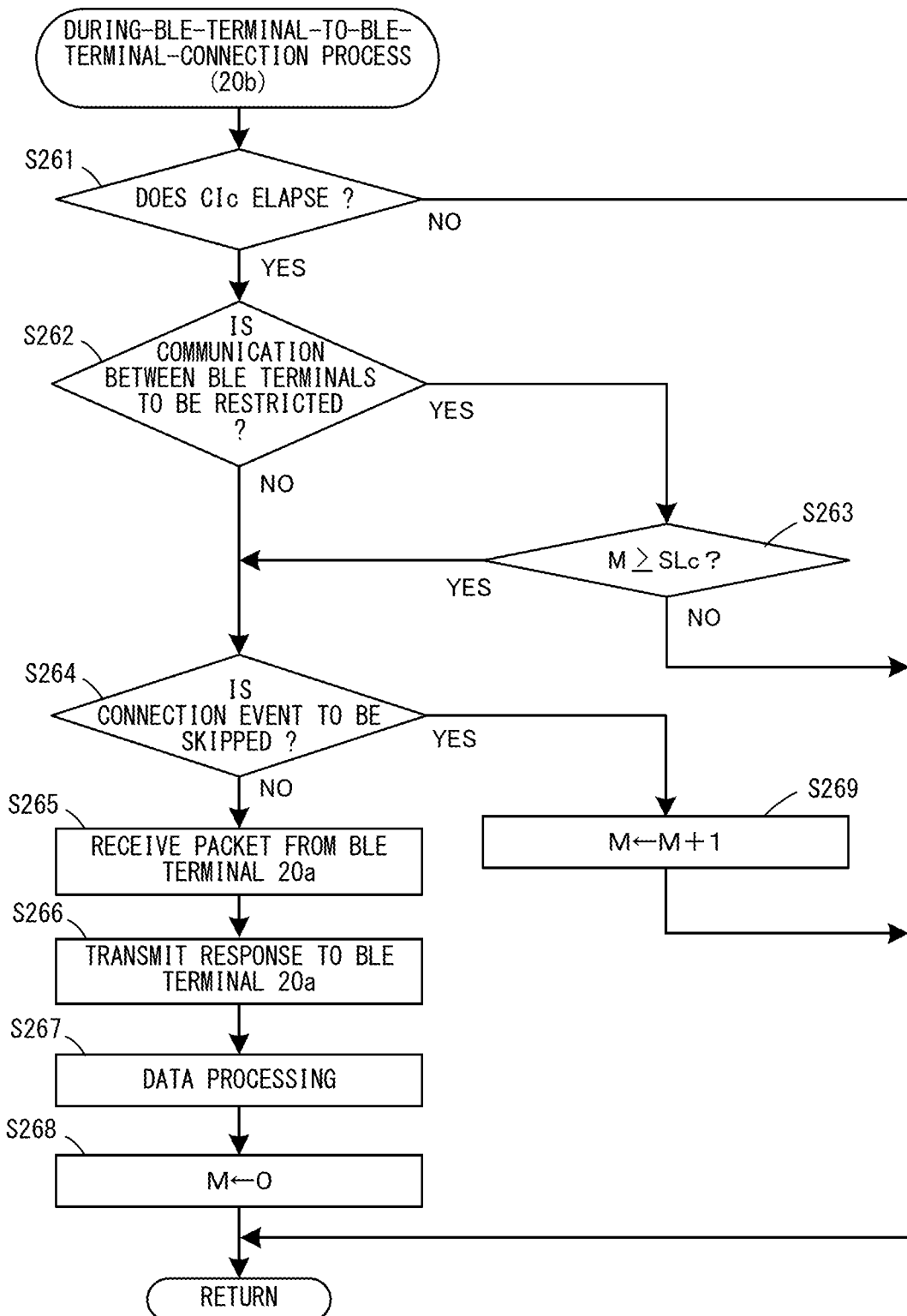
FIG. 23 is a detailed flow chart of the during-BLE-terminal-to-BLE-terminal-connection process in step S239, and is a diagram showing the processing performed by the BLE terminal 20b, which operates as a peripheral (a slave).

FIG. 23 is a detailed flow chart of the during-BLE-terminal-to-BLE-terminal-connection process in step S239, and is a diagram showing the processing performed by the BLE terminal 20b, which operates as a peripheral (a slave).

FIG. 23 is based on the premise that the mobile terminal 10b and the BLE terminal 20b are in the state of being connected together, and as parameters for the connection B, the connection interval CIb and the slave latency SLb are set. Further, it is assumed that the BLE terminal 20a and the BLE terminal 20b are in the state of being connected together, and as parameters for the connection C, the connection interval CIc and the slave latency SLc are set.

As shown in FIG. 23, based on a time counter, the BLE terminal 20b determines whether or not the connection interval CIc elapses (step S261). Specifically, the BLE terminal 20b determines whether or not CIc elapses since the timing of the previous connection event in the connection C between the BLE terminal 20a and the BLE terminal 20b. It should be noted that the BLE terminal 20b may set a time counter for each connection, or may set a common time counter.

If it is determined that the connection interval CIc does not elapse (step S261: NO), the BLE terminal 20b ends the processing shown in FIG. 23.

If it is determined that the connection interval CIc elapses (step S261: YES), the BLE terminal 20b determines whether or not communication between the BLE terminal 20a and the BLE terminal 20b is to be restricted (step S262). Specifically, if it is necessary to communicate with the mobile terminal 10b in a predetermined time from the current moment, the BLE terminal 20b determines that communication between the BLE terminal 20a and the BLE terminal 20b is to be restricted. That is, if the slave latency SLb in the connection B between the mobile terminal 10b and the BLE terminal 20b is to be exceeded unless the BLE terminal 20b transmits a response to the mobile terminal 10b in a predetermined time from the current moment, the BLE terminal 20b restricts the communication with the BLE terminal 20a.

If it is determined that communication between the BLE terminal 20a and the BLE terminal 20b is to be restricted (step S262: YES), the BLE terminal 20b determines whether or not a variable "M" is equal to or greater than the slave latency SLc (step S263). "M" indicates the number of times the BLE terminal 20b does not transmit a response packet (skips a connection event) in a connection event in the connection C between the BLE terminal 20a and the BLE terminal 20b. If it is determined that "M" is equal to or greater than the slave latency SLc (step S263: YES), the processing proceeds to step S264. If, on the other hand, it is determined that "M" is less than the slave latency SLc (step S263: NO), the BLE terminal 20b ends the processing in FIG. 23.

If the determination is NO in step S262, or if the determination is YES in step S263, the BLE terminal 20b determines whether or not a connection event in the connection C with the BLE terminal 20a is to be skipped.

As is clear from the processes of steps S262 and S263, the BLE terminal 20b restricts communication with the BLE terminal 20a to give priority to the communication with the mobile terminal 10b. Specifically, the BLE terminal 20b restricts communication with the BLE terminal 20a (that is, skips a connection event in the connection C) so that the communication with the mobile terminal 10b is performed in the range of the slave latency SLb. If, however, the slave latency SLc in the connection C with the BLE terminal 20a is to be exceeded unless a response is transmitted to the BLE terminal 20a in the current connection event (step S263: YES), the BLE terminal 20b does not restrict communication with the BLE terminal 20a, and the processing proceeds to step S264. This enables the BLE terminal 20b to avoid the risk of terminating the connection C with the BLE terminal 20a, while giving priority to the communication with the mobile terminal 10b.

In step S264, the BLE terminal 20b determines whether or not the current connection event in the connection C is to be skipped.

If the determination is NO in step S264, then similarly to steps S214 to S216 in FIG. 20, the BLE terminal 20b executes a connection event in the connection C. Specifically, the BLE terminal 20b receives a packet from the BLE terminal 20a using a data channel (step S265), and in accordance with the reception of the packet, transmits a response to the BLE terminal 20a (step S266). This response may include a request to change SLc. Then, the BLE terminal 20b processes data from the BLE terminal 20a (step S267), sets the variable M to "0" (step S268), and ends the processing shown in FIG. 23.

If, on the other hand, the determination is YES in step S264, the BLE terminal 20b adds 1 to "M" (step S269) and ends the processing shown in FIG. 23.

Here, if communication in one of the parent-to-child connection (the connection B between the mobile terminal 10b and the BLE terminal 20b) and the child-to-child connection (the connection C between the BLE terminals 20) is restricted, and there is a risk of terminating the other connection, the BLE terminal 20b gives priority to the parent-to-child connection. For example, if the value of "N" is equal to the slave latency SLb, that is, if the number of times the BLE terminal 20b does not return a response packet to the mobile terminal 10b is equal to the slave latency SLb, the determination of the BLE terminal 20b is YES in step S264. For example, even if the determination is YES in step S263, the determination of the BLE terminal 20b is YES in step S264 (in this case, M>SLc, and therefore, the risk of terminating the child-to-child connection C is high). That is, to avoid the risk of terminating the parent-to-child connection B, the BLE terminal 20b restricts communication in the child-to-child connection C.

As described above, in the exemplary embodiment, priority is given to a parent-to-child connection over a child-to-child connection. This makes it possible to avoid the risk of terminating the parent-to-child connection even if children are connected together during the parent-to-child connection. It should be noted that in another exemplary embodiment, priority may be given to a child-to-child connection over a parent-to-child connection. Alternatively, in accordance with the state of the current communication, it may be determined whether to give priority to a parent-to-child connection or give priority to a child-to-child connection. For example, if the amount of communication of a child-to-child connection is greater than the amount of communication of a parent-to-child connection, priority may be given to the child-to-child connection.

It should be noted that during the execution of the processing in FIG. 23, the BLE terminal 20b determines whether or not the time elapsed since the BLE terminal 20b has previously communicated with the BLE terminal 20a is equal to or greater than the connection supervision timeout. For example, the BLE terminal 20b determines whether or not the time elapsed since the BLE terminal 20b has previously received a packet from the BLE terminal 20a is equal to or greater than the connection supervision timeout. Alternatively, the BLE terminal 20b may determine whether or not the time elapsed since the BLE terminal 20b has previously transmitted a response packet to the BLE terminal 20a is equal to or greater than the connection supervision timeout. Then, if the time elapsed since the BLE terminal 20b has previously communicated with the BLE terminal 20a is equal to or greater than the connection supervision timeout, the BLE terminal 20b terminates the connection with the BLE terminal 20a and transitions from the connection state to a non-connection state, and the processing in FIG. 23 ends. This connection supervision timeout is determined by the BLE terminal 20a when the connection is established, and the BLE terminal 20a notifies the BLE terminal 20b of the determined connection supervision timeout.

As described above, in the exemplary embodiment, the BLE terminal 20a in the state of being connected to the mobile terminal 10a (a parent) communicates with the BLE terminal 20b (a child) in the state of being connected to the mobile terminal 10b. That is, the BLE terminal 20a participating as a slave in a certain network communicates with the BLE terminal 20b participating as a slave in another network. Specifically, the BLE terminal 20a in the state of not being connected to the BLE terminal 20b transmits and receives an advertising packet by broadcast (broadcast to an unlimited unspecified device or a limited unspecified device), thereby communicating with the BLE terminal 20b. Further, the BLE terminal 20a establishes a connection with the BLE terminal 20b and communicates with the BLE terminal 20b in a connection state.

In addition, in the exemplary embodiment, child-to-child communication is controlled to maintain parent-to-child connection. That is, at the timing when communication for maintaining a parent-to-child connection (a parent-to-child connection event) occurs, a child preferentially performs parent-to-child communication without performing child-to-child communication. For example, if the timing of communication for maintaining a parent-to-child connection and the timing of child-to-child communication coincide with each other, the BLE terminal 20 restricts the child-to-child communication (does not perform the child-to-child communication) and preferentially performs the parent-to-child communication. Further, during a predetermined period including the timing for performing communication for maintaining a parent-to-child connection, the BLE terminal 20 may restrict child-to-child communication.

In addition, the BLE terminal 20 adjusts the timing of communication for maintaining a parent-to-child connection to improve the efficiency of child-to-child communication. Specifically, the timing of communication for maintaining the connection A between the mobile terminal 10a and the BLE terminal 20a and the timing of communication for maintaining the connection B between the mobile terminal 10b and the BLE terminal 20b are adjusted to be close to each other. Such adjustment is made, thereby enabling the BLE terminals 20 as children to efficiently communicate with each other in the state where the parent-to-child connections are maintained.

In child-to-child communication, application data is transmitted and received. The application data may be, for example, data for use in a game, such as a game character and an item (actual data of the character and the item, or data representing IDs), a game name, a game ID, or the like. Further, data for use in an application may be text data, image data, moving image data, sound data, data for advertisement, or the like that is reproduced in the application. Further, the application data may be position information (GPS information) of the BLE terminal 20, output information from a sensor (for example, an inertial sensor such as an acceleration sensor or an angular velocity sensor, a temperature sensor, a humidity sensor, a sensor capable of acquiring biological information of a human body, such as blood pressure and pulse, or the like), or the like that is provided in the BLE terminal 20. Based on the application data received in the child-to-child communication, the BLE terminal 20 may perform predetermined processing. Alternatively, the received application data may be transmitted to the mobile terminal 10, and the mobile terminal 10 may perform predetermined processing based on this data.

It should be noted that the processes of all the steps in the above flow charts are merely illustrative. Thus, the processing order of the steps may be changed, or not all the processes of the steps may be executed. Alternatively, another type of processing may be added to the processing in the above flow charts.

In addition, in the exemplary embodiment, it is assumed that each device performs communication based on the BLE standard. Alternatively, communication based not only on BLE but also on classic Bluetooth may be performed. Yet alternatively, communication based on another standard (for example, IEEE 802.11 series or the like) may be performed. Yet alternatively, communication based on any other standard may be performed. It should be noted that in communication based on the BLE standard, in a connection state, two devices communicate with each other using a common access address generated when the connection is established. In communication based on another standard, for example, in a connection state after a connection is established, communication is performed using device-specific addresses. That is, at the transmitting end, the address of the device at the receiving end is specified, and a packet is transmitted (unicast).

In addition, in the exemplary embodiment, parent-to-child communication is performed in priority to child-to-child communication. Alternatively, in another exemplary embodiment, child-to-child communication may be performed in priority to parent-to-child communication. For example, a case is assumed where, if the mobile terminal 10a and the BLE terminal 20a are in the state of being always connected together, the BLE terminal 20a and the BLE terminal 20b are located for a certain period in the range where communication can be performed. For example, a case is possible where, if a user A, who carries the mobile terminal 10a and the BLE terminal 20a with themselves, moves, and a user B, who carries the mobile terminal 10b and the BLE terminal 20b with themselves, moves, the user A and the user B pass each other. In this case, the mobile terminal 10a and the BLE terminal 20a are always located at a short distance from each other, and the mobile terminal 10b and the BLE terminal 20b are always located at a short distance from each other. Thus, the mobile terminal 10a and the BLE terminal 20a can always communicate with each other, and the mobile terminal 10b and the BLE terminal 20b can always communicate with each other. However, only while the user A and the user B pass each other, the BLE terminal 20a and the BLE terminal 20b are located in the range where communication can be performed. Thus, in order for the BLE terminal 20a and the BLE terminal 20b to exchange data, it is necessary to exchange the data in a short period. In such a case, communication between children (the BLE terminal 20a and the BLE terminal 20b) may be performed in priority to communication between a parent and a child (the mobile terminal 10a and the BLE terminal 20a, or the mobile terminal 10b and the BLE terminal 20b). For example, children may communicate with each other without establishing a connection with each other, or may establish a connection with each other and communicate with each other. Even if a parent-to-child connection event occurs while the child-to-child communication is performed, priority may be given to the child-to-child communication. Even if the period in which the parent-to-child communication is not performed exceeds the slave latency, priority may be given to the child-to-child communication. That is, for example, even if, in the connection between the mobile terminal 10a and the BLE terminal 20a, the slave latency in the connection with the mobile terminal 10a is to be exceeded unless the BLE terminal 20a returns a response to the mobile terminal 10a, the BLE terminal 20a may preferentially communicate with the BLE terminal 20b. In such a case, the parent-to-child connection can be resumed immediately after the child-to-child communication is completed (after the user A and the user B move away from each other). As described above, even if the period in which communication is not performed exceeds the slave latency but is less than or equal to the connection supervision timeout, the parent-to-child connection is maintained. Further, for example, even if, after the communication with the BLE terminal 20b is completed (the communication with the BLE terminal 20b becomes impossible), the connection with the mobile terminal 10a is terminated by giving priority to the communication with the BLE terminal 20b, the BLE terminal 20a transmits an advertising packet of which the type is "ADV_DIRECT_IND", and thereby can rapidly establish a connection with the mobile terminal 10a. However, child-to-child communication can be performed only while the user A and the user B pass each other, and therefore, child-to-child communication may be performed in priority to parent-to-child communication.

Further, in the above exemplary embodiment, the connection interval CIc and the slave latency SLc in the child-child connection are changed, thereby restricting child-to-child communication, and parent-to-child communication is performed in the period in which child-to-child communication is restricted (FIG. 15). In another exemplary embodiment, for example, the connection supervision timeout may be changed in addition to the connection interval and/or the slave latency. Alternatively, instead of the connection interval and/or the slave latency, the connection supervision timeout may be changed. The connection supervision timeout in the child-child connection is changed (made longer than the current value) so that the child-child connection is not terminated even if child-to-child communication is not performed for a relatively long time, and parent-to-child communication may be performed in the period in which child-to-child communication is not performed.

Part or all of the processing described in the specification may be performed by a CPU and/or another processor of a mobile terminal or a BLE terminal executing a communication program. Alternatively, part or all of the processing may be performed by an ASIC (Application Specific Integrated Circuit) included in a mobile terminal or a BLE terminal.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A wireless system including a plurality of devices capable of performing wireless communication,
   the wireless system comprising a first device, a second device, a third device, and a fourth device,
   the first device and the second device being configured to establish a connection between the first device and the second device such that the first device is a master and the second device is a slave, and perform wireless communication with each other, the fourth device and the third device being configured to establish a connection between the fourth device and the third device such that the fourth device is a master and the third device is a slave, and perform wireless communication with each other, the second device is configured to:

execute a transmission process for wirelessly transmitting data by broadcast or multicast, execute a reception process for wirelessly receiving data transmitted by broadcast or multicast, in a state of being connected as a slave to the first device, the second device executes the transmission process and the reception process, thereby communicating with the third device in a state of being connected as a slave to the fourth device, wherein while the second device is connected to the first device, the second device performs wireless communication with the first device at a first certain timing, and performs wireless communication with the third device at a first timing when the second device does not communicate with the first device, and while the third device is connected to the fourth device, the third device performs wireless communication with the fourth device at a second certain timing, and performs wireless communication with the second device at a second timing when the third device does not communicate with the fourth device.

2. The wireless system according to claim 1, wherein the second device in a state of not being connected to the third device transmits or receives predetermined data by wireless communication to or from the third device in the state of being connected as a slave to the fourth device.

3. The wireless system according to claim 2, wherein the second device in the state of being connected to the first device repeatedly executes the transmission process and the reception process, thereby performing wireless communication with the third device in the state of being connected as a slave to the fourth device, without establishing a connection with the third device.

4. The wireless system according to claim 2, wherein at least any of an execution period of the transmission process, timing for executing the transmission process, an execution period of the reception process, and timing for executing the reception process is variable, the timing for executing the transmission process or the timing for executing the reception process being different than the first certain timing.

5. The wireless system according to claim 4, wherein at least any of the execution period of the transmission process, the timing for executing the transmission process, the execution period of the reception process, and the timing for executing the reception process is randomly set.

6. The wireless system according to claim 1, wherein the first timing is set such that the second device preferentially performs communication with the first device over the third device.

7. The wireless system according to claim 1, wherein the second device executes an interval setting process for setting an interval of wireless communication, and establishes a connection with the third device in the state of being connected as a slave to the fourth device and then performs wireless communication between the second device and the third device at the interval set in the interval setting process wherein the interval does not coincide with the first certain timing or the second certain timing.

8. The wireless system according to claim 1, wherein the wireless system executes a first allowance period setting process for setting a first allowance period for a connection between the first device and the second device, and executes a second allowance period setting process for setting a second allowance period for a connection between the second device and the third device, the second device in the state of being connected to the first device executes a determination process for determining, based on the first allowance period, whether or not to execute synchronous communication with the first device, the third device in a state of being connected to the second device executes a determination process for determining, based on the second allowance period, whether or not to execute synchronous communication with the second device, and in the second allowance period setting process, the second allowance period is set to be longer than the first allowance period.

9. The wireless system according to claim 1, wherein the second device in the state of being connected as a slave to the first device establishes a connection with the third device in the state of being connected as a slave to the fourth device and performs wireless communication with the third device in a state where the established connection is maintained.

10. The wireless system according to claim 1, wherein the first certain timing and the second certain timing are the same.

11. A wireless system including a plurality of devices capable of performing wireless communication, the wireless system comprising a first device, a second device, a third device, and a fourth device, the first device and the second device being configured to establish a connection between the first device and the second device such that the first device is a master and the second device is a slave, and perform wireless communication with each other, the fourth device and the third device being configured to establish a connection between the fourth device and the third device such that the fourth device is a master and the third device is a slave, and perform wireless communication with each other, the second device is configured to:

execute a transmission process for wirelessly transmitting data, execute a reception process for wirelessly receiving data, in a state of being connected as a slave to the first device, the second device executes the transmission process and the reception process, thereby communicating with the third device in a state of being connected as a slave to the fourth device, and wherein the second device in the state of being connected as a slave to the first device establishes a connection with the third device in the state of being connected as a slave to the fourth device and performs wireless communication with the third device in a state where the established connection is maintained.

12. The wireless system according to claim 11, wherein the wireless system executes an allowance period setting process for setting an allowance period for a connection between the first device and the second device, and
the second device in the state of being connected to the first device executes a determination process for determining, based on the allowance period, whether or not to execute the synchronous communication with the first device.

13. The wireless system according to claim 12, wherein the second device repeatedly executes the transmission process and the reception process to search for another device around the second device and establishes a connection with the third device detected by the search and in the state of being connected as a slave to the fourth device.

14. The wireless system according to claim 13, wherein the wireless system further executes an adjustment process for adjusting at least either one of timing of the synchronous communication between the first device and the second device and timing of the synchronous communication between the fourth device and the third device.

15. The wireless system according to claim 14, wherein in the adjustment process, the timing of the synchronous communication between the first device and the second device and the timing of the synchronous communication between the fourth device and the third device are adjusted to be close to each other.

16. A wireless system including a plurality of devices capable of performing wireless communication,
the wireless system comprising a first device, a second device, a third device, and a fourth device,
the first device and the second device being configured to establish a connection between the first device and the second device such that the first device is a master and the second device is a slave, and perform wireless communication with each other,
the fourth device and the third device being configured to establish a connection between the fourth device and the third device such that the fourth device is a master and the third device is a slave, and perform wireless communication with each other,
the second device is configured to:
execute a transmission process for wirelessly transmitting data by broadcast or multicast,
execute a reception process for wirelessly receiving data transmitted by broadcast or multicast,
in a state of being connected as a slave to the first device, the second device executes the transmission process and the reception process, thereby communicating with the third device in a state of being connected as a slave to the fourth device, and wherein
the second device in the state of being connected as a slave to the first device repeatedly executes the transmission process and the reception process, thereby performing wireless communication with another device present around the second device, wherein timings that the second device communicates with the first device, the third device and the another device are different.

17. The wireless system according to claim 16, wherein the second device alternately and repeatedly executes the transmission process and the reception process.

18. The wireless system according to claim 16, wherein a sleep period in which neither the transmission process nor the reception process is performed is present at least between the transmission process and the reception process, between the transmission process and the transmission process, or between the reception process and the reception process.

19. The wireless system according to claim 16, wherein the second device repeatedly executes the transmission process and the reception process to search for another device around the second device and establishes a connection with the third device detected by the search and in the state of being connected as a slave to the fourth device.

20. A wireless system including a plurality of devices capable of performing wireless communication,
the wireless system comprising a first device, a second device, a third device, and a fourth device,
the first device and the second device being configured to establish a connection between the first device and the second device such that the first device is a master and the second device is a slave, and performing wireless communication with each other,
the fourth device and the third device being configured to establish a connection between the fourth device and the third device such that the fourth device is a master and the third device is a slave, and performing wireless communication with each other,
the second device in a state of being connected as a slave to the first device, performing wireless communication with the third device in a state of being connected as a slave to the fourth device, wherein
the second device transmits or receives, as the predetermined data, application data for use in an application, the application data at least comprising data for display or notifications,
while the second device is connected to the first device, the second device performs wireless communication with the first device at a first certain timing, and performs wireless communication with the third device at a first timing when the second device does not communicate with the first device, and
while the third device is connected to the fourth device, the third device performs wireless communication with the fourth device at a second certain timing, and performs wireless communication with the second device at a second timing when the third device does not communicate with the fourth device.

* * * * *